(12) United States Patent
Oh

(10) Patent No.: US 11,170,556 B2
(45) Date of Patent: Nov. 9, 2021

(54) APPARATUS FOR TRANSMITTING POINT CLOUD DATA, A METHOD FOR TRANSMITTING POINT CLOUD DATA, AN APPARATUS FOR RECEIVING POINT CLOUD DATA AND A METHOD FOR RECEIVING POINT CLOUD DATA

(71) Applicant: LG Electronics Inc., Seoul (KR)

(72) Inventor: Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/918,179

(22) Filed: Jul. 1, 2020

(65) Prior Publication Data

US 2021/0005006 A1    Jan. 7, 2021

Related U.S. Application Data

(60) Provisional application No. 62/870,770, filed on Jul. 4, 2019.

(51) Int. Cl.
| | | |
|---|---|---|
| *H04N 19/46* | (2014.01) |
| *G06T 9/00* | (2006.01) |
| *G06T 15/04* | (2011.01) |
| *G06T 17/05* | (2011.01) |

(52) U.S. Cl.
CPC .............. *G06T 15/04* (2013.01); *G06T 17/05* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 2003/0184555 A1* | 10/2003 | Fraser ..................... G06T 15/00 345/582 |
| 2016/0071234 A1* | 3/2016 | Lehtinen ................. G06T 9/001 345/420 |
| 2017/0347120 A1 | 11/2017 | Chou et al. |
| 2018/0053324 A1 | 2/2018 | Cohen et al. |
| 2018/0137224 A1 | 5/2018 | Hemmer et al. |
| 2019/0087979 A1* | 3/2019 | Mammou ............ H04N 19/597 |
| 2019/0156518 A1 | 5/2019 | Mammou et al. |
| 2019/0197739 A1* | 6/2019 | Sinharoy ............ G06K 9/00711 |
| 2020/0302655 A1* | 9/2020 | Oh ............................ G06T 9/40 |

FOREIGN PATENT DOCUMENTS

JP       2016-511457 A       4/2016

OTHER PUBLICATIONS

'Continuous improvement of Study Text of ISO/IEC CD 23090-5 Video-based Point Cloud Compression' (w18479), 126th MPEG Meeting, Geneva, May 8, 2019. See p. 33 (Year: 2019).*
'WD of ISO/IEC 23090-10 Carriage of PC data' (w18413), 126th MPEG Meeting, Geneva, Apr. 12, 2019. See p. 7 (Year: 2019).*

\* cited by examiner

*Primary Examiner* — Bernard Krasnic
(74) *Attorney, Agent, or Firm* — Dentons US LLP

(57) ABSTRACT

A method of transmitting point cloud data in accordance with embodiments may include encoding point cloud data, and/or transmitting a bitstream containing the encoded point cloud data and metadata for the point cloud data. In addition, a method of receiving point cloud data in accordance with embodiments may include receiving a bitstream containing point cloud data and metadata, and/or decoding the point cloud data.

14 Claims, 49 Drawing Sheets

FIG. 2
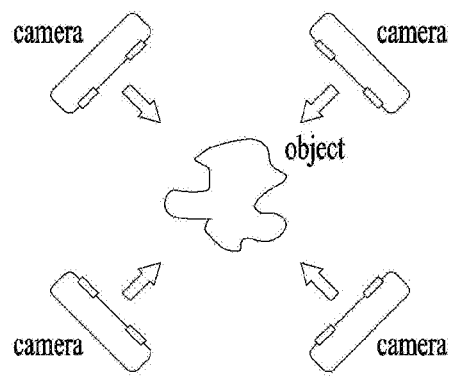
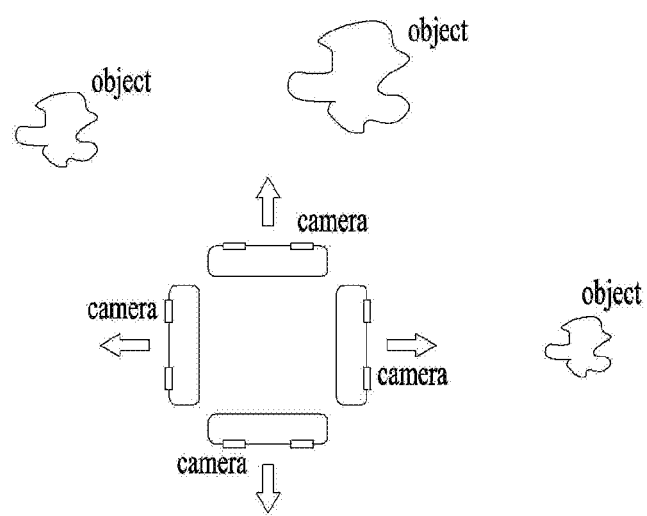

FIG. 29
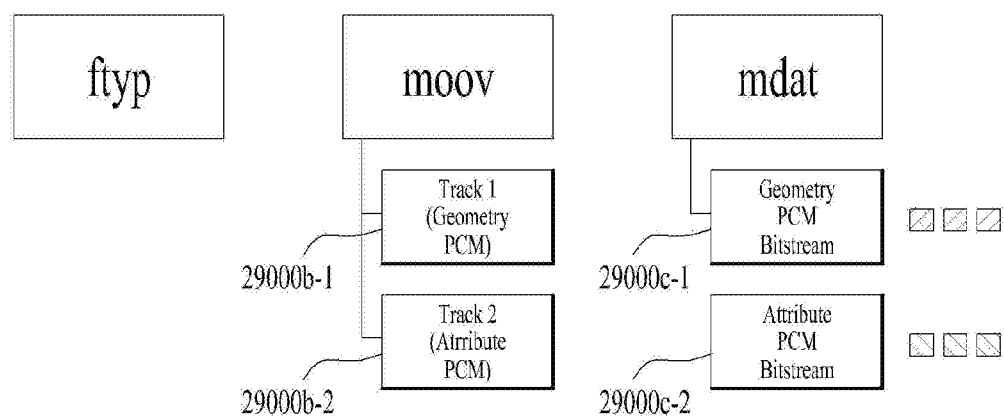
(A)
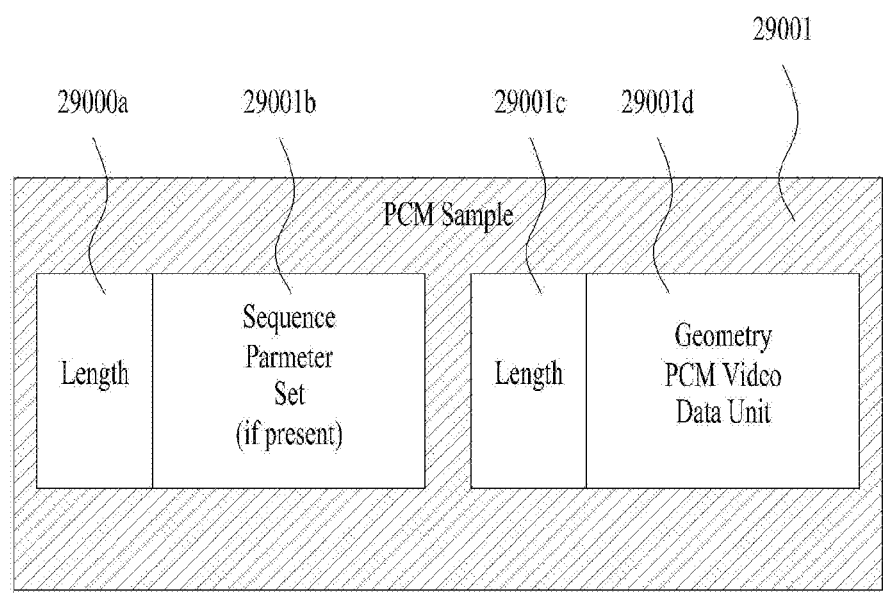
(B)

FIG. 30
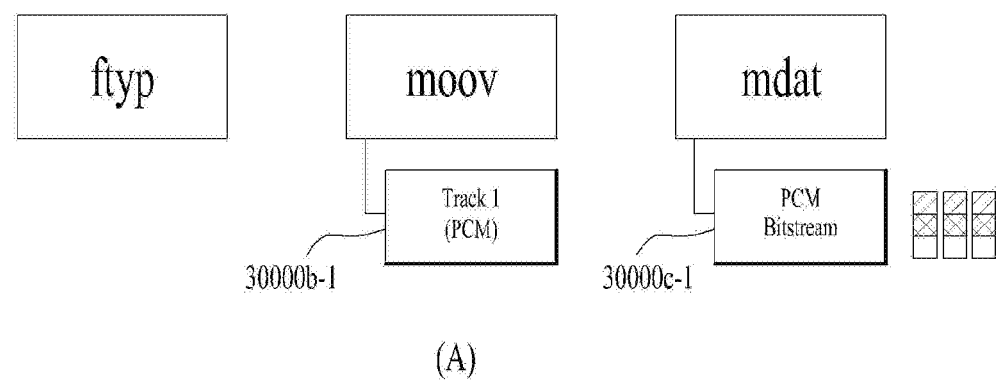
(A)
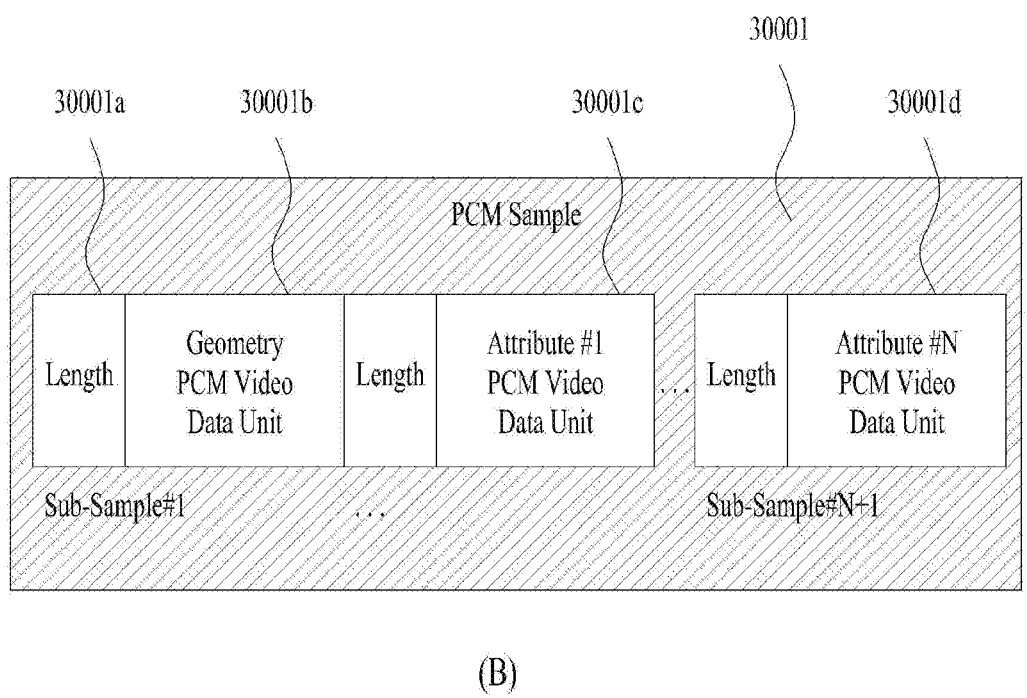
(B)

FIG. 31

| | Descriptor |
|---|---|
| vpcc_unit_header() { | |
|   vpcc_unit_type | u(5) |
|   if( vpcc_unit_type == VPCC_AVD || vpcc_unit_type == VPCC_GVD || vpcc_u nit_type == VPCC_OVD || vpcc_unit_type == VPCC_PDG) | |
|     vpcc_sequence_parameter_set_id | u(4) |
|   if( vpcc_unit_type == VPCC_AVD ) { | |
|     vpcc_attribute_index | u(7) |
|     vpcc_attribute_dimension_index | u(7) |
|     if( sps_multiple_layer_streams_present_flag ) { | |
|       vpcc_layer_index | u(4) |
|       pcm_separate_video_data( 4 ) | |
|     } | |
|     else | |
|       pcm_separate_video_data( 8 ) | |
|   } else if( vpcc_unit_type == VPCC_GVD ) { | |
|     if( sps_multiple_layer_streams_present_flag ) { | |
|       vpcc_layer_index | u(4) |
|       pcm_separate_video_data( 18 ) | |
|     } | |
|     else | |
|       pcm_separate_video_data( 22 ) | |
|   } else if( vpcc_unit_type == VPCC_OVD || vpcc_unit_type == VPCC_PDG ) { | |
|     vpcc_reserved_zero_23bits | u(23) |
|   } else | |
|     vpcc_reserved_zero_27bits | u(27) |
| } | |

| | Descriptor |
|---|---|
| pcm_separate_video_data(bitCount) { | |
|   if( sps_pcm_separate_video_present_flag && !vpcc_layer_index ) { | |
|     vpcc_pcm_video_flag | u(1) |
|     vpcc_reserved_zero_bitcount_bits | u(bitCount) |
|   } | |
|   else | |
|     vpcc_reserved_zero_bitcountplus1_bits | u(bitCount + 1) |
| } | |

| vpcc_unit_type | Identifier | V-PCC Unit Type | Description |
|---|---|---|---|
| 0 | VPCC_SPS | Sequence parameter set | Sequence level parameters |
| 1 | VPCC_PDG | Patch Data Group | Patch group information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5...31 | VPCC_RSVD | Reserved | - |

FIG. 32

```
vpcc_unit_payload() {                                                    Descriptor
    if( vpcc_unit_type == VPCC_SPS )
        sequence_parameter_set()
    else if( vpcc_unit_type == VPCC_PDG )
        patch_data_group()
    else if( vpcc_unit_type == VPCC_OVD || vpcc_unit_type == VPCC_GVD
           | vpcc_unit_type == VPCC_AVD)
        video_data_unit()
}
```
32000

| pdg_unit_type | Identifier       | Patch Data Group Unit Type              | Description                               |
|---------------|------------------|-----------------------------------------|-------------------------------------------|
| 0             | PDG_PSPS         | Patch sequence parameter set            | Sequence level parameters                 |
| 1             | PDG_PFPS         | Patch frame parameter set               | Frame level parameters                    |
| 2             | PDG_PFGPS        | Patch frame geometry parameter set      | Frame level geometry type parameters      |
| 3             | PDG_PFAPS        | Patch frame attribute parameter set     | Frame level attribute type parameters     |
| 4             | PDG_GPPS         | Geometry patch parameter set            | Patch level geometry type parameters      |
| 5             | PDG_APPS         | Attribute patch parameter set           | Patch level attribute type parameters     |
| 7             | PDG_PREFIX_SEI   | Prefix SEI message                      | Prefix SEI message                        |
| 8             | PDG_SUFFIX_SEI   | Suffix SEI message                      | Suffix SEI message                        |
| 9...31        | PDG_RSVD         | Reserved                                |                                           |

| sequence_parameter_set( ) { | Descriptor |
|---|---|
| profile_tier_level() | |
| sps_sequence_parameter_set_id | u(4) |
| sps_frame_width | u(16) |
| sps_frame_height | u(16) |
| sps_avg_frame_rate_present_flag | u(1) |
| if( sps_avg_frame_rate_present_flag ) | |
| sps_avg_frame_rate | u(16) |
| sps_enhanced_occupancy_map_for_depth_flag | u(1) |
| sps_geometry_attribute_different_layer_flag | u(4) |
| if(sps_geometry_attribute_different_layer_flag) | |
| sps_layer_count_geometry_minus1 | u(4) |
| else | |
| sps_layer_count_minus1 | u(4) |
| if( sps_layer_count_minus1 > 0) | |
| sps_multiple_layer_streams_present_flag | u(1) |
| sps_layer_absolute_coding_enabled_flag[ 0 ] = 1 | |
| for(i = 0; i < sps_layer_count_minus1; i++) { | |
| sps_layer_absolute_coding_enabled_flag[ i + 1] | u(1) |
| if( sps_layer_absolute_coding_enabled_flag[ i + 1 ] == 0) { | |
| if( i > 0) | |
| sps_layer_predictor_index_diff[ i + 1] | ue(v) |
| else | |
| sps_layer_predictor_index_diff[ i + 1 ] = 0 | |
| } | |
| } | |
| sps_pcm_patch_enabled_flag | u(1) |
| if( sps_pcm_patch_enabled_flag ) | |
| sps_pcm_separate_video_present_flag | u(1) |
| occupancy_parameter_set() | |
| geometry_parameter_set() | |
| sps_attribute_count | u(16) |
| for( i = 0; i < sps_attribute_count; i++) | |
| if(sps_geometry_attribute_different_layer_flag ) | |
| sps_layer_count_attribute_minus1[i] | u(4) |
| attribute_parameter_set( i ) | |
| } | |
| sps_patch_sequence_orientation_enabled_flag | u(1) |
| sps_patch_inter_prediction_enabled_flag | u(1) |
| sps_pixel_deinterleaving_flag | u(1) |
| sps_point_local_reconstruction_enabled_flag | u(1) |
| sps_remove_duplicate_point_enabled_flag | u(1) |
| byte_alignment() | |
| } | |

FIG. 34

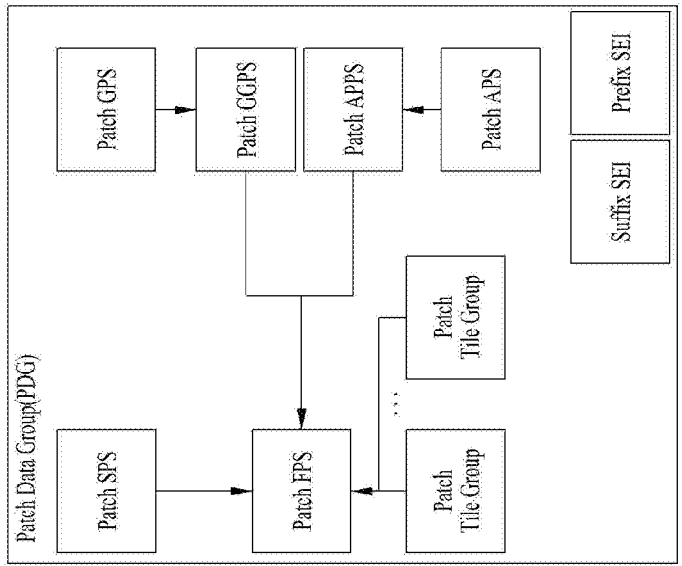

| | Descriptor |
|---|---|
| patch_data_group() { | |
| do { | |
| pdg_unit_type | ue(v) |
| patch_data_group_unit_payload( pdg_unit_type ) | |
| pdg_terminate_patch_data_group_flag | u(1) |
| } while( !pdg_terminate_patch_data_group_flag ) | |
| byte_alignment() | |
| } | |

| | Descriptor |
|---|---|
| patch_data_group_unit_payload( unitType ) { | |
| if( unitType == PDG_PSPS ) { | |
| patch_sequence_parameter_set() | |
| } else if( unitType == PDG_GPPS ) { | |
| geometry_patch_parameter_set() | |
| } else if( unitType == PDG_APPS ) { | |
| attribute_patch_parameter_set() | |
| } else if( unitType == PDG_PFPS ) { | |
| patch_frame_parameter_set() | |
| } else if( unitType == PDG_PFAPS ) { | |
| patch_frame_attribute_parameter_set() | |
| } else if( unitType == PDG_PFGPS ) { | |
| patch_frame_geometry_parameter_set() | |
| } else if( unitType == PDG_PTGLU ) { | |
| patch_tile_group_layer_unit() | |
| } else if( unitType == PDG_PREFIX_SEI ) { | |
| sei_message() | |
| } else if( unitType == PDG_SUFFIX_SEI ) { | |
| sei_message() | |
| } | |
| } | |

FIG. 35

| patch_sequence_parameter_set( ) { | Descriptor |
|---|---|
|   psps_patch_sequence_parameter_set_id | ue(v) |
|   psps_log2_patch_packing_block_size | u(3) |
|   psps_log2_max_patch_frame_order_cnt_lsb_minus4 | ue(v) |
|   psps_max_dec_patch_frame_buffering_minus1 | ue(v) |
|   psps_long_term_ref_patch_frames_flag | u(1) |
|   psps_num_ref_patch_frame_lists_in_psps | ue(v) |
|   for( j = 0; j < psps_num_ref_patch_frame_lists_in_psps; j++ ) | |
|     ref_list_struct( j ) | |
|   psps_use_eight_orientations_flag | u(1) |
|   psps_normal_axis_limits_quantization_enable_flag | u(1) |
|   psps_normal_axis_max_delta_value_enable_flag | u(1) |
|   byte_alignment( ) | |
| } | |

FIG. 36

| patch_frame_geometry_parameter_set( ) { | Descriptor |
|---|---|
| pfgps_geometry_frame_parameter_set_id | ue(v) |
| pfgps_patch_sequence_parameter_set_id | ue(v) |
| if( gi_geometry_params_enabled_flag ) { | |
|    geometry_frame_params() | |
| } | |
| if( gi_geometry_patch_params_enabled_flag ) { | |
| pfgps_geometry_patch_scale_params_enabled_flag | u(1) |
| pfgps_geometry_patch_offset_params_enabled_flag | u(1) |
| pfgps_geometry_patch_rotation_params_enabled_flag | u(1) |
| pfgps_geometry_patch_point_size_info_enabled_flag | u(1) |
| pfgps_geometry_patch_point_shape_info_enabled_flag | u(1) |
| } | |
| byte_alignment() | |
| } | |

| geometry_frame_params() { | Descriptor |
|---|---|
| gfp_geometry_smoothing_params_present_flag | u(1) |
| gfp_geometry_scale_params_present_flag | u(1) |
| gfp_geometry_offset_params_present_flag | u(1) |
| gfp_geometry_rotation_params_present_flag | u(1) |
| gfp_geometry_point_size_info_present_flag | u(1) |
| gfp_geometry_point_shape_info_present_flag | u(1) |
| if( gfp_geometry_smoothing_params_present_flag ) { | |
|    gfp_geometry_smoothing_enabled_flag | u(1) |
|    if( gfp_geometry_smoothing_enabled_flag ) { | |
|       gfp_geometry_smoothing_grid_size_minus2 | u(7) |
|       gfp_geometry_smoothing_threshold | u(8) |
|    } | |
| } | |
| if( gfp_geometry_scale_params_present_flag ) { | |
|    for( d = 0; d < 3; d++ ) | |
|       gfp_geometry_scale_on_axis[ d ] | u(32) |
| } | |
| if( gfp_geometry_offset_params_present_flag ) { | |
|    for( d = 0; d < 3; d++ ) | |
|       gfp_geometry_offset_on_axis[ d ] | i(32) |
| } | |
| if( gfp_geometry_rotation_params_present_flag ) { | |
|    gfp_geometry_rotation_x | i(16) |
|    gfp_geometry_rotation_y | i(16) |
|    gfp_geometry_rotation_z | i(16) |
|    gfp_geometry_rotation_w | i(16) |
| } | |
| if( gfp_geometry_point_size_info_present_flag ) { | |
|    gfp_geometry_point_size_info_minus1 | u(16) |
| } | |
| if( gfp_geometry_point_shape_info_present_flag ) { | |
|    gfp_geometry_point_shape_info | u(4) |
| } | |
| } | |

FIG. 37

| patch_frame_attribute_parameter_set( ) { | Descriptor |
|---|---|
| pfaps_attribute_frame_parameter_set_id | ue(v) |
| pfaps_patch_sequence_parameter_set_id | ue(v) |
| pfaps_attribute_dimension_minus1 | u(8) |
| attributeDimension = pfaps_attribute_dimension_minus1 + 1 | |
| if( ai_attribute_params_enabled_flag) { | |
| attribute_frame_params( attributeDimension ) | |
| } | |
| if( ai_attribute_patch_params_enabled_flag ) { | |
| pfaps_attribute_patch_scale_params_enabled_flag | u(1) |
| pfaps_attribute_patch_offset_params_enabled_flag | u(1) |
| } | |
| byte_alignment() | |
| } | |

| attribute_frame_params( attributeDimension ) { | Descriptor |
|---|---|
| for( i = 0; i < attributeDimension; i++ ) | |
| afp_attribute_smoothing_params_present_flag[ i ] | u(1) |
| afp_attribute_scale_params_present_flag | u(1) |
| afp_attribute_offset_params_present_flag | u(1) |
| for( i = 0; i < attributeDimension; i++ ) | |
| if( afp_attribute_smoothing_params_present_flag[ i ] ) { | |
| afp_attribute_smoothing_grid_size_minus2[ i ] | u(8) |
| afp_attribute_smoothing_threshold[ i ] | u(8) |
| afp_attribute_smoothing_local_entropy_threshold[ i ] | u(3) |
| afp_attribute_smoothing_threshold_attribute_variation[ i ] | u(8) |
| afp_attribute_smoothing_threshold_attribute_difference[ i ] | u(8) |
| } | |
| if( afp_attribute_scale_params_present_flag ) | |
| for( i = 0; i < attributeDimension; i++ ) | |
| afp_attribute_scale[ i ] | u(32) |
| if( afp_attribute_offset_params_present_flag ) | |
| for( i = 0; i < attributeDimension; i++ ) | |
| afp_attribute_offset[ i ] | i(32) |
| } | |

FIG. 38

| geometry_patch_parameter_set( ) { | Descriptor |
|---|---|
| gpps_geometry_patch_parameter_set_id | ue(v) |
| gpps_geometry_frame_parameter_set_id | ue(v) |
| if( gfps_geometry_patch_scale_params_enabled_flag \|\| |  |
| gfps_geometry_patch_offset_params_enabled_flag \|\| |  |
| gfps_geometry_patch_rotation_params_enabled_flag \|\| |  |
| gfps_geometry_patch_point_size_info_enabled_flag \|\| |  |
| gfps_geometry_patch_point_shape_info_enabled_flag ) { |  |
| gpps_geometry_patch_params_present_flag | u(1) |
| if( gpps_geometry_patch_params_present_flag ) |  |
| geometry_patch_params( ) |  |
| } |  |
| byte_alignment( ) |  |
| } |  |

| geometry_patch_params( ) { | Descriptor |
|---|---|
| if( gfps_geometry_patch_scale_params_enabled_flag ) { |  |
| gpp_geometry_patch_scale_params_present_flag | u(1) |
| if( gpp_geometry_patch_scale_params_present_flag ) |  |
| for( d = 0; d < 3; d++ ) |  |
| gpp_geometry_patch_scale_on_axis[ d ] | u(32) |
| } |  |
| if( gfps_geometry_patch_offset_params_enabled_flag ) { |  |
| gpp_geometry_patch_offset_params_present_flag | u(1) |
| if( gpp_geometry_patch_offset_params_present_flag ) |  |
| for( d = 0; d < 3; d++ ) |  |
| gpp_geometry_patch_offset_on_axis[ d ] | i(32) |
| } |  |
| if( gfps_geometry_patch_rotation_params_enabled_flag ) { |  |
| gpp_geometry_patch_rotation_params_present_flag | u(1) |
| if( gpp_geometry_patch_rotation_params_present_flag ) { |  |
| gpp_geometry_patch_rotation_x | i(16) |
| gpp_geometry_patch_rotation_y | i(16) |
| gpp_geometry_patch_rotation_z | i(16) |
| gpp_geometry_patch_rotation_w | i(16) |
| } |  |
| } |  |
| if( gfps_geometry_patch_point_size_info_enabled_flag ) { |  |
| gpp_geometry_patch_point_size_info_present_flag | u(1) |
| if( gpp_geometry_patch_point_size_info_present_flag ) |  |
| gpp_geometry_patch_point_size_info_minus1 | u(16) |
| } |  |
| if( gfps_geometry_patch_point_shape_info_enabled_flag ) { |  |
| gpp_geometry_patch_point_shape_info_present_flag | u(1) |
| if( gpp_geometry_patch_point_shape_info_present_flag ) |  |
| gpp_geometry_patch_point_shape_info | u(4) |
| } |  |
| } |  |

FIG. 39

| attribute_patch_parameter_set() { | Descriptor |
|---|---|
| apps_attribute_patch_parameter_set_id | ue(v) |
| apps_attribute_patch_frame_parameter_set_id | ue(v) |
| apps_attribute_dimension_minus1 | u(8) |
| attributeDimension = apps_attribute_dimension_minus1 + 1 | |
| if( afps_attribute_patch_scale_params_enabled_flag \|\| afps_attribute_patch_offset_params_enabled_flag ) { | |
| apps_attribute_patch_params_present_flag | u(1) |
| if( apps_attribute_patch_params_present_flag ) | |
| attribute_patch_params( attributeDimension ) | |
| } | |
| byte_alignment( ) | |
| } | |

| attribute_patch_params( attributeDimension ) { | Descriptor |
|---|---|
| if( afps_attribute_patch_scale_params_enabled_flag ) { | |
| app_attribute_patch_scale_params_present_flag | u(1) |
| if( app_attribute_patch_scale_params_present_flag ) | |
| for( i = 0; i < attributeDimension; i++ ) | |
| app_attribute_patch_scale[ i ] | u(32) |
| } | |
| if( afps_attribute_patch_offset_params_enabled_flag ) { | |
| app_attribute_patch_offset_params_present_flag | u(1) |
| if( app_attribute_patch_offset_params_present_flag ) | |
| for( i = 0; i < attributeDimension; i++ ) | |
| app_attribute_patch_offset[ i ] | i(32) |
| } | |
| } | |

FIG. 40

| patch_frame_parameter_set( ) { | Descriptor |
|---|---|
| pfps_patch_frame_parameter_set_id | ue(v) |
| pfps_patch_sequence_parameter_set_id | ue(v) |
| pfps_geometry_patch_parameter_set_id | ue(v) |
| for( i = 0; i < ai_attribute_count; i++ ) |  |
| pfps_attribute_patch_parameter_set_id[ i ] | ue(v) |
| patch_frame_tile_information() |  |
| pfps_local_override_geometry_patch_enable_flag | u(1) |
| for( i = 0; i < ai_attribute_count; i++ ) { |  |
| pfps_local_override_attribute_patch_enable_flag[ i ] | u(1) |
| } |  |
| pfps_additional_lt_pfoc_lsb_len | ue(v) |
| if( sps_45degree_projection_patch_enabled_flag ) |  |
| pfps_45degree_projection_patch_enabled_flag | u(1) |
| byte_alignment() |  |
| } |  |

| patch_frame_tile_information( ) { | Descriptor |
|---|---|
| pfti_single_tile_in_patch_frame_flag | u(1) |
| if( pfti_single_tile_in_patch_frame_flag ) { |  |
| pfti_uniform_tile_spacing_flag | u(1) |
| if( pfti_uniform_tile_spacing_flag ) { |  |
| pfti_tile_col_width_minus1 | ue(v) |
| pfti_tile_row_height_minus1 | ue(v) |
| } else { |  |
| pfti_num_tile_columns_minus1 | ue(v) |
| pfti_num_tile_rows_minus1 | ue(v) |
| for( i = 0; i < pfti_num_tile_columns_minus1; i++ ) |  |
| pfti_tile_column_width_minus1[ i ] | ue(v) |
| for( i = 0; i < pfti_num_tile_rows_minus1; i++ ) |  |
| pfti_tile_row_height_minus1[ i ] | ue(v) |
| } |  |
| pfti_single_tile_per_tile_group_flag | u(1) |
| if( !pfti_single_tile_per_tile_group_flag ) { |  |
| pfti_num_tile_groups_in_patch_frame_minus1 | ue(v) |
| for( i = 0; i <= pfti_num_tile_groups_in_patch_frame_minus1; i++ ) { |  |
| if( i > 0 ) |  |
| pfti_top_left_tile_idx[ i ] | u(v) |
| pfti_bottom_right_tile_idx_delta[ i ] | u(v) |
| } |  |
| } |  |
| pfti_signalled_tile_group_id_flag | u(1) |
| if( pfti_signalled_tile_group_id_flag ) { |  |
| pfti_signalled_tile_group_id_length_minus1 | ue(v) |
| for( i = 0; i <= pfti_num_tile_groups_in_patch_frame_minus1; i++ ) |  |
| pfti_tile_group_id[ i ] | u(v) |
| } |  |
| } |  |

FIG. 41

| | Descriptor |
|---|---|
| patch_tile_group_header( ) { | |
| ptgh_patch_frame_parameter_set_id | ue(v) |
| ptgh_address | u(v) |
| ptgh_type | ue(v) |
| ptgh_patch_frm_order_cnt_lsb | u(v) |
| if( psps_num_ref_patch_frame_lists_in_psps > 0 ) | |
| ptgh_ref_patch_frame_list_sps_flag | u(1) |
| if( ptgh_ref_patch_frame_list_sps_flag ) | |
| if( psps_num_ref_patch_frame_lists_in_psps > 1 ) | |
| ptgh_ref_patch_frame_list_idx | u(v) |
| else | |
| ref_list_struct( psps_num_ref_patch_frame_lists_in_psps ) | |
| for( j = 0; j < NumLtrPatchFrmEntries; j++ ) { | |
| ptgh_additional_pfoc_lsb_present_flag[ j ] | u(1) |
| if( ptgh_additional_pfoc_lsb_present_flag[ j ] ) | |
| ptgh_additional_pfoc_lsb_val[ j ] | u(v) |
| } | |
| if( psps_normal_axis_limits_quantization_enable_flag ) { | |
| ptgh_normal_axis_min_value_quantizer | u(5) |
| if( psps_normal_axis_max_delta_value_enable_flag ) | |
| ptgh_normal_axis_max_delta_value_quantizer | u(5) |
| } | |
| if( ptgh_type == P && num_ref_entries[ RlsIdx ] > 1 ) { | |
| ptgh_num_ref_idx_active_override_flag | u(1) |
| if( ptgh_num_ref_idx_active_override_flag ) | |
| ptgh_num_ref_idx_active_minus1 | ue(v) |
| } | |
| if( ptgh_type == I ){ | |
| ptgh_2d_shift_u_bit_count_minus1 | u(8) |
| ptgh_2d_shift_v_bit_count_minus1 | u(8) |
| ptgh_3d_shift_tangent_axis_bit_count_minus1 | u(8) |
| ptgh_3d_shift_bitangent_axis_bit_count_minus1 | u(8) |
| ptgh_lod_bit_count | u(8) |
| } else { | |
| ptgh_inter_predict_bit_count_flag | u(1) |
| if( ptgh_inter_predict_bit_count_flag ) { | |
| ptgh_inter_predict_2d_shift_u_bit_count_flag | u(1) |
| if( !ptgh_inter_predict_2d_shift_u_bit_count_flag ) | |
| ptgh_2d_shift_u_bit_count_minus1 | u(8) |
| ptgh_inter_predict_2d_shift_v_bit_count_flag | u(1) |
| if( !ptgh_inter_predict_2d_shift_v_bit_count_flag ) | |
| ptgh_2d_shift_v_bit_count_minus1 | u(8) |
| ptgh_inter_predict_3d_shift_tangent_axis_bit_count_flag | u(1) |
| if( !ptgh_inter_predict_3d_shift_tangent_axis_bit_count_flag ) | |
| ptgh_3d_shift_tangent_axis_bit_count_minus1 | u(8) |
| ptgh_inter_predict_3d_shift_bitangent_axis_bit_count_flag | u(1) |
| if( !ptgh_inter_predict_3d_shift_bitangent_axis_bit_count_flag ) | |
| ptgh_3d_shift_bitangent_axis_bit_count_minus1 | u(8) |
| ptgh_inter_predict_lod_bit_count_flag | u(1) |
| if( !ptgh_inter_predict_lod_bit_count_flag ) | |
| ptgh_lod_bit_count | u(8) |
| } | |
| } | |
| if( sps_pcm_patch_enabled_flag ) { | |
| ptgh_pcm_3d_shift_bit_count_flag | u(1) |
| if( ptgh_pcm_3d_shift_bit_count_flag ) | |
| ptgh_pcm_3d_shift_axis_bit_count_minus1 | u(v) |
| } | |
| byte_alignment( ) | |
| } | |

FIG. 42

| ref_list_struct( rlsidx ) { | Descriptor |
|---|---|
|   num_ref_entries[ rlsidx ] | ue(v) |
|   for( i = 0; i < num_ref_entries[ rlsidx ]; i++ ) { | |
|     if( psps_long_term_ref_patch_frames_flag ) | |
|       st_ref_patch_frame_flag[ rlsidx ][ i ] | u(1) |
|     if( st_ref_patch_frame_flag[ rlsIdx ][ i ] ) { | |
|       abs_delta_pfoc_st[ rlsidx ][ i ] | ue(v) |
|       if( abs_delta_pfoc_st[ rlsIdx ][ i ] > 0 ) | |
|         strpf_entry_sign_flag[ rlsidx ][ i ] | u(1) |
|     } else | |
|       pfoc_lsb_lt[ rlsidx ][ i ] | u(v) |
|   } | |
| } | |

FIG. 43

| patch_tile_group_data_unit( ) { | Descriptor |
|---|---|
|   p = 0 | |
|   ptgdu_patch_mode[ p ] | ue(v) |
|   while( ptgdu_patch_mode[ p ] !=I_END && ptgdu_patch_mode[ p ] != P_END){ | |
|     patch_information_data( p, ptgdu_patch_mode[ p ]) | |
|     p ++ | |
|     ptgdu_patch_mode[ p ] | ue(v) |
|   } | |
|   PtgduTotalNumberOfPatches = p | |
|   byte_alignment( ) | |
| } | |
| patch_information_data ( patchIndex, patch_mode ) ( ) { | Descriptor |
|   if(patch_mode == P_SKIP ) { | |
|   } | |
|   else if(patch_mode == I_INTRA  \|\| patch_mode == P_INTRA) { | |
|     if( pfps_local_override_geometry_patch_enable_flag ) { | |
|       pid_override_geometry_patch_flag[ patchIndex ] | u(1) |
|       if( pid_override_geometry_patch_flag[ patchIndex ]) | |
|         pid_geometry_patch_parameter_set_id[ patchIndex ] | ue(v) |
|     } | |
|     for( i = 0; i < ai_attribute_count; i++ ) | |
|       if( pfps_local_override_attribute_patch_enable_flag[ i ] ) { | |
|         pid_override_attribute_patch_flag[ patchIndex ][ i ] | u(1) |
|         if( pid_override_attribute_patch_flag[ patchIndex ][ i ] ) | |
|           pid_attribute_patch_parameter_set_id[ patchIndex ][ i ] | ue(v) |
|       } | |
|     patch_data_unit( patchIndex ) | |
|   } | |
|   else if( patch_mode == P_INTER) | |
|     delta_patch_data_unit( patchIndex ) | |
|   else if(patch_mode == I_PCM  \|\| patch_mode == P_PCM ) | |
|     pcm_patch_data_unit( patchIndex ) | |
| } | |

FIG. 44

| patch_data_unit( patchIndex ) { | Descriptor |
|---|---|
| pdu_2d_shift_u[ patchIndex ] | u(v) |
| pdu_2d_shift_v[ patchIndex ] | u(v) |
| pdu_2d_delta_size_u[ patchIndex ] | se(v) |
| pdu_2d_delta_size_v[ patchIndex ] | se(v) |
| pdu_3d_shift_tangent_axis[ patchIndex ] | u(v) |
| pdu_3d_shift_bitangent_axis[ patchIndex ] | u(v) |
| pdu_3d_shift_min_normal_axis[ patchIndex ] | u(v) |
| if( psps_normal_axis_max_delta_value_enable_flag ) | |
|    pdu_3d_shift_delta_max_normal_axis[ patchIndex ] | u(v) |
| pdu_projection_plane[ patchIndex ] | u(3) |
| if( psps_use_eight_orientations_flag ) | |
|    pdu_orientation_index[ patchIndex ] | u(3) |
| else | |
|    pdu_orientation_index[ patchIndex ] | u(1) |
| if( pgh_lod_bit_count > 0 ) | |
|    pdu_lod[ patchIndex ] | u(v) |
| if( pfps_45degree_projection_patch_enabled_flag ) | |
|    pdu_45degree_projection_present_flag[ patchIndex ] | u(1) |
| if( pdu_45degree_projection_present_flag[ patchIndex ] ) | |
|    pdu_45degree_projection_rotation_axis[ patchIndex ] | u(2) |
| if( sps_point_local_reconstruction_enabled_flag ) | |
|    point_local_reconstruction_data( patchIndex ) | |
| } | |

| delta_patch_data_unit( patchIndex ) { | Descriptor |
|---|---|
| dpdu_patch_index[ patchIndex ] | se(v) |
| dpdu_2d_shift_u[ patchIndex ] | se(v) |
| dpdu_2d_shift_v[ patchIndex ] | se(v) |
| dpdu_2d_delta_size_u[ patchIndex ] | se(v) |
| dpdu_2d_delta_size_v[ patchIndex ] | se(v) |
| dpdu_3d_shift_tangent_axis[ patchIndex ] | se(v) |
| dpdu_3d_shift_bitangent_axis[ patchIndex ] | se(v) |
| dpdu_3d_shift_min_normal_axis[ patchIndex ] | se(v) |
| if( psps_normal_axis_max_delta_value_enable_flag ) | |
|    dpdu_3d_shift_delta_max_normal_axis[ patchIndex ] | se(v) |
| if( sps_point_local_reconstruction_enabled_flag ) | |
|    point_local_reconstruction_data( patchIndex ) | |
| } | |

FIG. 45

| pcm_patch_data_unit( patchIndex ) { | Descriptor |
|---|---|
|     if(sps_pcm_separate_video_flag) | |
|         ppdu_patch_in_pcm_video_flag[ patchIndex ] | u(1) |
|     ppdu_2d_shift_u[ patchIndex ] | u(v) |
|     ppdu_2d_shift_v[ patchIndex ] | u(v) |
|     ppdu_2d_delta_size_u[ patchIndex ] | se(v) |
|     ppdu_2d_delta_size_v[ patchIndex ] | se(v) |
|     ppdu_3d_pcm_shift_tangent_axis[ patchIndex ] | u(v) |
|     ppdu_3d_pcm_shift_bitangent_axis[ patchIndex ] | u(v) |
|     ppdu_3d_pcm_shift_normal_axis[ patchIndex ] | u(v) |
|     ppdu_pcm_points[ patchIndex ] | ue(v) |
| } | |

FIG. 46

| sei_message( ) { | Descriptor |
|---|---|
|     payloadType = 0 | |
|     do { | |
|         sm_payload_type_byte | u(8) |
|         payloadType += sm_payload_type_byte | |
|     } while( sm_payload_type_byte == 0xFF ) | |
|     payloadSize = 0 | |
|     do{ | |
|         sm_payload_size_byte | u(8) |
|         payloadSize += sm_payload_size_byte | |
|     } while( sm_payload_size_byte == 0xFF ) | |
|     sei_payload( payloadType, payloadSize ) | |
| } | |

FIG. 47

| | Descriptor |
|---|---|
| point_local_reconstruction_data( patchIdx ) { | |
| for( i = 0; i < asps_map_count_minus1 + 1; i++ ) { | |
| if( plri_point_local_reconstruction_map_flag[ i ] ) { | |
| if( BlockCount > plri_block_threshold_per_patch_minus1[ i ] + 1 ) | |
| plrd_level[ i ][ patchIdx ] | u(1) |
| else | |
| plrd_level[ i ][ patchIdx ] = 1 | |
| if( plrd_level[ i ][ patchIdx ] == 0 ) { | |
| for( j = 0; j < BlockCount; j++ ) { | |
| plrd_present_block_flag[ i ][ patchIdx ][ j ] | u(1) |
| if( plrd_present_block_flag[ i ][ patchIdx ][ j ] ) { | |
| plrd_block_mode_minus1[ i ][ patchIdx ][ j ] | u(v) |
| } | |
| } | |
| } else { | |
| plrd_present_flag[ i ][ patchIdx ] | u(1) |
| if( plrd_present_flag[ i ][ patchIdx ] ) | |
| plrd_mode_minus1[ i ][ patchIdx ] | u(v) |
| } | |
| } | |
| } | |
| } | |

APPARATUS FOR TRANSMITTING POINT CLOUD DATA, A METHOD FOR TRANSMITTING POINT CLOUD DATA, AN APPARATUS FOR RECEIVING POINT CLOUD DATA AND A METHOD FOR RECEIVING POINT CLOUD DATA

This application claims priority to U.S. Provisional Application No. 62/870,770 filed on Jul. 4, 2019, which hereby incorporated by reference in its entirety as if fully set forth herein.

TECHNICAL FIELD

Embodiments provide a method for providing point cloud contents to provide a user with various services such as virtual reality (VR), augmented reality (AR), mixed reality (MR), and self-driving services.

BACKGROUND ART

A point cloud is a set of points in a three-dimensional (3D) space. It is difficult to generate point cloud data because the number of points in the 3D space is large.

A large throughput is required to transmit and receive data of a point cloud.

DISCLOSURE

Technical Problem

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

The technical scope of some embodiments is not limited to the aforementioned technical objects, and may be extended to other technical objects that can be inferred by those skilled in the art based on the entire contents of this document.

Technical Solution

To achieve these objects and other advantages and in accordance with the purpose of the disclosure, as embodied and broadly described herein, a method of transmitting point cloud data in accordance with embodiments may include encoding point cloud data, and/or transmitting a bitstream containing the encoded point cloud data and metadata for the point cloud data.

Further, in accordance with embodiments, the encoded point cloud data may include geometry data and attribute data.

Further, the encoded point cloud data may include one or more samples carrying geometry data and attribute data, wherein the encoding may be performed based on a specific encoding scheme.

The metadata in accordance with some embodiments may further include information indicating whether the geometry or attribute data constituting the samples is encoded based on the specific encoding scheme.

Further, in accordance with embodiments, the geometry data and attribute data encoded based on the specific scheme may be included in one sample, or may be included in different samples.

In accordance with embodiments, the specific encoding scheme may be pulse coding modulation (PCM).

In accordance with embodiments, the metadata may include a track and a track reference type box (TrackReferenceTypeBox) for referencing point cloud data corresponding to the track, wherein the track reference type box may include reference type information indicating a type of the point cloud data corresponding to the track.

In accordance with embodiments, the reference type information may further indicate whether the point cloud data corresponding to the track is encoded based on a specific scheme.

In another aspect of the present disclosure, a method of receiving point cloud data in accordance with embodiments may include receiving a bitstream containing point cloud data and metadata, and/or decoding the point cloud data.

Further, in accordance with embodiments, the point cloud data may include one or more samples carrying geometry data and attribute data. Further, the geometry data and attribute data may be data encoded in accordance with a specific scheme, wherein the specific encoding scheme may be, for example, pulse coding modulation (PCM).

The metadata in accordance with some embodiments may further include information indicating whether the geometry or attribute data constituting the samples is encoded based on the specific encoding scheme.

Advantageous Effects

A point cloud data transmission method, a point cloud data transmission device, a point cloud data reception method, and a point cloud data reception device in accordance with embodiments may provide a good-quality point cloud service.

A point cloud data transmission method, a point cloud data transmission device, a point cloud data reception method, and a point cloud data reception device in accordance with embodiments may achieve various video codec methods.

A point cloud data transmission method, a point cloud data transmission device, a point cloud data reception method, and a point cloud data reception device in accordance with embodiments may provide universal point cloud content such as a self-driving service.

A point cloud data transmission method and a point cloud data transmission device in accordance with embodiments may efficiently encode data (geometry data, attribute data, and/or occupancy data) of points missing in the process of encoding point cloud data.

A point cloud data reception method and a point cloud data reception device in accordance with embodiments may efficiently receive and reconstruct data (geometry data, attribute data, and/or occupancy data) of points missing in the process of encoding point cloud data.

A point cloud data transmission method and a point cloud data transmission device in accordance with embodiments may signal whether to deliver point cloud data encoded by a specific scheme (e.g., PCM) in a single track or in multiple tracks. Accordingly, decoding may be adaptively performed in accordance with the performance of the receiver.

A point cloud data reception method and a point cloud data reception device in accordance with embodiments may perform decoding based information indicating whether point cloud data encoded by a specific scheme (e.g., PCM) is delivered in a single track or in multiple tracks. Accordingly, decoding may be adaptively performed in accordance with the performance of the receiver.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates capture of point cloud data in accordance with embodiments;

FIG. 29 illustrates an exemplary method for transmitting PCM data in accordance with embodiments;

FIG. 30 illustrates another exemplary method for transmitting PCM data through point cloud data in accordance with embodiments;

FIG. 31 shows the syntax of a V-PCC unit header in accordance with embodiments;

FIG. 32 shows the syntax of a V-PCC unit payload in accordance with some embodiments;

FIG. 33 shows the syntax of sequence parameter set data in accordance with embodiments;

FIG. 34 shows the syntax of a patch data group (PDG) in accordance with embodiments;

FIG. 35 shows the syntax of a patch sequence parameter set in accordance with embodiments;

FIG. 36 shows a patch frame geometry parameter set in accordance with embodiments;

FIG. 37 shows a patch frame attribute parameter set in accordance with embodiments;

FIG. 38 shows a geometry patch parameter set in accordance with embodiments;

FIG. 39 shows an attribute patch parameter set in accordance with embodiments;

FIG. 40 shows a patch frame parameter set in accordance with embodiments;

FIG. 41 shows a patch tile group header included in a patch tile group layer unit in accordance with embodiments;

FIG. 42 shows a reference list structure in accordance with embodiments;

FIG. 43 shows a patch tile group data unit in accordance with embodiments;

FIG. 44 shows a patch data unit in the patch tile group data unit in accordance with embodiments;

FIG. 45 shows a patch data unit in the patch tile group data unit in accordance with embodiments;

FIG. 46 shows a supplemental enhancement information (SEI) message in accordance with some embodiments;

FIG. 47 shows point local reconstruction data in accordance with embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented in accordance with the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
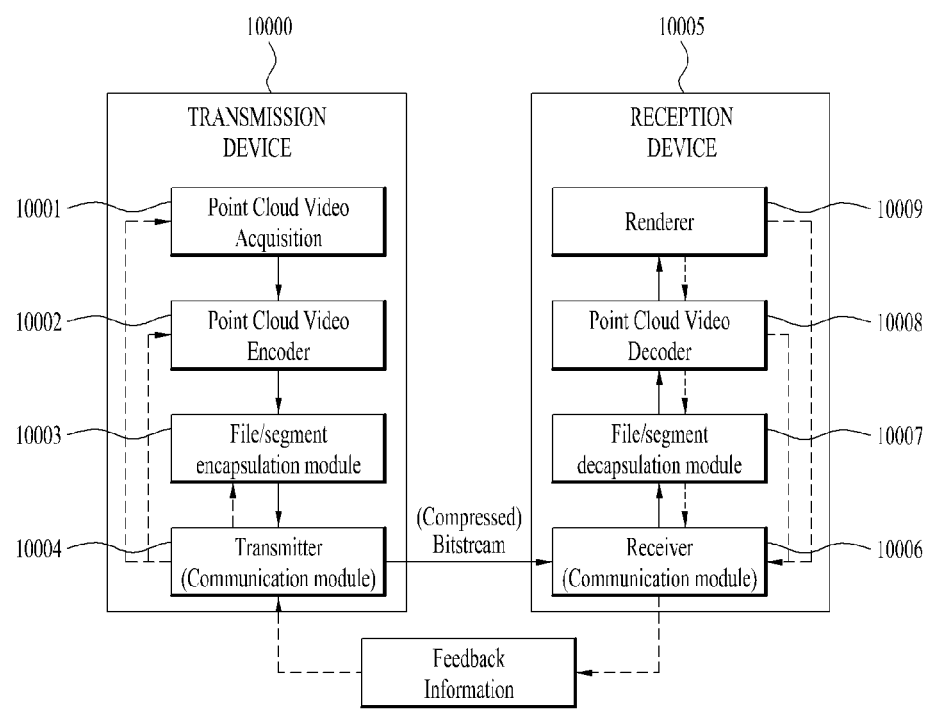
FIG. 1 illustrates an exemplary structure of a transmission/reception system for providing point cloud content in accordance with embodiments.

FIG. 1 illustrates an exemplary structure of a transmission/reception system for providing point cloud content in accordance with embodiments.

The present disclosure provides a method of providing point cloud content to provide a user with various services such as virtual reality (VR), augmented reality (AR), mixed reality (MR), and self-driving. The point cloud content in accordance with some embodiments represent data representing objects as points, and may be referred to as a point cloud, point cloud data, point cloud video data, point cloud image data, or the like.

A point cloud data transmission device 10000 in accordance with embodiment may include a point cloud video acquirer 10001, a point cloud video encoder 10002, a file/segment encapsulation module 10003, and/or a transmitter (or communication module) 10004. The transmission device in accordance with some embodiments may secure and process point cloud video (or point cloud content) and transmit the same. In accordance with embodiments, the transmission device may include a fixed station, a base transceiver system (BTS), a network, an artificial intelligence (AI) device and/or system, a robot, and an AR/VR/XR device and/or a server. In accordance with embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquirer 10001 in accordance with some embodiments acquires a point cloud video through a process of capturing, synthesizing, or generating a point cloud video.

The point cloud video encoder 10002 in accordance with some embodiments encodes the point cloud video data. In accordance with embodiments, the point cloud video encoder 10002 may be referred to as a point cloud encoder, a point cloud data encoder, an encoder, or the like. The point cloud compression coding (encoding) in accordance with some embodiments is not limited to the above-described embodiment. The point cloud video encoder may output a bitstream including the encoded point cloud video data. The bitstream may include not only the encoded point cloud video data, but also signaling information related to encoding of the point cloud video data.

The encoder in accordance with some embodiments may support both the geometry-based point cloud compression (G-PCC) encoding scheme and/or the video-based point cloud compression (V-PCC) encoding scheme. In addition, the encoder may encode a point cloud (referring to either point cloud data or points) and/or signaling data related to the point cloud. The specific operation of encoding in accordance with embodiments will be described below.

As used herein, the term V-PCC may mean Video-based Point Cloud Compression (V-PCC). The term V-PCC may be the same as Visual Volumetric Video-based Coding (V3C). The terms may be complementarily used.

The file/segment encapsulation module 10003 in accordance with some embodiments encapsulates the point cloud data in the form of a file and/or segment form. The point cloud data transmission method/device in accordance with some embodiments may transmit the point cloud data in a file and/or segment form.

The transmitter (or communication module) 10004 in accordance with some embodiments transmits the encoded point cloud video data in the form of a bitstream. In accordance with embodiments, the file or segment may be transmitted to a reception device over a network, or stored in a digital storage medium (e.g., USB, SD, CD, DVD, Blu-ray, HDD, SSD, etc.). The transmitter in accordance with some embodiments is capable of wired/wireless communication with the reception device (or the receiver) over a network of 4G, 5G, 6G, etc. In addition, the transmitter may perform necessary data processing operation in accordance with the network system (e.g., a 4G, 5G or 6G communication network system). The transmission device may transmit the encapsulated data in an on-demand manner.

A point cloud data reception device 10005 in accordance with some embodiments may include a receiver 10006, a file/segment decapsulation module 10007, a point cloud video decoder 10008, and/or a renderer 10009. In accordance with embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 in accordance with some embodiments receives a bitstream containing point cloud video data. In accordance with embodiments, the receiver 10006 may transmit feedback information to the point cloud data transmission device 10000.

The file/segment decapsulation module 10007 decapsulates a file and/or a segment containing point cloud data. The decapsulation module in accordance with some embodiments may perform a reverse process of the encapsulation process in accordance with some embodiments.

The point cloud video decoder 10008 decodes the received point cloud video data. The decoder in accordance with some embodiments may perform a reverse process of encoding in accordance with some embodiments.

The renderer 10009 renders the decoded point cloud video data. In accordance with embodiments, the renderer 10009 may transmit the feedback information obtained at the reception side to the point cloud video decoder 10008. The point cloud video data in accordance with some embodiments may carry feedback information to the receiver. In accordance with embodiments, the feedback information received by the point cloud transmission device may be provided to the point cloud video encoder.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., self-driving service, etc.) that requires interaction with a user, the feedback information may be provided to the content transmitting side (e.g., the transmission device 10000) and/or the service provider. In accordance with embodiments, the feedback information may be used in the reception device 10005 as well as the transmission device 10000, and may not be provided.

The head orientation information in accordance with embodiments is information about a user's head position, orientation, angle, motion, and the like. The reception device 10005 in accordance with some embodiments may calculate viewport information based on the head orientation information. The viewport information may be information about a region of the point cloud video that the user is viewing. A viewpoint is a point where a user is viewing a point cloud video, and may refer to a center point of the viewport region. That is, the viewport is a region centered on the viewpoint, and the size and shape of the region may be determined by a field of view (FOV). Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. In accordance with embodiments, the reception device 10005 may transmit feedback information including the result of the gaze analysis to the transmission device 10000. The feedback information in accordance with some embodiments may be acquired in the rendering and/or display process. The feedback information in accordance with some embodiments may be secured by one or more sensors included in the reception device 10005. In addition, in accordance with embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device. The transmission device (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

In accordance with embodiments, the transmission device 10000 may be called an encoder, a transmission device, a transmitter, or the like, and the reception device 10005 may be called a decoder, a reception device, a receiver, or the like.

The point cloud data processed in the point cloud content providing system of FIG. 1 in accordance with embodiments (through a series of processes of acquisition/encoding/transmission/decoding/rendering) may be referred to as point cloud content data or point cloud video data. In accordance with embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and self-driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

In accordance with embodiments, the process of providing point cloud content (or point cloud data) may be referred to as a point cloud compression process. In accordance with embodiments, the point cloud compression process may represent a geometry-based point cloud compression process.

Each element of the point cloud data transmission device and the point cloud data reception device in accordance with some embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

In accordance with embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the stanford triangle format) file may be generated. For a video having multiple frames, one or more files may be acquired. During the capture process, point cloud related metadata (e.g., capture related metadata) may be generated.

A point cloud data transmission device in accordance with embodiments may include an encoder configured to encode point cloud data, and a transmitter configured to transmit the point cloud data. The data may be transmitted in the form of a bitstream containing a point cloud.

A point cloud data reception device in accordance with embodiments may include a receiver configured to receive point cloud data, a decoder configured to decode the point cloud data, and a renderer configured to render the point cloud data.

The method/device in accordance with some embodiments represents the point cloud data transmission device and/or the point cloud data reception device.

FIG. 2 illustrates capture of point cloud data in accordance with embodiments.

Point cloud data in accordance with embodiments may be acquired by a camera or the like. A capturing technique in accordance with embodiments may include, for example, inward-facing and/or outward-facing.

In the inward-facing in accordance with some embodiments, one or more cameras inwardly facing an object of point cloud data may photograph the object from the outside of the object.

In the outward-facing in accordance with some embodiments, one or more cameras outwardly facing an object of point cloud data may photograph the object. For example, in accordance with embodiments, there may be four cameras.

The point cloud data or the point cloud content in accordance with some embodiments may be a video or a still image of an object/environment represented in various types of 3D spaces. In accordance with embodiments, the point cloud content may include video/audio/an image of an object.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as self-driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In accordance with some embodiments, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 10003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as ISOBMFF or process the same in the form of a DASH segment or the like. In accordance with an embodiment, the encapsulation processor may include the point cloud video-related metadata in the file format. The point cloud video metadata may be included, for example, in boxes at various levels on the ISOBMFF file format or as data in a separate track within the file. In accordance with an embodiment, the encapsulation processor may encapsulate the point cloud video-related metadata into a file. The transmission processor may perform processing for transmission on the point cloud video data encapsulated in accordance with the file format. The transmission processor may be included in the transmitter or may be configured as a separate component/module. The transmission processor may process the point cloud video data in accordance with a transmission protocol. The processing for transmission may include processing for delivery over a broadcast network and processing for delivery through a broadband. In accordance with an embodiment, the transmission processor may receive point cloud video-related metadata from the metadata processor along with the point cloud video data, and perform processing of the point cloud video data for transmission.

The transmitter 10004 may transmit the encoded video/image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 10006 may receive point cloud video data transmitted by the point cloud video transmission device in accordance with the present disclosure. Depending on the transmission channel, the receiver may receive the point cloud video data over a broadcast network or through a broadband. Alternatively, the point cloud video data may be received through a digital storage medium.

The reception processor may process the received point cloud video data in accordance with the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 10007 may decapsulate the point cloud video data received in the form of a file from the reception processor. The decapsulation processor may decapsulate the files in accordance with ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In accordance with some embodiments, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. In accordance with an embodiment, head orientation information, viewport information indicating a region currently viewed by a user, and the like may be delivered to the transmission side in the feedback process. In accordance with an embodiment, the user may interact with things implemented in the VR/AR/MR/self-driving environment. In accordance with some embodiments, information related to the interaction may be delivered to the transmission side or a service provider during the feedback process. In accordance with an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/ direction of the user's head, vertical or horizontal FOV supported by the device, and the like.

In accordance with an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/ embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

Figure 3:
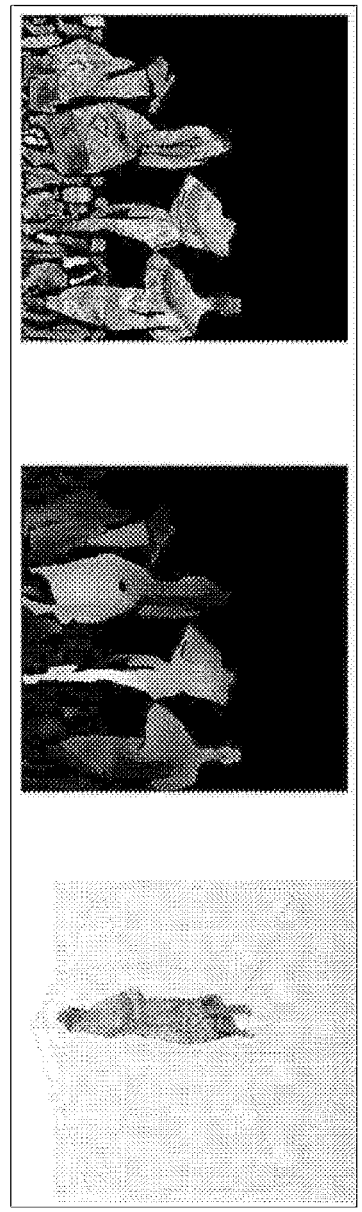
FIG. 3 illustrates an exemplary point cloud, geometry, and texture image in accordance with embodiments.

FIG. 3 illustrates an example of a point cloud, a geometry image, and a texture image in accordance with embodiments.

A point cloud in accordance with some embodiments may be input to the V-PCC encoding process of FIG. 4, which will be described later, to generate a geometric image and a texture image. In accordance with embodiments, a point cloud may have the same meaning as point cloud data.

As shown in the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) in accordance with embodiments may provide a method of compressing 3D point cloud data based on a 2D video codec such as HEVC or VVC. Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to ATLAS, and the values of the occupancy map may indicate whether each sample position in the atlas corresponds to a 3D point. ATLAS means an object including information about 2D patches for each point cloud frame. For example, ATLAS may include 2D arrangement and size of patches, the position of a corresponding 3D region within a 3D point, a projection plan, and a level of detail parameters.

Patch: A set of points constituting a point cloud, which indicates that points belonging to the same patch are adjacent to each other in 3D space and are mapped in the same direction among 6-face bounding box planes in the process of mapping to a 2D image.

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. In accordance with embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

Point cloud data in accordance with some embodiments, for example, V-PCC components may include an atlas, an occupancy map, geometry, and attributes.

Atlas represents a set of 2D bounding boxes. It may be patches, for example, patches projected onto a rectangular frame. Atlas may correspond to a 3D bounding box in a 3D space, and may represent a subset of a point cloud.

An attribute may represent a scalar or vector associated with each point in the point cloud. For example, the attributes may include color, reflectance, surface normal, time stamps, material ID.

The point cloud data in accordance with some embodiments represents PCC data in accordance with video-based point cloud compression (V-PCC) scheme. The point cloud data may include a plurality of components. For example, it may include an occupancy map, a patch, geometry and/or texture.

Figure 4:
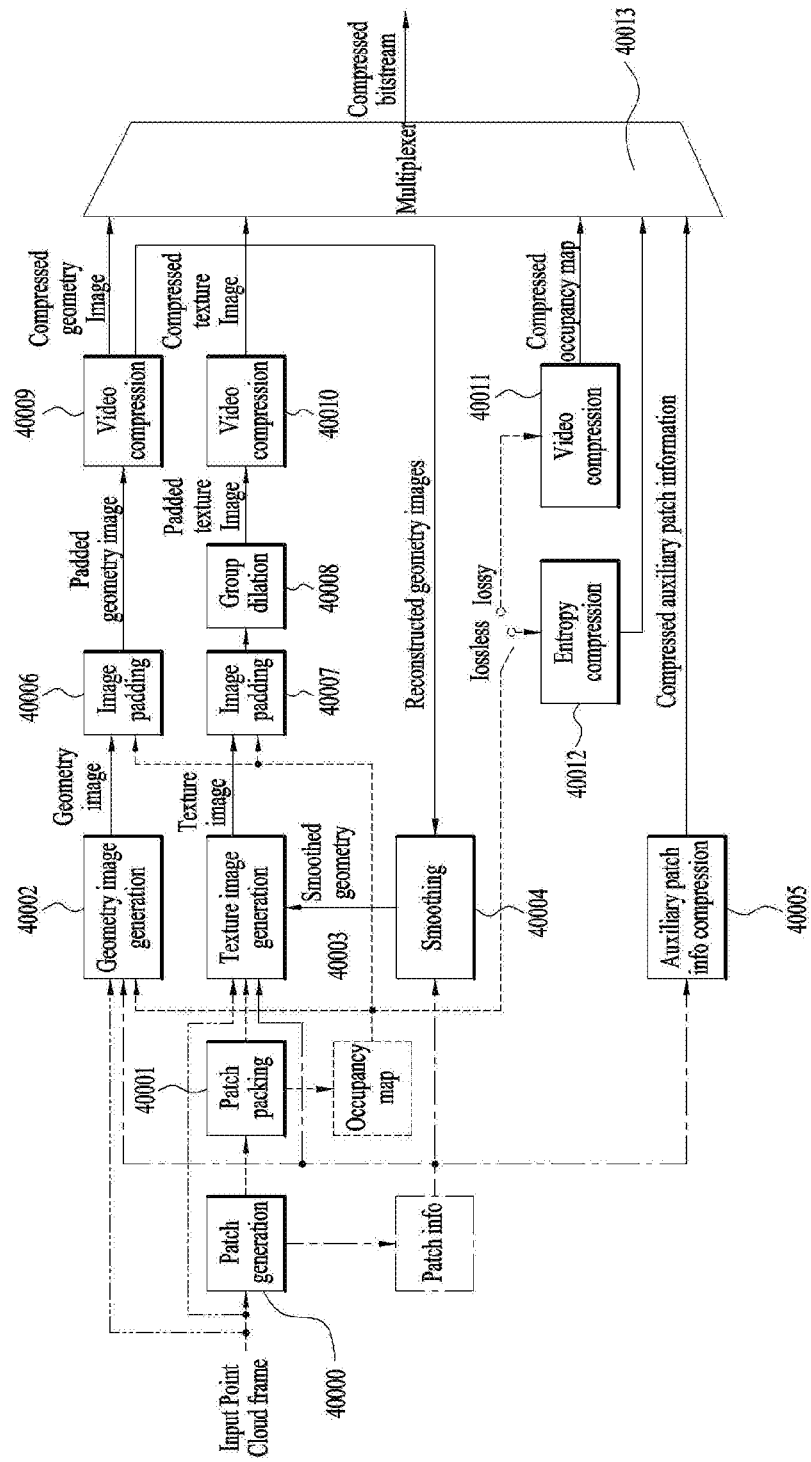
FIG. 4 illustrates an exemplary V-PCC encoding process in accordance with embodiments.

FIG. 4 illustrates a V-PCC encoding process in accordance with embodiments.

The figure illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs patches for point cloud data. For example, one or more patches may be packed. In addition, the patch packer generates an occupancy map containing information about patch packing.

The geometry image generation or geometry image generator 40002 generates a geometry image based on the point cloud data, patches, and/or packed patches. The geometry image refers to data containing geometry related to the point cloud data.

The texture image generation or texture image generator 40003 generates a texture image based on the point cloud data, patches, and/or packed patches. In addition, the texture image may be generated further based on smoothed geometry generated by smoothing processing of smoothing based on the patch information.

The smoothing or smoother 40004 may mitigate or eliminate errors contained in the image data. For example, based on the patched reconstructed geometry image, portions that may cause errors between data may be smoothly filtered out to generate smoothed geometry.

The auxiliary patch info compression or auxiliary patch info compressor 40005, auxiliary patch information related to the patch information generated in the patch generation is compressed. In addition, the compressed auxiliary patch information may be transmitted to the multiplexer. The auxiliary patch information may be used in the geometry image generation 40002.

The image padding or image padder 40006, 40007 may pad the geometry image and the texture image, respectively. The padding data may be padded to the geometry image and the texture image.

The group dilation or group dilator 40008 may add data to the texture image in a similar manner to image padding. The added data may be inserted into the texture image.

The video compression or video compressor 40009, 40010, 40011 may compress the padded geometry image, the padded texture image, and/or the occupancy map, respectively. The compression may encode geometry information, texture information, occupancy information, and the like.

The entropy compression or entropy compressor 40012 may compress (e.g., encode) the occupancy map based on an entropy scheme.

In accordance with embodiments, the entropy compression and/or video compression may be performed, respectively depending on whether the point cloud data is lossless and/or lossy.

The multiplexer 40013 multiplexes the compressed geometry image, the compressed texture image, and the compressed occupancy map into a bitstream.

The specific operations in the respective processes of FIG. 4 are described below.

Patch Generation 40000

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
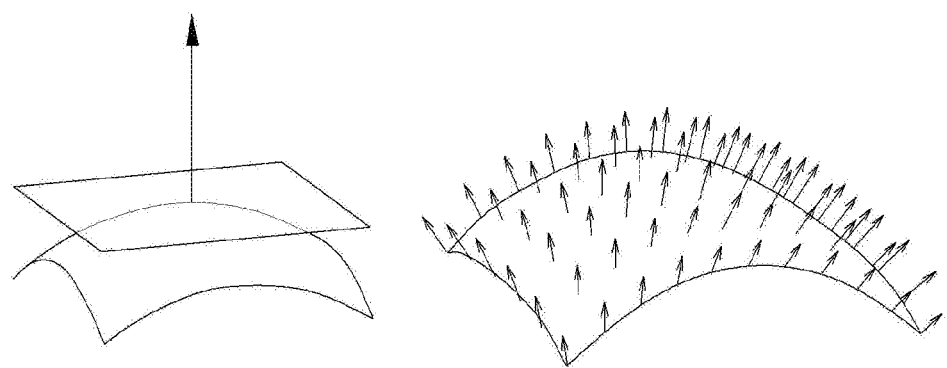
FIG. 5 illustrates an example of a tangent plane and a normal vector of a surface in accordance with embodiments.

FIG. 5 illustrates an example of a tangent plane and a normal vector of a surface in accordance with embodiments.

The surface of FIG. 5 is used in the patch generation process 40000 of the V-PCC encoding process of FIG. 4 as follows.

Normal calculation related to patch generation:

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
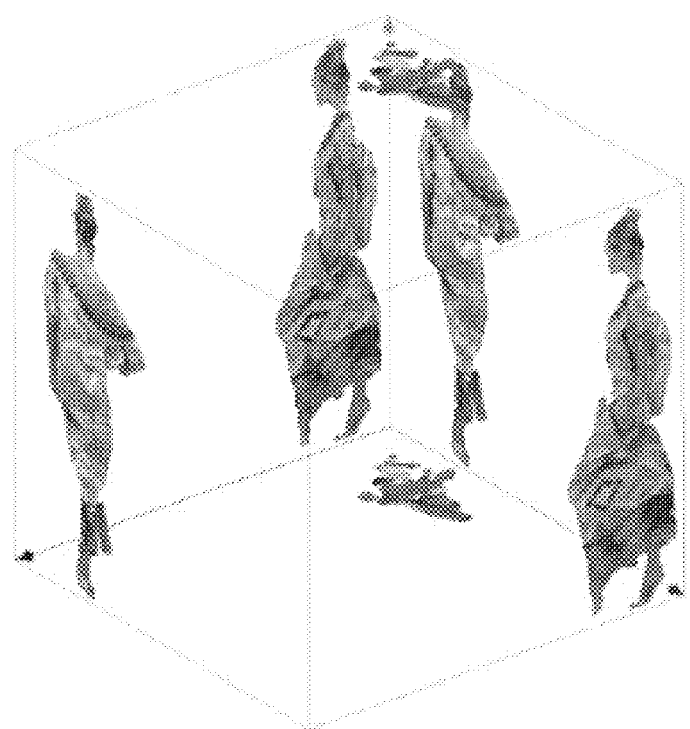
FIG. 6 illustrates an exemplary bounding box of a point cloud in accordance with embodiments.

FIG. 6 illustrates an exemplary bounding box of a point cloud in accordance with embodiments.

A method/device in accordance with embodiments, for example, patch generation, may employ a bounding box in generating a patch from point cloud data.

The bounding box in accordance with some embodiments refers to a box of a unit for dividing point cloud data based on a hexahedron in a 3D space.

The bounding box may be used in the process of projecting a target object of the point cloud data onto a plane of each planar face of a hexahedron in a 3D space. The bounding box may be generated and processed by the point cloud video acquirer 10000 and the point cloud video encoder 10002 of FIG. 1. Further, based on the bounding box, the patch generation 40000, patch packing 40001, geometry image generation 40002, and texture image generation 40003 of the V-PCC encoding process of FIG. 2 may be performed.

Segmentation related to patch generation Segmentation is divided into two processes: initial segmentation and refine segmentation.

The point cloud encoder 10002 in accordance with some embodiments projects a point onto one face of a bounding box. Specifically, each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{p_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{p_i}$ of each point, which is obtained in the normal value calculation process, and $\vec{n}_{p_{idx}}$ is determined as a projection plane of the corresponding point. That is, a plane whose normal vector is most similar to the direction of the normal vector of a point is determined as the projection plane of the point.

$$\max_{p_{idx}} \{\vec{n}_{p_i} \cdot \vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In accordance with some embodiments, the weight value may be defined by the user. The refine segmentation may be performed repeatedly, and the number of repetitions may also be defined by the user.

Patch Segmentation Related to Patch Generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch. The details are described below; and 4) Repeat operations 2) to 4) until there is no unextracted point.

The occupancy map, geometry image and texture image for each patch as well as the size of each patch are determined through the patch segmentation process.

Figure 7:
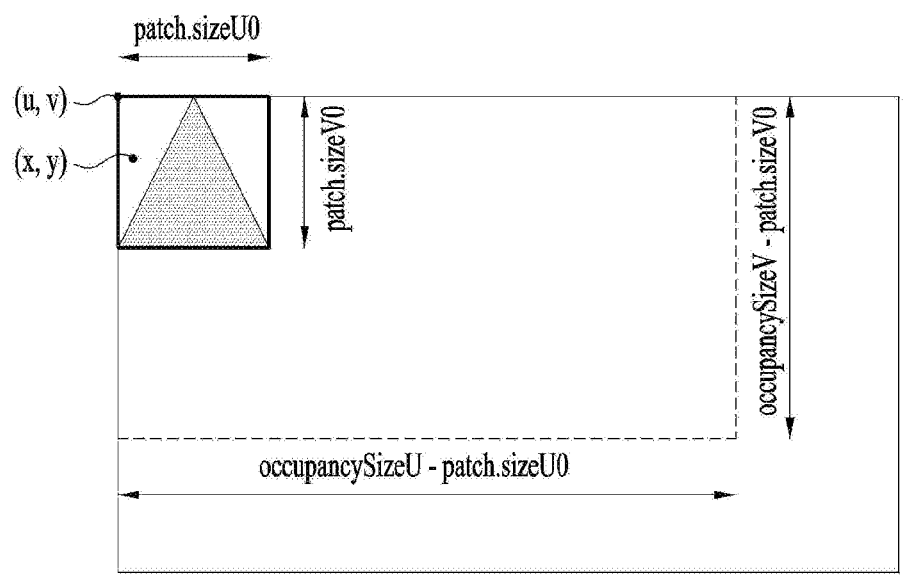
FIG. 7 illustrates an example of determination of individual patch positions on an occupancy map in accordance with embodiments.

FIG. 7 illustrates an example of determination of individual patch positions on an occupancy map in accordance with embodiments.

The point cloud encoder 10002 in accordance with some embodiments may perform patch packing and generate an occupancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU−patch.sizeU0) and a vertical coordinate within the range of (0, occupancySizeV−patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 7) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an accupancy packing size block, and a point (x, y) may be located in the box.

Figure 8:
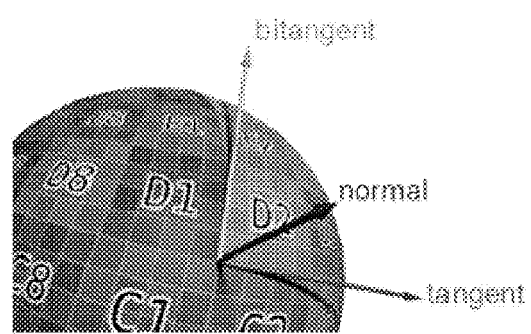
FIG. 8 shows an exemplary relationship among normal, tangent, and bitangent axes in accordance with embodiments.

FIG. 8 shows an exemplary relationship among normal, tangent, and bitangent axes in accordance with embodiments.

The point cloud encoder 10002 in accordance with embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
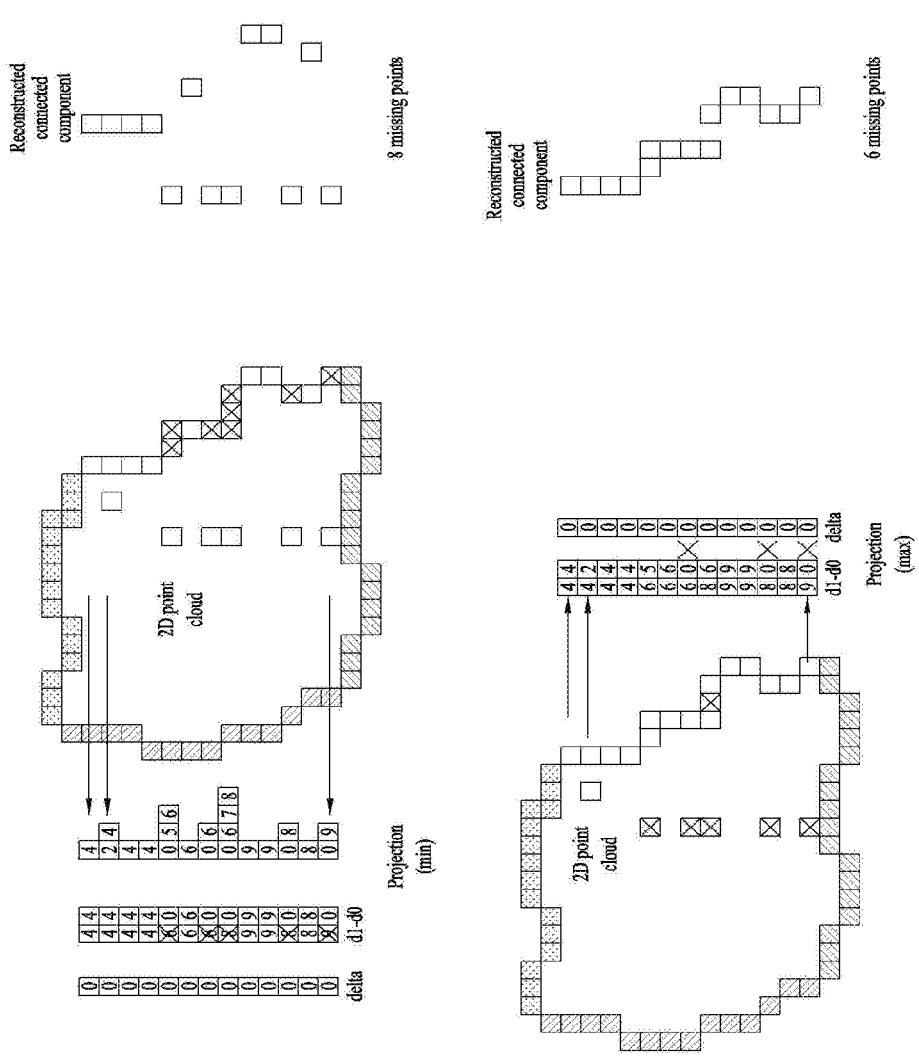
FIG. 9 shows an exemplary configuration of the minimum mode and maximum mode of a projection mode in accordance with embodiments.

FIG. 9 shows an exemplary configuration of the minimum mode and maximum mode of a projection mode in accordance with embodiments.

The point cloud encoder 10002 in accordance with embodiments may perform patch-based projection to generate a geometry image, and the projection mode in accordance with some embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in the figure.

For example, when a point cloud is located in 2D as illustrated in the figure, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . , 6, 7, 8, 9 with respect to the left side, and the number for calculating the depths of the points may be marked on the right side.

The same projection mode may be applied to all point clouds or different projection modes may be applied to respective frames or patches in accordance with user definition. When different projection modes are applied to the respective frames or patches, a projection mode that may enhance compression efficiency or minimize missing points may be adaptively selected.

3) Calculate the depth values of the individual points.

In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4244060099080). In determining the depth of points of image d1, a greater value among two or more points may be calculated. When only one point is present, the value thereof may be calculated (4444666899889). In the process of encoding and reconstructing the points of the patch, some points may be missing (For example, in the figure, eight points are missing).

In the max mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

For example, a maximum value may be calculated in determining the depth of points of d0 (4444666899889). In addition, in determining the depth of points of d1, a lower value among two or more points may be calculated. When only one point is present, the value thereof may be calculated (4244560699080). In the process of encoding and reconstructing the points of the patch, some points may be missing (For example, in the figure, six points are missing).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image d0.

In the encoding method using the depth values of the two layers, d0 and d1 as described above, if there is another point between the two depths, the geometry information about the point is missing in the encoding process, and therefore an enhanced-delta-depth (EDD) code may be used for lossless coding.

Hereinafter, the EDD code will be described in detail with reference to FIG. 10.

Figure 10:
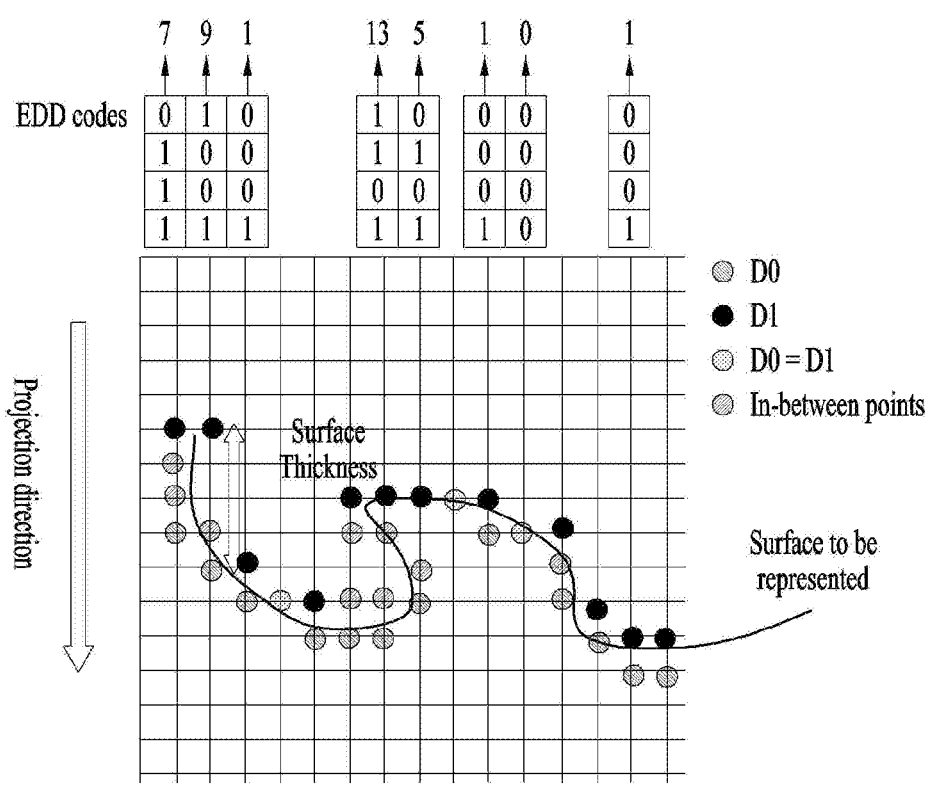
FIG. 10 illustrates an exemplary EDD code in accordance with embodiments.

FIG. 10 illustrates an exemplary EDD code in accordance with embodiments.

In some/all processes of the point cloud encoder 10002 and/or V-PCC encoding (e.g., video compression 40009), the geometry information about points may be encoded based on the EOD code.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over D0 and the second and third positions are empty. When the EDD code is encoded together with D0 and transmitted, a reception terminal may restore the geometry information about all points without loss.

For example, when there is a point present above a reference point, the value is 1. When there is no point, the value is 0. Thus, the code may be expressed based on 4 bits.

Smoothing (40004)

Smoothing is an operation for eliminating discontinuity that may occur on the patch boundary due to deterioration of the image quality occurring during the compression process. Smoothing may be performed by the point cloud encoder or smoother:

1) Reconstruct the point cloud from the geometry image. This operation may be the reverse of the geometry image generation described above. For example, the reverse process of encoding may be reconstructed;

2) Calculate neighboring points of each point constituting the reconstructed point cloud using the K-D tree or the like;

3) Determine whether each of the points is positioned on the patch boundary. For example, when there is a neighboring point having a different projection plane (cluster index) from the current point, it may be determined that the point is positioned on the patch boundary;

4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
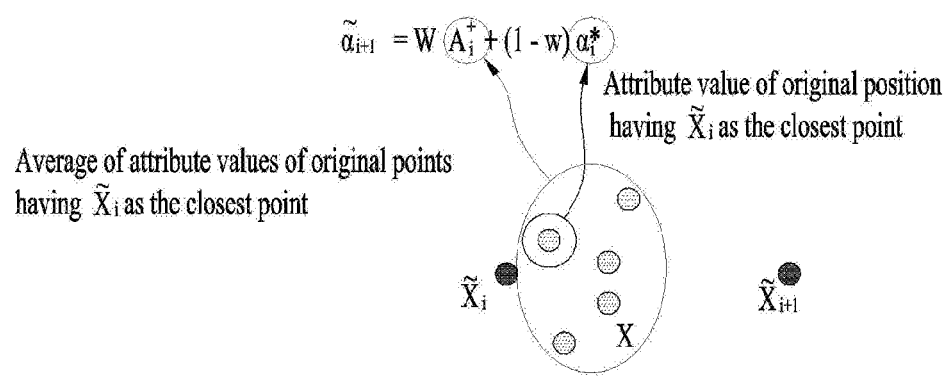
FIG. 11 illustrates an example of recoloring based on color values of neighboring points in accordance with embodiments.

FIG. 11 illustrates an example of recoloring based on color values of neighboring points in accordance with embodiments.

The point cloud encoder or the texture image generator 40003 in accordance with some embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

For example, referring to the figure, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images generated in two layers of d0 and d1.

Auxiliary Patch Info Compression (40005)

The point cloud encoder or the auxiliary patch info compressor in accordance with some embodiments may compress the auxiliary patch information (auxiliary information about the point cloud).

The auxiliary patch info compressor compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In accordance with some embodiments, the mapped patches constitute a candidate list, and the candidate index indicates the position in sequential order of a patch whose data is present in the block), and a local patch index (which is an index indicating one of the patches present in the frame). Table X shows a pseudo code representing the process of matching between blocks and patches based on the candidate list and the local patch indexes.

The maximum number of candidate lists may be defined by a user.

TABLE 1-1

Pseudo code for mapping a block to a patch

```
for( i = 0; i < BlockCount; i++ ) {
    if( candidatePatches[ i ].size( ) = = 1 ) {
        blockToPatch[ i ] = candidatePatches[ i ][ 0 ]
    } else {
        candidate_index
        if( candidate_index = = max_candidate_count) {
            blockToPatch[ i ] = local_patch_index
        } else {
            blockToPatch[ i ] = candidatePatches[ i ][
            candidate_index ]
        }
    }
}
```

Figure 12:
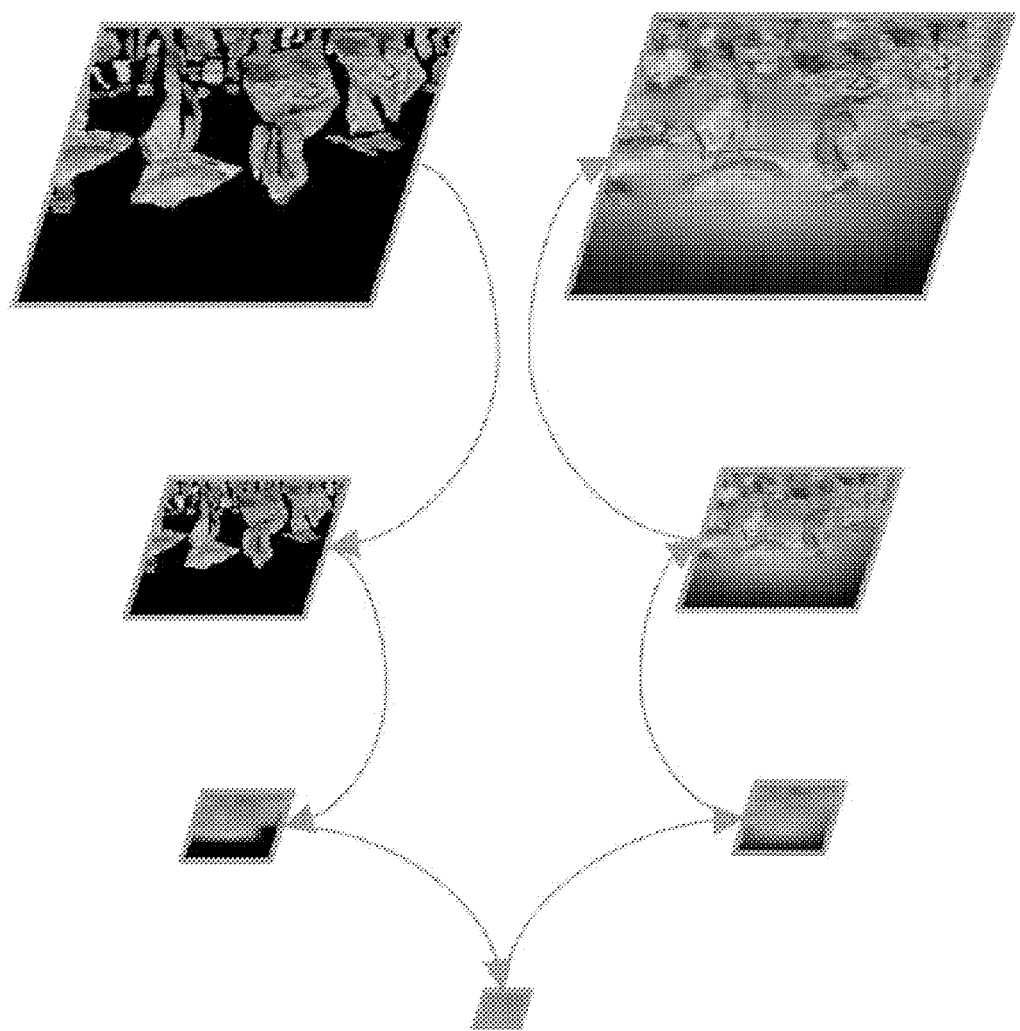
FIG. 12 illustrates an example of push-pull background filling in accordance with embodiments.

FIG. 12 illustrates push-pull background filling in accordance with embodiments.

Image Padding and Group Dilation (40006, 40007, 40008)

The image padder in accordance with some embodiments may fill the space except the patch area with meaningless supplemental data based on the push-pull background filling technique.

Image padding is a process of filling the space other than the patch region with meaningless data to improve compression efficiency. For image padding, pixel values in columns or rows close to a boundary in the patch may be copied to fill the empty space. Alternatively, as shown in the figure, a push-pull background filling method may be used. In accordance with this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
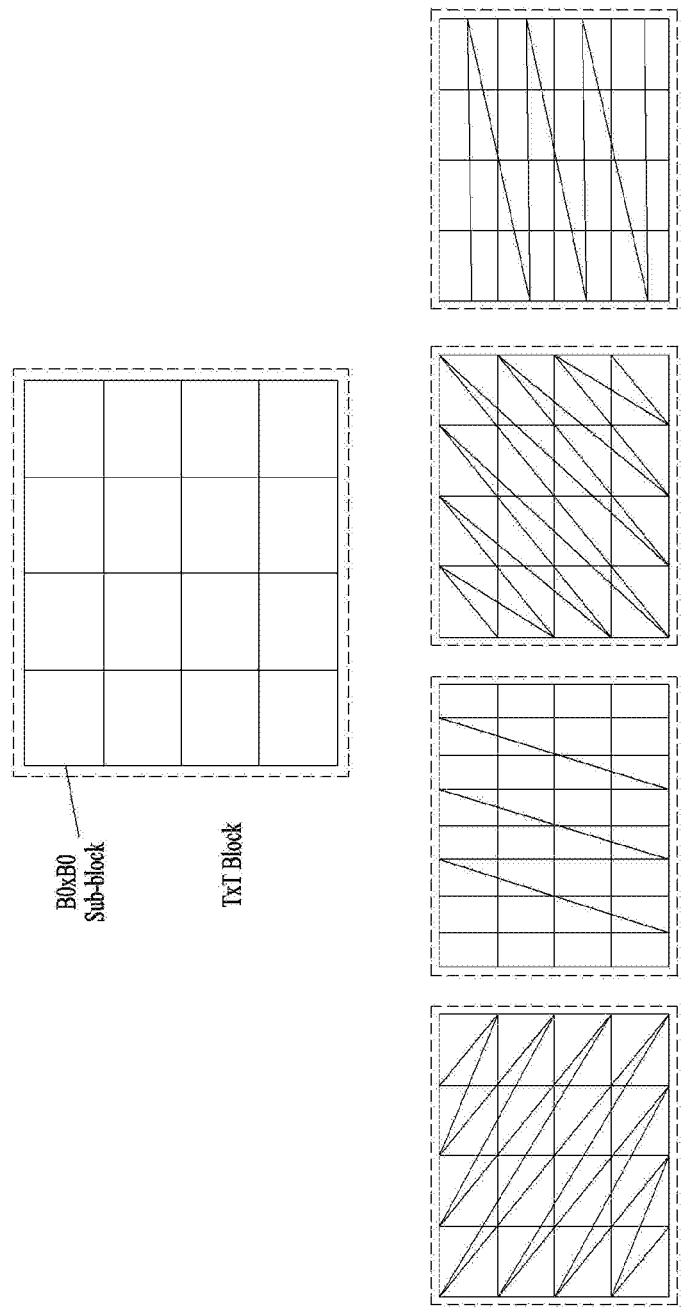
FIG. 13 shows an exemplary possible traversal order for a 4*4 block in accordance with embodiments.

FIG. 13 shows an exemplary possible traversal order for a 4*4 block in accordance with embodiments.

Occupancy Map Compression (40012, 40011)

The occupancy map compressor in accordance with some embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. The figure shows four possible traversal orders for a 4*4 block.

Figure 14:
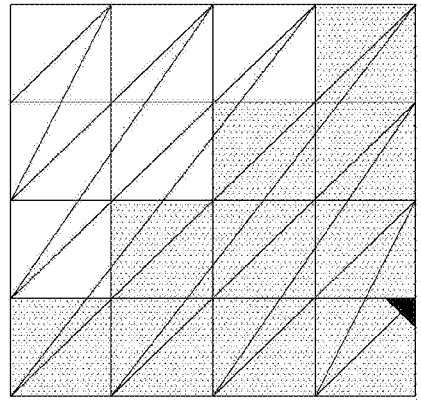
FIG. 14 illustrates an exemplary best traversal order in accordance with embodiments.

FIG. 14 illustrates an exemplary best traversal order in accordance with embodiments.

As described above, the entropy compressor in accordance with some embodiments may code (encode) a block based on the traversal order scheme as described above.

For example, the best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (40009, 40010, 40011)

The video compressor in accordance with some embodiments encodes a sequence of a geometry image, a texture image, an occupancy map image, and the like generated in the above-described operations, using a 2D video codec such as HEVC or VVC.

Figure 15:
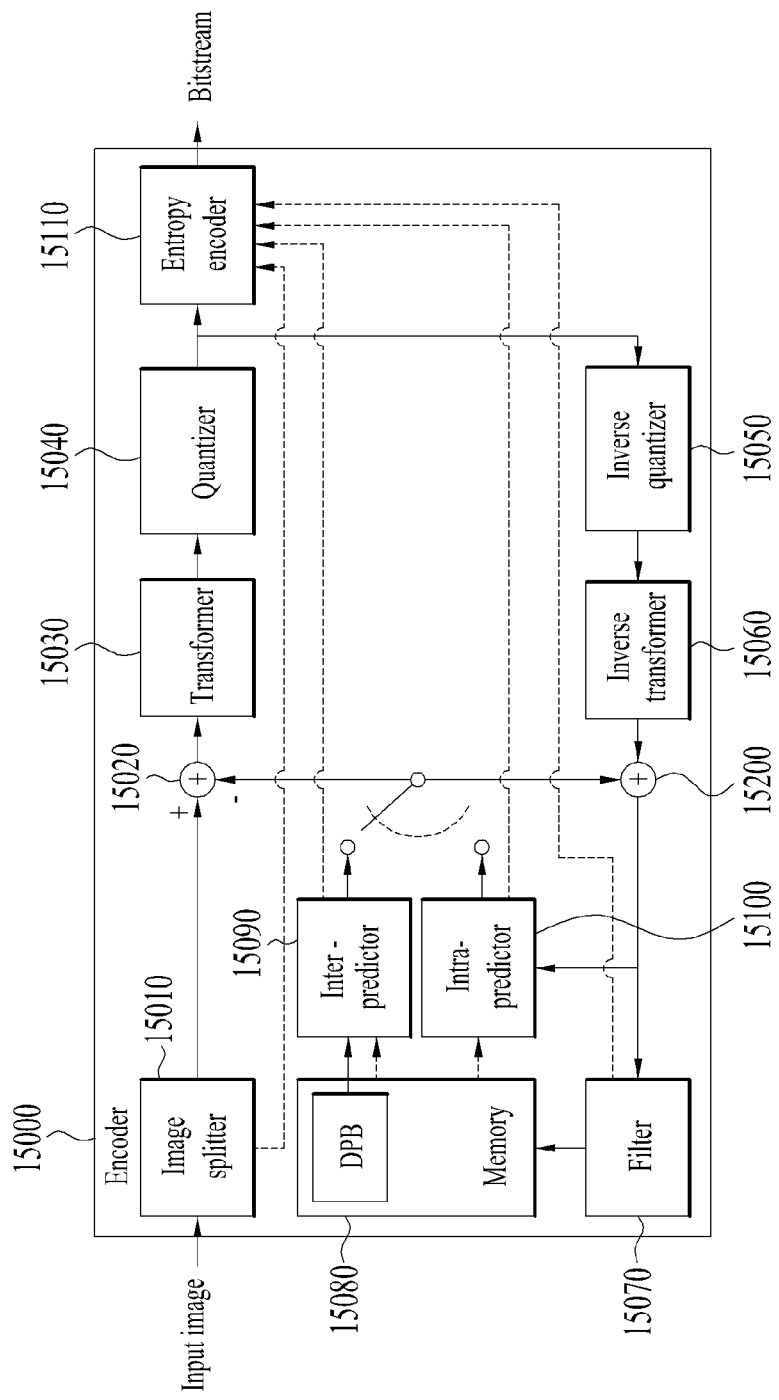
FIG. 15 illustrates an exemplary 2D video/image encoder in accordance with embodiments.

FIG. 15 illustrates an exemplary 2D video/image encoder in accordance with embodiments.

The figure, which represents an embodiment to which the video compression or video compressor 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Each component of FIG. 15 may correspond to software, hardware, processor and/or a combination thereof.

Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. In accordance with an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In accordance with some embodiments, the CU may be recursively split from a coding tree unit (CTU) or a largest coding unit (LCU) in accordance with a quad-tree binary-tree (QTBT) structure. For example, one CU may be split into a plurality of CUs of a lower depth based on a quad-tree structure and/or a binary-tree structure. In accordance with some embodiments, for example, the quad-tree structure may be applied first and the binary-tree structure may be applied later. Alternatively, the binary-tree structure may be applied first. The coding procedure in accordance with the present disclosure may be performed based on a final CU that is not split anymore. In accordance with some embodiments, the LCU may be used as the final CU based on coding efficiency in accordance with characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In accordance with some embodiments, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In accordance with some embodiments, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes in accordance with fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In accordance with some embodiments, in order to reduce the amount of motion information transmitted in the inter-prediction mode, the motion information may be predicted on a per block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loève transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
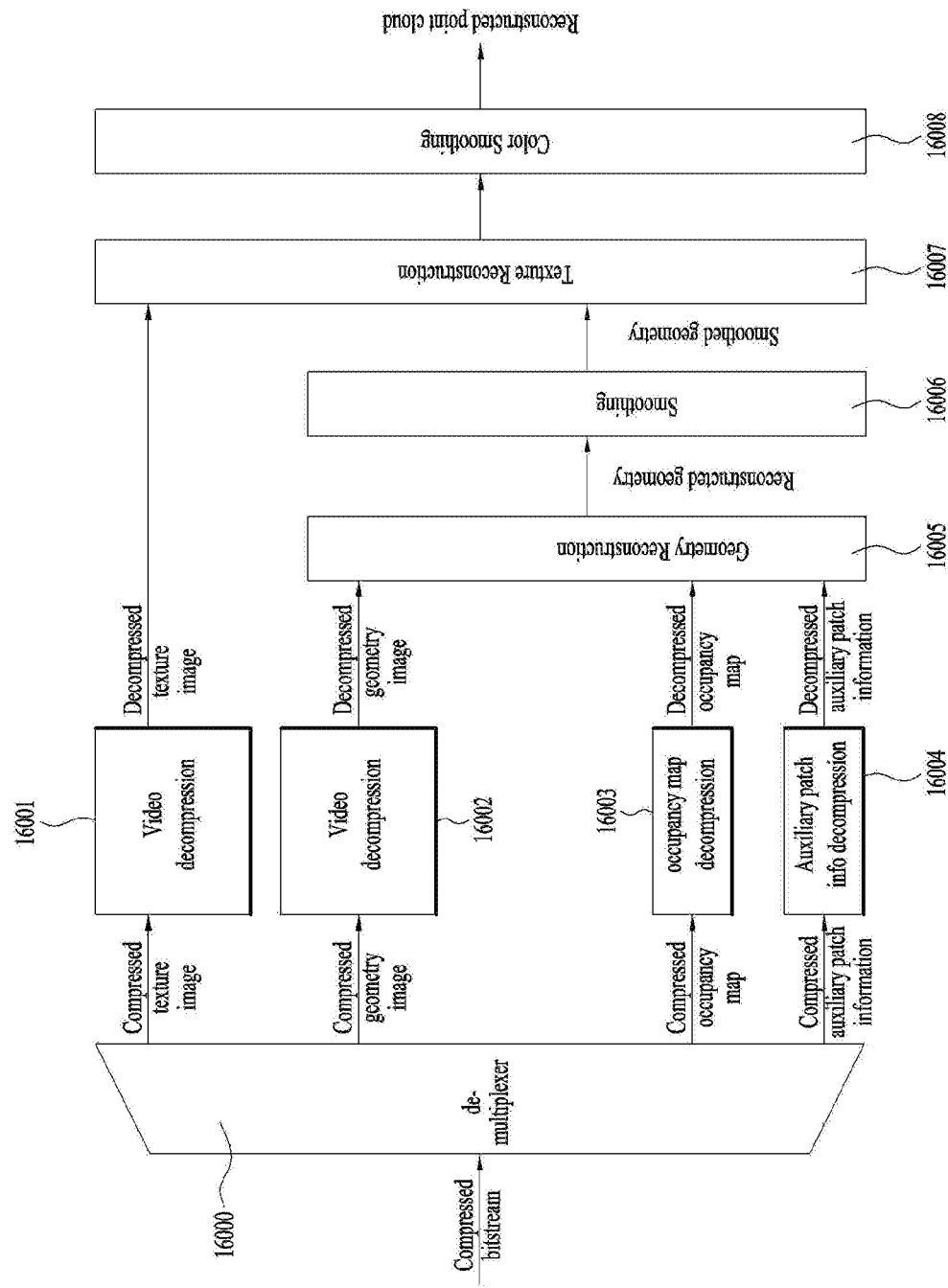
FIG. 16 illustrates an exemplary V-PCC decoding process in accordance with embodiments.

FIG. 16 illustrates an exemplary V-PCC decoding process in accordance with embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and compressed auxiliary patch information.

The video decompression or video decompressor 16001, 16002 decompresses (or decodes) each of the compressed texture image and the compressed geometry image.

The occupancy map decompression or occupancy map decompressor 16003 decompresses the compressed occupancy map.

The auxiliary patch info decompression or auxiliary patch info decompressor 16004 decompresses auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smooths color values from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process in accordance with some embodiments is operated as follows.

Video Decompression (1600, 16002)

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
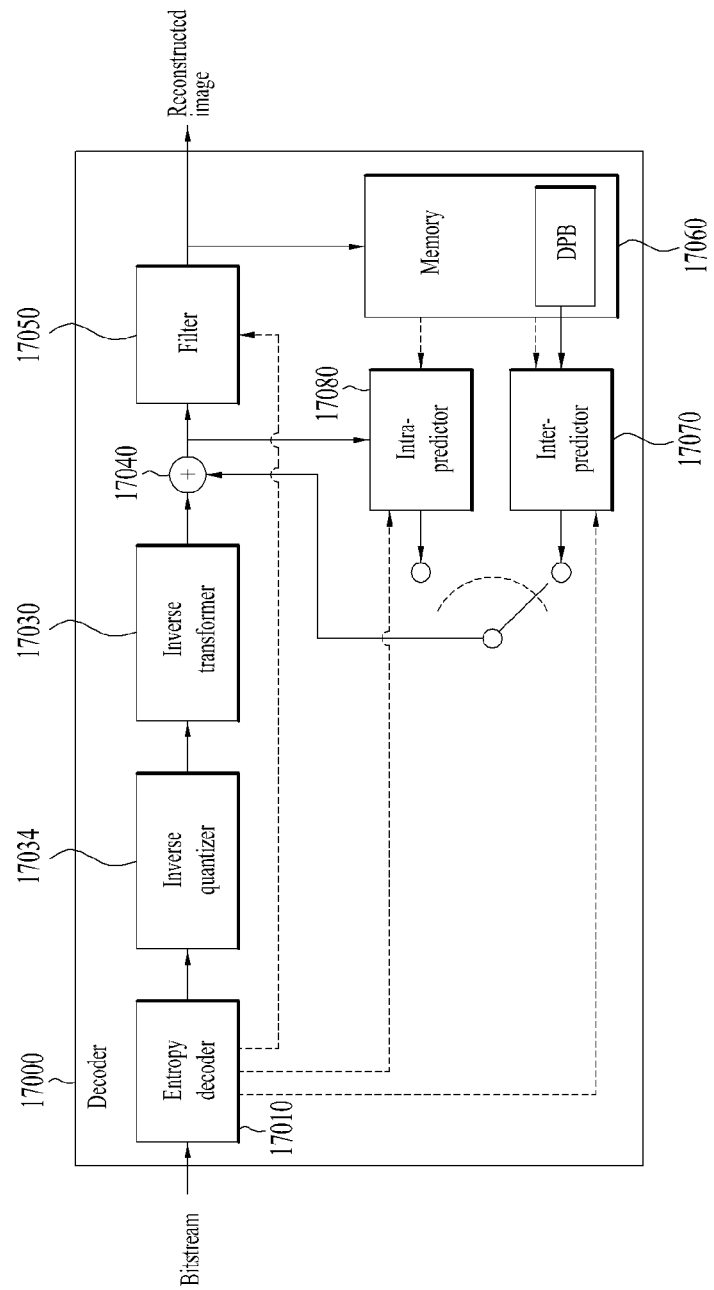
FIG. 17 shows an exemplary 2D video/image decoder in accordance with embodiments.

FIG. 17 illustrates an exemplary 2D video/image decoder in accordance with embodiments.

The 2D video/image decoder may follow the reverse process of the 2D video/image encoder of FIG. 15.

The 2D video/image decoder of FIG. 17 is an embodiment of the video decompression or video decompressor of FIG. 16. FIG. 17 is a schematic block diagram of a 2D video/image decoder 17000 by which decoding of a video/image signal is performed. The 2D video/image decoder 17000 may be included in the point cloud video decoder of FIG. 1, or may be configured as an internal/external component. Each component in FIG. 17 may correspond to software, hardware, a processor, and/or a combination thereof.

Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) in accordance with an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted in accordance with the determined context model, and arithmetic decoding of the bin may be performed to generate a symbol corresponding to the value of each syntax element. In accordance with the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In accordance with some embodiments, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In accordance with some embodiments, in order to reduce the amount of motion information transmitted in the inter-prediction mode, the motion information may be predicted on a block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, some embodiments described regarding the filter 160, the inter-predictor 180, and the intra-predictor 185 of the encoder 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Info Decompression (16004)

The auxiliary patch information may be reconstructed by performing the reverse process of the aforementioned auxiliary patch info compression and decoding the compressed auxiliary patch info bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g(u, v), and the coordinates of the position of the patch on the normal, tangent and bitangent axes of the 3D space are (δ0, s0, r0), □δ(u, v), s(u, v), and r(u, v), which are the normal, tangent, and bitangent coordinates in the 3D space of a position mapped to point (u, v) may be expressed as follows:

$$\delta(u,v)=\delta 0+g(u,v)$$

$$s(u,v)=s0+u$$

$$r(u,v)=r0+v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described in section 2.5 may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
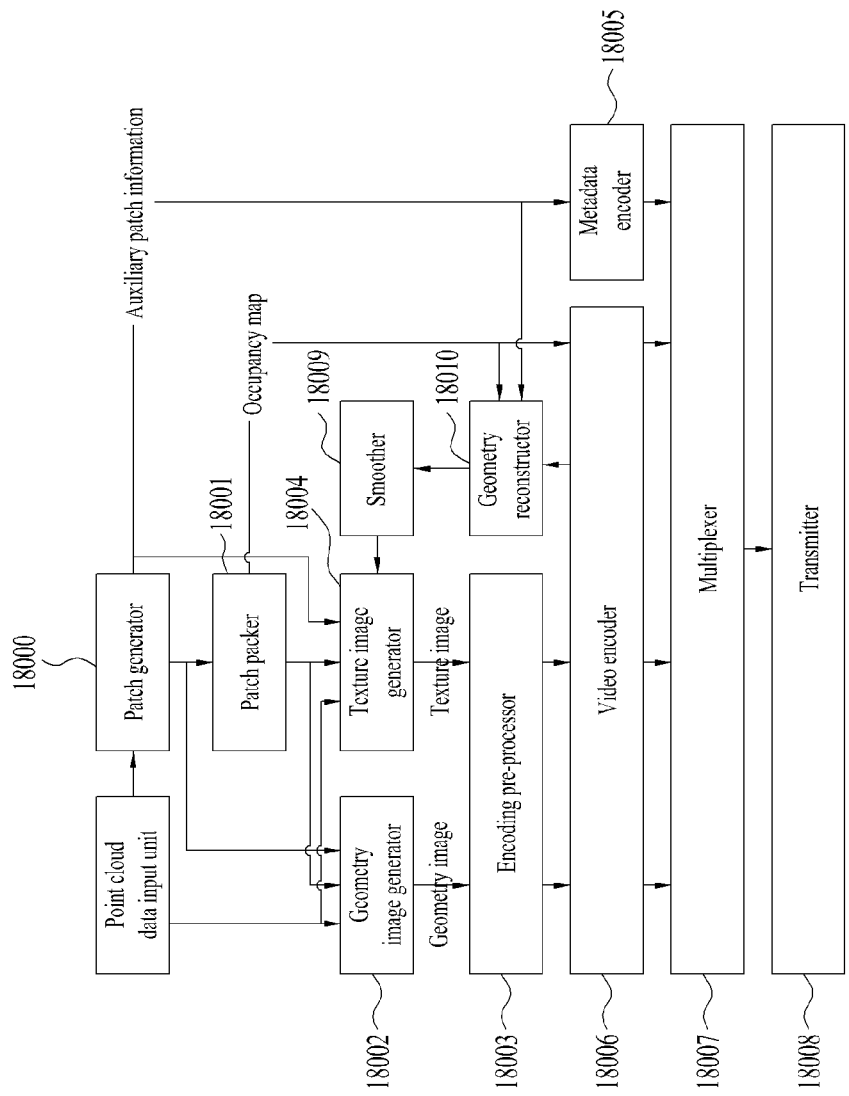
FIG. 18 is a flowchart illustrating operation of a transmission device in accordance with embodiments of the present disclosure.

FIG. 18 is a flowchart illustrating operation of a transmission device in accordance with embodiments of the present disclosure.

The transmission device in accordance with some embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device in accordance with some embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal. Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
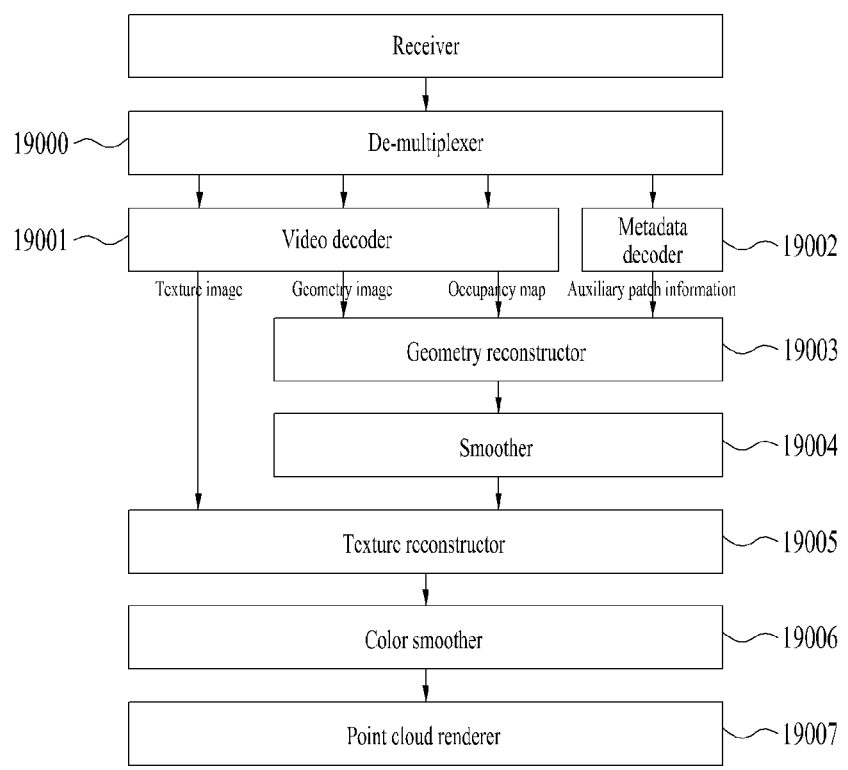
FIG. 19 is a flowchart illustrating operation of a reception device in accordance with embodiments.

FIG. 19 is a flowchart illustrating operation of a reception device in accordance with embodiments.

The reception device in accordance with some embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device in accordance with some embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstructor 19003 based on the decoded geometry image, occupancy map, and auxiliary patch information, and is then subjected to a smoothing process performed by a smoother 19004. A color point cloud image/picture may be reconstructed by a texture reconstructor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
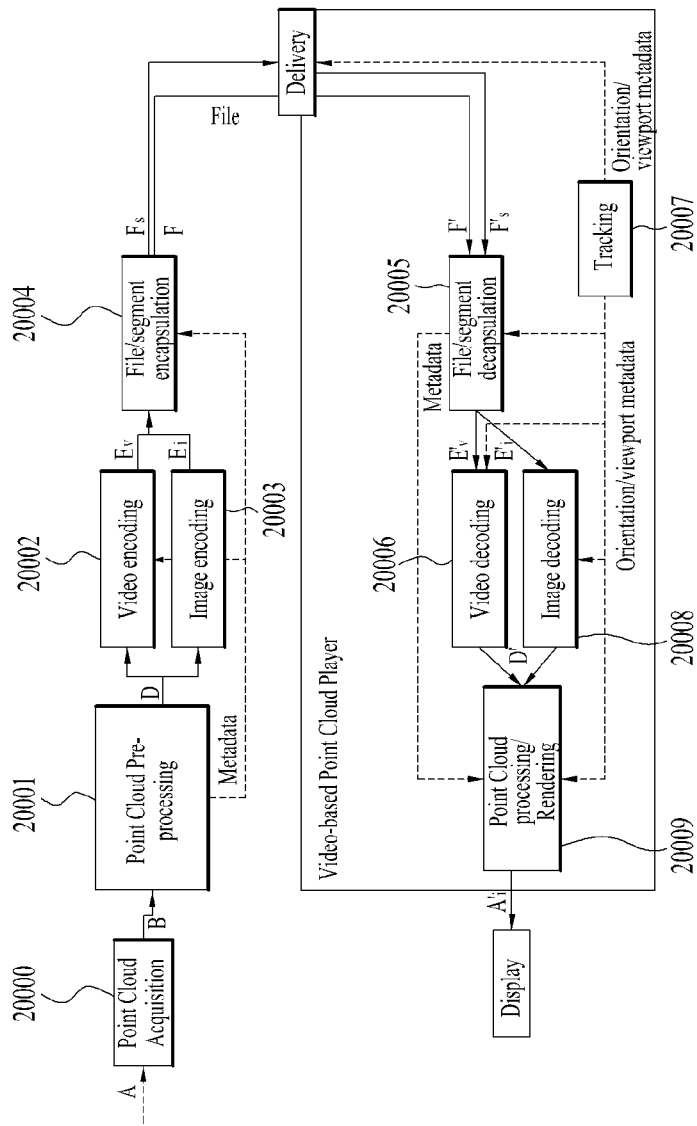
FIG. 20 illustrates an exemplary architecture for V-PCC based storage and streaming of point cloud data in accordance with embodiments.

FIG. 20 illustrates an exemplary architecture for V-PCC based storage and streaming of point cloud data in accordance with embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

The figure shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

Some embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames of the point cloud video. Here, a picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame of a binary map, which indicates presence or absence of data at the corresponding position in the 2D plane with a value of 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

The point cloud video encoder and/or the point cloud image encoder in accordance with some embodiments may generate a PCC bitstream (G-PCC and/or V-PCC bitstream) in accordance with some embodiments.

In accordance with embodiments, the video encoder 2002, the image encoder 20002, the video decoding 20006, and the image decoding may be performed by one encoder/decoder as described above, and may be performed along separate paths as shown in the figure.

In file/segment encapsulation 20004, the encoded point cloud data and/or point cloud-related metadata may be encapsulated into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. In accordance with an embodiment, the encapsulation processor may include the point cloud metadata in the file format. The point cloud-related metadata may be included, for example, in boxes at various levels on the ISOBMFF file format or as data in a separate track within the file. In accordance with an embodiment, the encapsulation processor may encapsulate the point cloud-related metadata into a file.

The encapsulation or encapsulator in accordance with some embodiments may divide the G-PCC/V-PCC bitstream into one or multiple tracks and store the same in a file, and may also encapsulate signaling information for this operation. In addition, the atlas stream included on the G-PCC/V-PCC bitstream may be stored as a track in the file, and related signaling information may be stored. Furthermore, an SEI message present in the G-PCC/V-PCC bitstream may be stored in a track in the file and related signaling information may be stored.

A transmission processor may perform processing of the encapsulated point cloud data for transmission in accordance with the file format. The transmission processor may be included in the transmitter or may be configured as a separate component/module. The transmission processor may process the point cloud data in accordance with a transmission protocol. The processing for transmission may include processing for delivery over a broadcast network and processing for delivery through a broadband. In accordance with an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing in accordance with any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device in accordance with the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data in accordance with the viewport of the user.

The reception processor may perform processing on the received point cloud video data in accordance with the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation processor, and the acquired point cloud-related metadata to a metadata parser.

A decapsulation processor (file/segment decapsulation) 20005 may decapsulate the point cloud data received in the form of a file from the reception processor. The decapsulation processor may decapsulate files in accordance with ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 20006 may receive the bitstream and decode the video/image by performing an operation corresponding to the operation of the point cloud video encoder. In accordance with some embodiments, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various feedback information that may be acquired in the rendering/displaying process to the transmitting side or the decoder of the receiving side. Through the feedback process, interactivity may be provided in consumption of point cloud data. In accordance with an embodiment, head orientation information, viewport information indicating an area currently viewed by a user, and the like may be delivered to the transmitting side in the feedback process. In accordance with an embodiment, the user may interact with what is implemented in the VR/AR/MR/self-driving environment. In accordance with some embodiments, information related to the interaction may be delivered to the transmitting side or a service provider in the feedback process. In accordance with an embodiment, the feedback process may be skipped.

In accordance with an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

Figure 21:
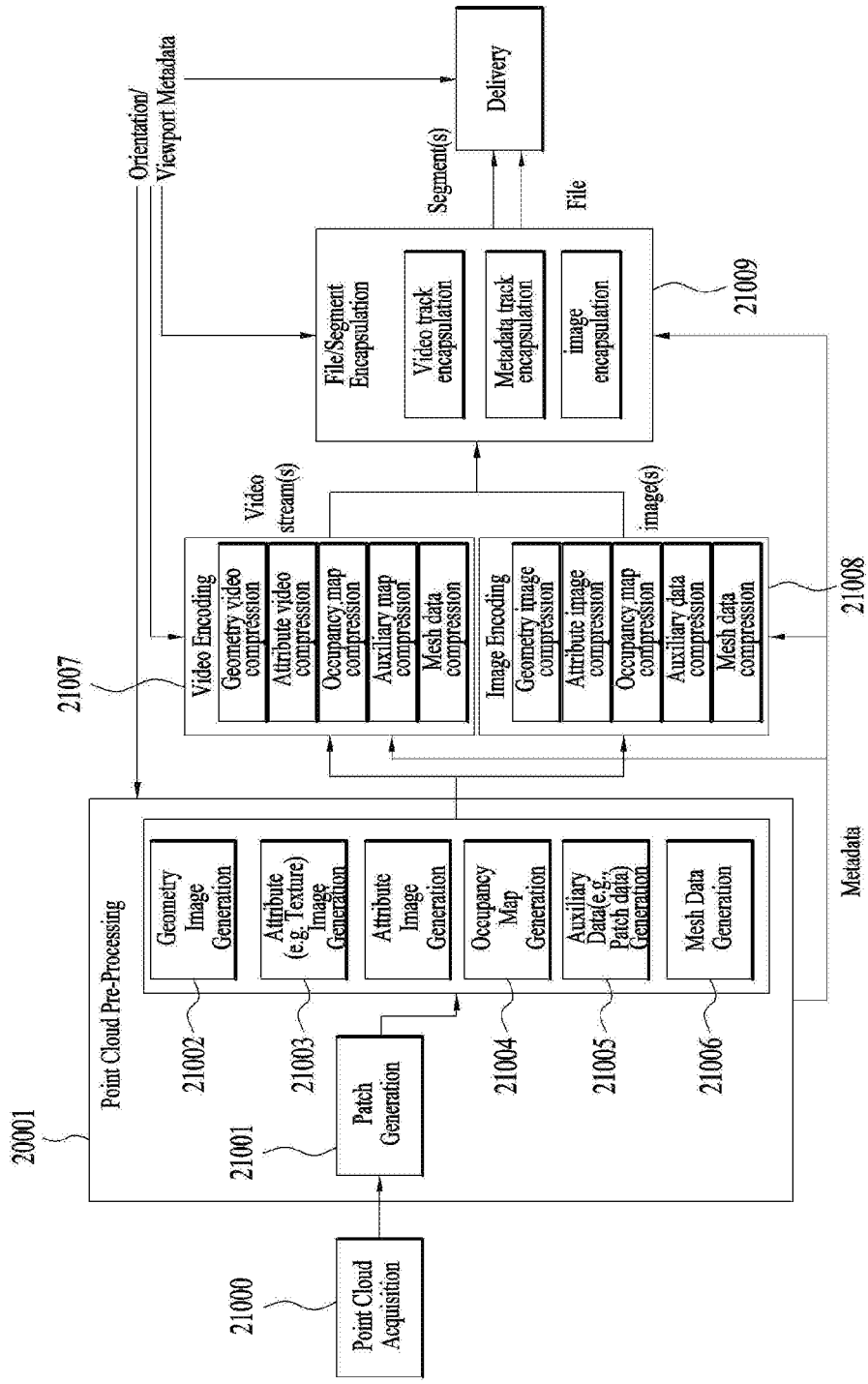
FIG. 21 is an exemplary block diagram of a device for storing and transmitting point cloud data in accordance with embodiments.

FIG. 21 is an exemplary block diagram of a device for storing and transmitting point cloud data in accordance with embodiments.

FIG. 21 shows a point cloud system in accordance with embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device in accordance with embodiments may be configured as shown in the figure. Each element of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

A patch generator (or patch generation) 21002 generates patches from the point cloud data. The patch generator generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a pre-processor or a controller.

In geometry image generation 21002, a geometry image is generated based on the result of the patch generation. Geometry represents a point in a 3D space. The geometry image is generated using the occupancy map, which includes information related to 2D image packing of the patches, auxiliary data (patch data), and/or mesh data based on the patches. The geometry image is related to information such as a depth (e.g., near, far) of the patch generated after the patch generation.

In attribute image generation 21003, an attribute image is generated. For example, an attribute may represent a texture. The texture may be a color value that matches each point. In accordance with embodiments, images of a plurality of attributes (such as color and reflectance) (N attributes) including a texture may be generated. The plurality of attributes may include material information and reflectance. In accordance with an embodiment, the attributes may additionally include information indicating a color, which may vary depending on viewing angle and light even for the same texture.

In occupancy map generation 21004, an occupancy map is generated from the patches. The occupancy map includes information indicating presence or absence of data in the pixel, such as the corresponding geometry or attribute image.

In auxiliary data generation 21005, auxiliary data including information about the patches is generated. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

In mesh data generation 21006, mesh data is generated from the patches. Mesh represents connection between neighboring points. For example, it may represent data of a triangular shape. For example, the mesh data refers to connectivity between the points.

A point cloud pre-processor or controller generates metadata related to patch generation, geometry image generation, attribute image generation, occupancy map generation, auxiliary data generation, and mesh data generation.

The point cloud transmission device performs video encoding and/or image encoding in response to the result generated by the pre-processor. The point cloud transmission device may generate point cloud image data as well as point cloud video data. In accordance with embodiments, the point cloud data may have only video data, only image data, and/or both video data and image data.

A video encoder 21007 performs geometry video compression, attribute video compression, occupancy map compression, auxiliary data compression, and/or mesh data compression. The video encoder generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder and/or the image encoder may receive metadata from the pre-processor. The video encoder and/or the image encoder may perform each encoding process based on the metadata.

A file/segment encapsulator (file/segment encapsulation) 21009 encapsulates the video stream(s) and/or image(s) in the form of a file and/or segment. The file/segment encapsulator performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. In accordance with embodiments, the metadata may be encapsulated into a metadata track, or may be encapsulated together in a video track or an image track.

In the image encapsulation, one or more images may be encapsulated into one or more tracks or items.

For example, in accordance with embodiments, when four video streams and two images are input to the encapsulator, the four video streams and two images may be encapsulated in one file.

The point cloud video encoder and/or the point cloud image encoder in accordance with some embodiments may generate a G-PCC/V-PCC bitstream in accordance with some embodiments.

The file/segment encapsulator may receive metadata from the pre-processor. The file/segment encapsulator may perform encapsulation based on the metadata.

A file and/or a segment generated by the file/segment encapsulation are transmitted by the point cloud transmission device or the transmitter. For example, the segment(s) may be delivered based on a DASH-based protocol.

The encapsulation or encapsulator in accordance with some embodiments may divide the V-PCC bitstream into one or multiple tracks and store the same in a file, and may also encapsulate signaling information for this operation. In addition, the atlas stream included on the V-PCC bitstream may be stored as a track in the file, and related signaling information may be stored. Furthermore, an SEI message present in the V-PCC bitstream may be stored in a track in the file and related signaling information may be stored.

The transmitter may transmit a point cloud bitstream or a file/segment including the bitstream to the receiver of the reception device over a digital storage medium or a network. Processing in accordance with any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the pre-processor, the video encoder, the image encoder, the file/segment encapsulator, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the pre-processor may perform the above-described operation on all the point cloud data or on the point cloud data indicated by the orientation information and/or the viewport information. The video encoder and/or the image encoder may perform the above-described operation on all the point cloud data or on the point cloud data indicated by the orientation information and/or the viewport information. The file/segment encapsulator may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

Figure 22:
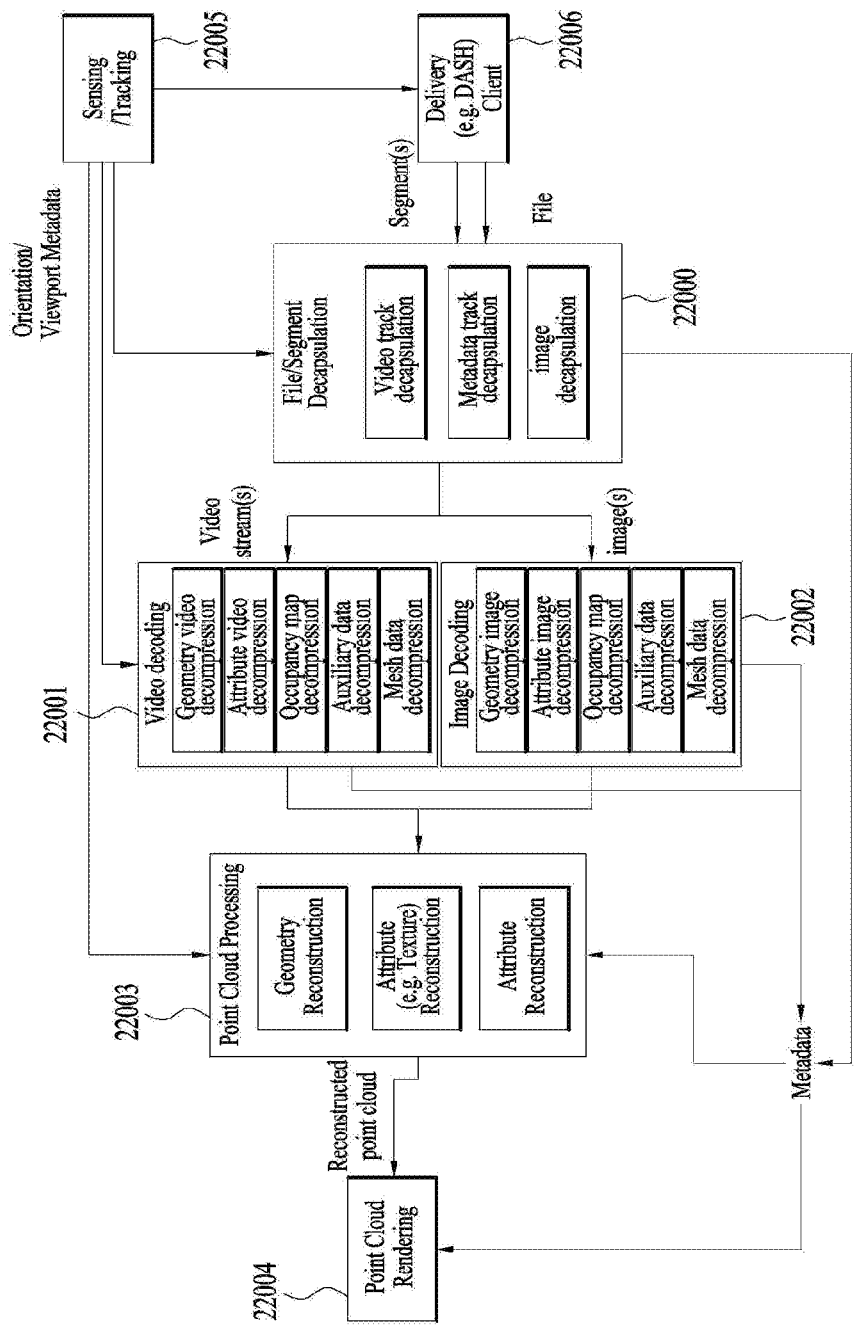
FIG. 22 is an exemplary block diagram of a point cloud data reception device in accordance with embodiments.

FIG. 22 is an exemplary block diagram of a point cloud data reception device in accordance with embodiments.

FIG. 22 shows a point cloud system in accordance with embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIGS. 20 and 21.

Each component of the reception device may be a module/unit/component/hardware/software/processor. A delivery client may receive point cloud data, a point cloud bitstream, or a file/segment including the bitstream transmitted by the point cloud data transmission device in accordance with some embodiments. The receiver may receive the point cloud data over a broadcast network or through a broadband depending on the channel used for the transmission. Alternatively, the point cloud video data may be received through a digital storage medium. The receiver may include a process of decoding the received data and rendering the received data in accordance with the user viewport. The reception processor may perform processing on the received point cloud data in accordance with a transmission protocol. A reception processor may be included in the receiver or configured as a separate component/module. The reception processor may reversely perform the process of the transmission processor described above so as to correspond to the processing for transmission performed at the transmitting side. The reception processor may deliver the acquired point cloud data to the decapsulation processor and the acquired point cloud related metadata to the metadata parser.

The sensor/tracker (sensing/tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder (the video decoder and/or the image decoder) may decode all point cloud data or the point cloud data indicated by the orientation information and/or the viewport information based on the orientation information and/or the viewport information. The point cloud processor may process all point cloud data or the point cloud data indicated by the orientation information and/or the viewport information based on the orientation information and/or the viewport information.

A file/segment decapsulator (file/segment decapsulation) 22000 performs video track decapsulation, metadata track decapsulation, and/or image decapsulation. The decapsulation processor (file/segment decapsulation) may decapsulate the point cloud data in the form of a file received from the reception processor. The decapsulation processor (file/segment decapsulation) may decapsulate files or segments in accordance with ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, a video track contained in the file and/or segment is decapsulated. Video stream(s) including a geometry video, an attribute video, an occupancy map, auxiliary data, and/or mesh data are decapsulated.

In the metadata track decapsulation, a bitstream including metadata related to the point cloud data and/or auxiliary data is decapsulated.

In the image decapsulation, image(s) including a geometry image, an attribute image, an occupancy map, auxiliary data and/or mesh data are decapsulated.

The decapsulation or decapsulator in accordance with some embodiments may divide and parse (decapsulate) the G-PCC/V-PCC bitstream based on one or more tracks in a file, and may also decapsulate signaling information therefor. In addition, the atlas stream included in the G-PCC/V-PCC bitstream may be decapsulated based on a track in the file, and related signaling information may be parsed. Furthermore, an SEI message present in the G-PCC/V-PCC bitstream may be decapsulated based on a track in the file, and related signaling information may be also acquired.

The video decoding or video decoder 22001 performs geometry video decompression, attribute video decompression, occupancy map decompression, auxiliary data decompression, and/or mesh data decompression. The video decoder decodes the geometry video, the attribute video, the auxiliary data, and/or the mesh data in a process corresponding to the process performed by the video encoder of the point cloud transmission device in accordance with some embodiments.

The image decoding or image decoder 22002 performs geometry image decompression, attribute image decompression, occupancy map decompression, auxiliary data decompression, and/or mesh data decompression. The image decoder decodes the geometry image, the attribute image, the auxiliary data, and/or the mesh data in a process corresponding to the process performed by the image encoder of the point cloud transmission device in accordance with some embodiments.

The video decoding and the image decoding in accordance with some embodiments may be processed by one video/image decoder as described above, and may be performed along separate paths as illustrated in the figure.

The video decoding and/or the image decoding may generate metadata related to the video data and/or the image data.

The point cloud video encoder and/or the point cloud image encoder in accordance with some embodiments may decode the G-PCC/V-PCC bitstream in accordance with some embodiments.

In point cloud processing 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. In accordance with embodiments, for example, the attribute may be a texture. In accordance with embodiments, an attribute may represent a plurality of pieces of attribute information. When there is a plurality of attributes, the point cloud processor in accordance with some embodiments performs a plurality of attribute reconstructions.

The point cloud processor may receive metadata from the video decoder, the image decoder, and/or the file/segment decapsulator, and process the point cloud based on the metadata.

The point cloud rendering or point cloud renderer renders the reconstructed point cloud. The point cloud renderer may receive metadata from the video decoder, the image decoder, and/or the file/segment decapsulator, and render the point cloud based on the metadata.

The display actually displays the result of rendering on the display.

As shown in FIGS. 15 to 19, after encoding/decoding, the method/device in accordance with some embodiments the point cloud data as shown in 15 to 19, the bitstream including the point cloud data may be encapsulated and/or decapsulated in the form of a file and/or a segment.

For example, a point cloud data device in accordance with some embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device in accordance with embodiments decapsulates the point cloud data based on a file. The file may include a V-PCC track containing parameters for a point cloud, a geometry track containing geometry, an attribute track containing an attribute, and an occupancy track containing an occupancy map.

The operation described above may be performed by the file/segment encapsulator 20004, 20005 of FIG. 20, the file/segment encapsulator 21009 of FIG. 21, and the file/segment encapsulator 22000 of FIG. 22.

Figure 23:
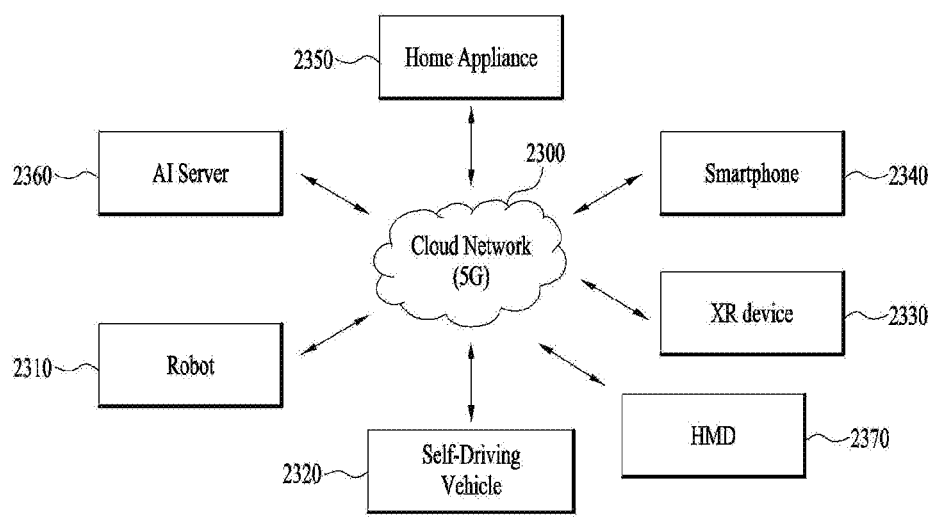
FIG. 23 illustrates an exemplary structure operable in connection with point cloud data transmission/reception methods/devices in accordance with embodiments.

FIG. 23 illustrates an exemplary structure operable in connection with point cloud data transmission/reception methods/devices in accordance with embodiments.

In the structure in accordance with some embodiments, at least one of a server 2360, a robot 2310, a self-driving vehicle 2320, an XR device 2330, a smartphone 2340, a home appliance 2350 and/or a head-mount display (MID) 2370 is connected to a cloud network 2300. Here, the robot 2310, the self-driving vehicle 2320, the XR device 2330, the smartphone 2340, or the home appliance 2350 may be referred to as a device. In addition, the XR device 1730 may correspond to a point cloud data (PCC) device in accordance with embodiments or may be operatively connected to the PCC device.

The cloud network 2300 may represent a network that constitutes part of the cloud computing infrastructure or is present in the cloud computing infrastructure. Here, the cloud network 2300 may be configured using a 3G network, 4G or Long Term Evolution (LTE) network, or a 5G network.

The server 2360 may be connected to at least one of the robot 2310, the self-driving vehicle 2320, the XR device 2330, the smartphone 2340, the home appliance 2350, and/or the HMD 2370 over the cloud network 2300 and may assist at least a part of the processing of the connected devices 2310 to 2370.

The HMD 2370 represents one of the implementation types of the XR device and/or the PCC device in accordance with some embodiments. An HMD type device in accordance with embodiments includes a communication unit, a control unit, a memory, an I/O unit, a sensor unit, and a power supply unit.

Hereinafter, various embodiments of the devices 2310 to 2350 to which the above-described technology is applied will be described. The devices 2310 to 2350 illustrated in FIG. 23 may be operatively connected/coupled to a point cloud data transmission and reception device in accordance with the above-described embodiments.

<PCC+XR> The XR/PCC device 2330 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2330 may analyze 3D point cloud data or image data acquired through various sensors or from an external device and generate position data and attribute data about 3D points. Thereby, the XR/PCC device 2330 may acquire information about the surrounding space or a real object, and render and output an XR object. For example, the XR/PCC device 2330 may match an XR object including auxiliary information about a recognized object with the recognized object and output the matched XR object.

<PCC+Self-driving+XR> The self-driving vehicle 2320 may be implemented as a mobile robot, a vehicle, an unmanned aerial vehicle, or the like by applying the PCC technology and the XR technology.

The self-driving vehicle 2320 to which the XR/PCC technology is applied may represent an autonomous vehicle provided with means for providing an XR image, or an autonomous vehicle that is a target of control/interaction in the XR image. In particular, the self-driving vehicle 2320, which is a target of control/interaction in the XR image, may be distinguished from the XR device 2330 and may be operatively connected thereto.

The self-driving vehicle 2320 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In accordance with some embodiments, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology in accordance with some embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device in accordance with some embodiments may be applied to a vehicle that provides a self-driving service.

A vehicle that provides the self-driving service is connected to a PCC device for wired/wireless communication.

When the point cloud data (PCC) transmission/reception device in accordance with some embodiments is connected to a vehicle for wired/wireless communication, the device may receive and process content data related to an AR/VR/PCC service that may be provided together with the self-driving service and transmit the processed content data to the vehicle. In the case where the PCC transmission/reception device is mounted on a vehicle, the PCC transmission/reception device may receive and process content data related to the AR/VR/PCC service in accordance with a user input signal input through a user interface device and provide the processed content data to the user. The vehicle or the user interface device in accordance with some embodiments may receive a user input signal. The user input signal in accordance with some embodiments may include a signal indicating the self-driving service.

Figure 24:
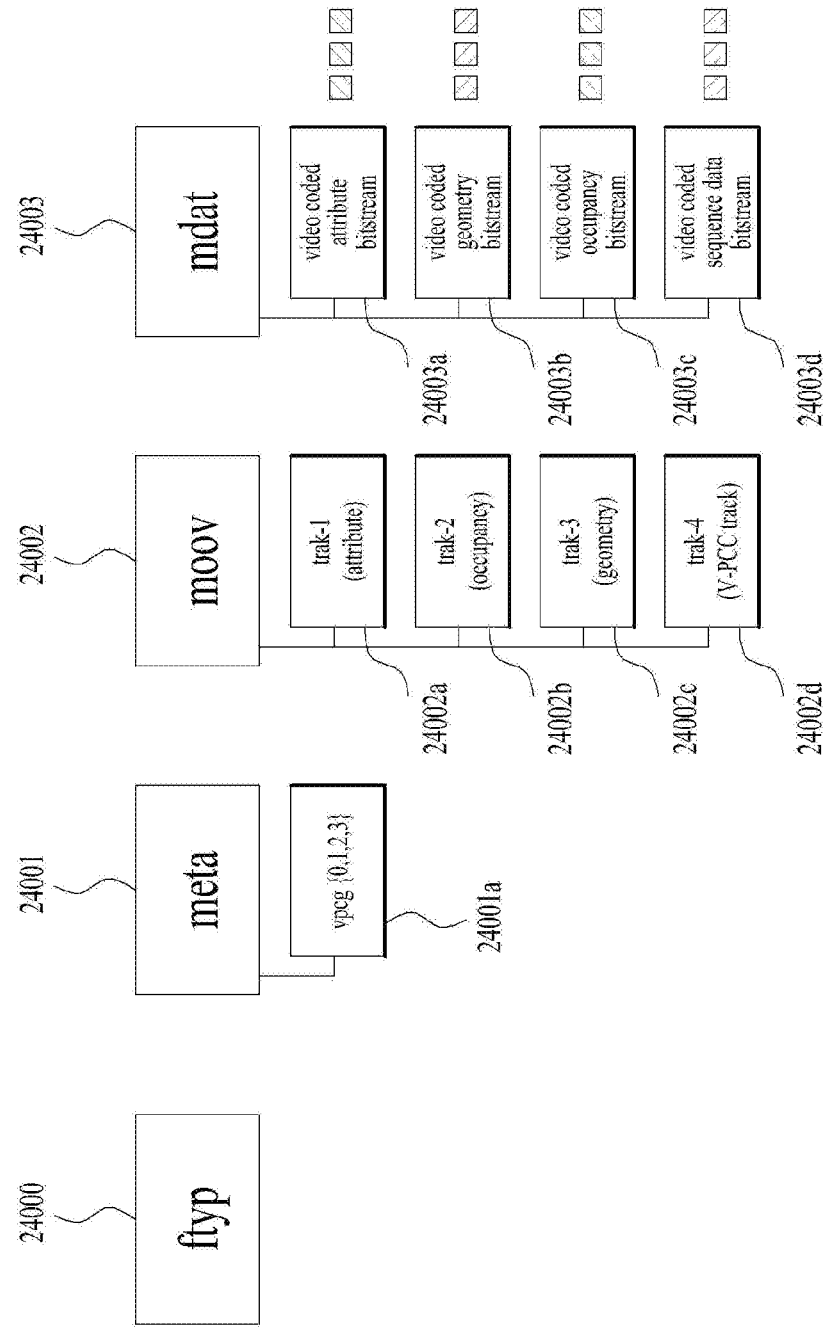
FIG. 24 shows point cloud data in the format of an ISOBMFF file in accordance with embodiments.

FIG. 24 shows point cloud data in the format of an ISOBMFF file in accordance with embodiments.

Point cloud data in accordance with embodiments may be in a format of an ISOBMFF file. The ISOBMFF file may be composed of objects called boxes. That is, all data may be included in one or more boxes.

The file format of FIG. 24 may be generated or encapsulated by the file/segment encapsulator 20004, 21009 or the like in accordance with some embodiments of FIGS. 20 and 21, and may be received and decapsulated by the file/segment decapsulator 20005, 22000 or the like of FIG. 22.

A box may include a box header, which may include a size and a type of the box. The point cloud data in accordance with some embodiments may include an ftyp box 24000 whose box type is 'ftyp', a meta box 24001 whose box type is 'meta', a moov box 24002 whose box type is 'moov', and a mdat box 24003 whose box type is 'mdat'.

The ftyp box 24000 may contain information indicating the type of the ISOBMFF file in accordance with embodiments.

The meta box 24001 may contain metadata information about the point cloud data in accordance with embodiments.

The moov box 24002 may contain information about one or more tracks in which the point cloud data in accordance with some embodiments is transmitted.

The moov box 24002 in accordance with some embodiments may include a box 24002*a* containing information about a track for transmitting attribute information of the point cloud data, a box 24002*b* containing information about a track for transmitting occupancy information of the point cloud data, a box 24002*c* containing information about a track for transmitting geometry information of the point cloud data, and/or a box (24002*d*) containing information about a track for transmitting V-PCC information of the point cloud data.

The mdat box 24003 may include a point cloud bitstream containing the point cloud data in accordance with embodiments. The point cloud bitstream in accordance with some embodiments may include a video coded attribute bitstream 24003*a*, a video coded occupancy bitstream 24003*b*, a video coded geometry bitstream 24003*c*, and/or a patch sequence data bitstream 24003*d*.

The video coded attribute bitstream 24003*a*, the video coded occupancy bitstream 24003*b*, the video coded geometry bitstream 24003*c*, and/or the patch sequence data bitstream 24003*d* in accordance with some embodiments may be carried by one or more video frames.

The video coded attribute bitstream 24003*a* refers to attribute information of the point cloud data, encoded by the V-PCC encoder in accordance with some embodiments.

The video coded occupancy bitstream 24003*b* refers to occupancy information of the point cloud data, encoded by the V-PCC encoder in accordance with some embodiments.

The video coded geometry bitstream 24003*c* refers to geometry information of the point cloud data, encoded by the V-PCC encoder in accordance with some embodiments.

The patch sequence data bitstream 24003*d* refers to patch sequence data of the point cloud data in accordance with some embodiments.

The 2D video tracks are encoded in accordance with a video encoder in accordance with embodiments.

In the sample entry, an extra box may be inserted which may document the role of the video stream contained in this track, in the V-PCC system.

A track reference may be inserted from the V-PCC patch data track to the video track, to establish the membership of the video track in the specific point cloud based on the patch track.

The track-header flags may be set to 0, to indicate that the track does not contribute directly to the overall layup of the movie, but contributes to the V-PCC system.

Tracks belonging to the same V-PCC sequence are time-aligned. Samples that contribute to the same point cloud frame across the different video-encoded component tracks and the V-PCC track may have the same presentation time.

A V-PCC track may contain sequence parameter sets and samples carrying the payloads of non-video encoded information V-PCC units. Here, the non-video encoded information V-PCC units may mean units whose V-PCC unit types are, for example, VPCC_SPS and VPCC_PDG.

This track may also provide track references to other tracks containing samples carrying the payloads of a video compressed V-PCC unit. Here, the other tracks may mean units whose V-PCC unit types are, for example, VPCC_GVD, VPCC_AVD, and VPCC_OVD.

The samples containing video-coded elementary streams for geometry data, which are payloads of V-PCC units of type VPCC_GVD, may be included in one or more video streams.

The samples containing video-coded elementary streams for attribute data, which are payloads of V-PCC units of type VPCC_AVD, may be included in one or more video streams.

The samples containing a video-coded elementary stream for occupancy map data, which are payloads of V-PCC units of type VPCC_OVD, may be included in one or more video streams.

Synchronization between the elementary streams in the component tracks may be handled by the ISO BMFF track timing structures (ctts and cslg, or equivalent mechanisms in movie fragments).

Samples that contribute to the same point cloud frame across different video encoded component tracks and the V-PCC track may have the same composition time. The V-PCC parameter sets used for such samples have a decoding time equal or prior to the composition time of the frame.

PCM means Pulse Coding Modulation. Missing point cloud points may be encoded by the PCM. When PCM is used, the codec type of a data unit containing PCM data may be different from the codec type for other data units.

PCM is a coding scheme that is applied to, for example, geometry data and/or attribute data. PCM-based encoding is a scheme for encoding geometry and/or attribute data associated with missing points.

PCM video data may be generated per component (e.g. geometry, attribute). In order for players or clients to operate properly, the indication of whether PCM is used or not may be signaled.

The encoder/decoder of the point cloud data transmission device and reception device in accordance with some embodiments may encode and decode the point cloud data based on the PCM. The PCM-based encoding in accordance with some embodiments may also be referred to as RAW-based encoding.

The PCM encoding scheme is an example of several encoding schemes, and embodiments are not limited to the PCM encoding scheme. For example, an additional encoding scheme such as Enhanced Occupancy Map (EOM) may be used. The EOM encoding is an encoding scheme for compensating for missing occupancy information in encoding the occupancy. In accordance with some embodiments, the method/devices in accordance with some embodiments propose a method for transmitting and signaling geometry/attribute data encoded in the additional specific scheme.

By performing encoding based on the PCM scheme, the point cloud data transmission method and transmission device in accordance with some embodiments may efficiently encode data (geometry data, attribute data, and/or occupancy data) about points missing in the process of encoding the point cloud data.

The point cloud data reception method and reception device in accordance with some embodiments may efficiently receive and reconstruct the data (geometry data, attribute data, and/or occupancy data) about the points missing in the process of encoding the point cloud data by the PCM scheme.

Figure 25:
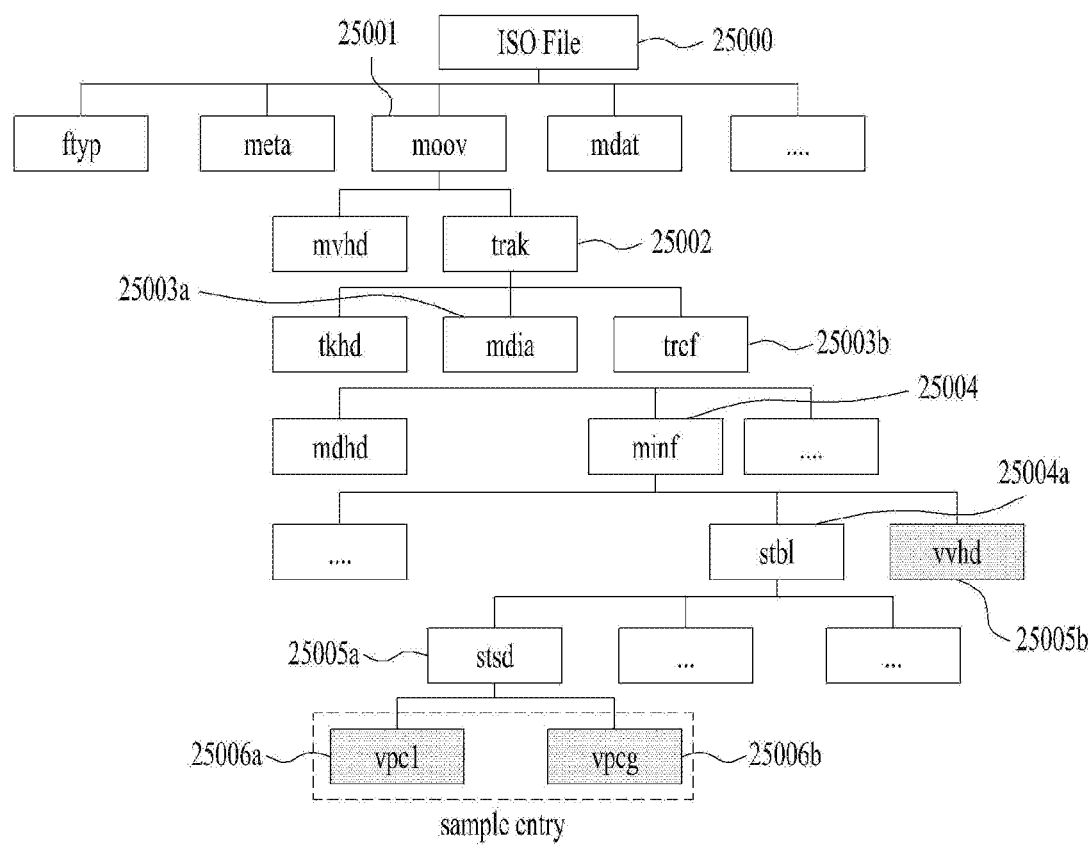
FIG. 25 shows an exemplary structure of point cloud data in the format of an ISOBMFF file in accordance with embodiments.

FIG. 25 shows an exemplary structure of point cloud data in the format of an ISOBMFF file in accordance with embodiments.

FIG. 25 shows an embodiment of a hierarchical structure of the ISOBMFF file format described in FIG. 24.

The point cloud data in accordance with some embodiments may be in an ISOBMFF file format 25000. The point cloud data in the ISOBMFF file format in accordance with some embodiments may include an ftyp type box, a meta type box, a moov type box, and/or an mdat type box.

The moov type box 25001 in accordance with some embodiments may be the moov box 24002 of FIG. 24. The moov type box in accordance with some embodiments may include an mvhd type box and/or a trak type box 25002. The trak type box 25002 represents a box containing information about one or more tracks in the ISOBMFF file format.

A track represents a time sequence of related samples in an ISO base media file.

The trak type box 25002 in accordance with some embodiments may include a tkhd box, which is header information about the trak type box 25002, an mdia box 25003*a* containing media information about a track, and/or a tref box 25003*b* for reference between the track and a sample of an ISOBMFF file corresponding to the track.

A sample of the ISOBMFF file may represent all data associated with a single timestamp. For example, two samples in one track may not be allowed to share the same timestamp.

The mdia type box 25003*a* in accordance with some embodiments may include an mdhd type box representing a header of a media box and/or a minf type box 25004 containing information of corresponding media data.

The minf type box (or media information box) 25004 in accordance with some embodiments may include an stbl type box 25004*a*, which is metadata about samples containing the media data included in the mdat type box.

The stbl type box 25004*a* in accordance with some embodiments may include a scheme information box (SchemeInformationBox (schm)) containing scheme information in accordance with embodiments.

The minf type box 25004 in accordance with some embodiments may further include a vvhd type box (or a volumetric visual-media header box) 25005*b*. The vvhd type box 25005*b* contains information about a volumetric visual track that contains a volumetric visual scene. Each volumetric visual scene may be represented by a unique volumetric visual track. An ISOBMFF file may contain multiple scenes and therefore multiple tracks may be present in the file.)

A volumetric visual track may be identified by the volumetric visual media handler type 'vols' in the HandlerBox of the MediaBox. The syntax of the volumetric visual-media header (the vvhd type box) in accordance with some embodiments is configured as follows.

Volumetric Visual Media Header
Box Type: 'vvhd'
Container: MediaInformationBox
Mandatory: Yes
Quantity: Exactly one
Volumetric track may use the VolumetricVisualMediaHeaderBox in the MediaInformationBox.

```
aligned(8) class VolumetricVisualMediaHeaderBox extends
    FullBox('vvhd', version = 0, 1) {
}
    'version' may be an integer that specifies the version of this box.
    Volumetric visual sample entry class
VolumetricVisualSampleEntry(codingname) extends SampleEntry
(codingname) {
        string Compressorname;
        // other boxes front derived specifications
}
```

The stbl type box 25004a in accordance with some embodiments includes an stsd type box (sample description box) 25005a containing a sample description for providing information about a coding type used and initialization information required for the coding type. The stsd type box 25005a may contain information indicating a decoder configuration for an elementary stream.

In accordance with embodiments, the stsd type box 25005a may include a sample entry for a V-PCC track in accordance with embodiments. The sample entry in accordance with some embodiments may be a vpc1 type box 25006a and/or a vpcg type box 25006b.

The V-PCC track in accordance with some embodiments may represent a track carrying parameters related to a point cloud. The syntax of a sample entry for the V-PCC track in accordance with some embodiments may be configured as follows.

V-PCC Track Sample Entry
Sample Entry Type: 'vpc1', 'vpcg'
Container: SampleDescriptionBox ('stsd')
Mandatory: A 'vpc1' or 'vpcg' sample entry is mandatory.
Quantity: One or more sample entries may be present.

V-PCC tracks may use a V-PCC volumetric sample entry (VolumetricVisualSampleEntry) with a sample entry type of 'vpc1' or 'vpcg'. A VPCC volumetric sample entry in accordance with embodiments may contain a V-PCC configuration box (VPCCConfigurationBox), as defined below. The VPCCConfigurationBox may include a V-PCC configuration record box (VPCCDecoderConfigurationRecord). All data in the array of setup vpcc units may be stored as sample_stream_vpcc_units, with the ssvu_vpcc_unit_size configured by the header as provided herein.

```
aligned(8) class VPCCDecoderConfigurationRecord {
    unsigned int(8) configurationVersion = 1;
    sample_stream_vpcc_header header;
    unsigned int(8) numOfSetupUnits;
    for (i=0; i<numOfSetupUnits; i++) {
```

```
        sample_stream_vpcc_unit setupUnit;
    }
    // additional fields
}
class VPCCConfigurationBox extends Box('vpcC') {
    VPCCDecoderConfigurationRecord( ) VPCCConfig;
}
aligned(8) class VPCCSampleEntry( ) extends
VolumetricVisualSampleEntry ('vpc1') {
    VPCCConfigurationBox           config;
    VPCCUnitHeaderHeaderBox        unit;
}
``` configurationVersion is a version field. Incompatible changes to the record are indicated by a change of version number.

The header is a sample_stream_vpcc_header.

numOfSetupUnits specifies the number of V-PCC parameter sets signaled in the decoder configuration record.

The setupUnit array may include sequence_parameter_set and may include other VPCC units that are constant for the stream referred to by this sample entry.

The method and device for transmitting point cloud data in accordance with some embodiments may deliver point cloud data and related signaling information in an ISOBMFF structure. Accordingly, the reception device may efficiently perform decoding.

Figure 26:
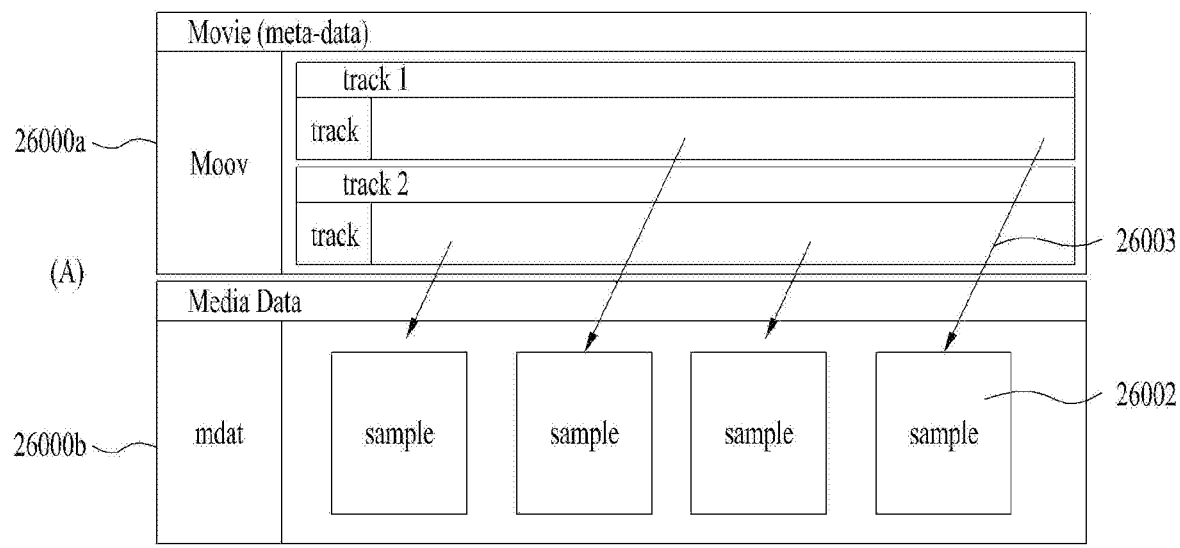
FIG. 26 shows point cloud data in an ISOBMFF file format in accordance with embodiments.

FIG. 26 shows point cloud data in an ISOBMFF file format in accordance with embodiments.

FIG. 26(A) shows a moov box 26000a containing information about point cloud data in an ISOBMFF file format and an mdat box 26000b containing the point cloud data in accordance with embodiments. The moov box 26000a of FIG. 26(A) may represent the moov box 24002 described in FIG. 24 and the moov type box 25001 described in FIG. 25. The mdat box 26000b of FIG. 26(A) may represent the mdat box 24003 of FIG. 24 and the mdat box of FIG. 25.

The moov box 26000a in accordance with some embodiments includes one or more trak boxes 26001. The mdat box 26000b in accordance with some embodiments contains point cloud data transmitted through one or more tracks. The point cloud data is transmitted through one or more samples 26002. The moov box 26000a in accordance with some embodiments contains information about data to be transmitted through the corresponding track, and signals the same for each sample (26003).

A track represents a time sequence of related samples in an ISO base media file.

A sample of the ISOBMFF file may represent all data associated with a single timestamp. For example, two samples in one track may not be allowed to share the same timestamp.

In accordance with embodiments, the decoder in accordance with some embodiments needs a link between information about data that is to be transmitted through the corresponding track and contained in the moov type box 26000a, that is, a V-PCC track in accordance with some embodiments, and a corresponding sample. In other words, the encoder in accordance with some embodiments needs information for linking the point cloud data transmitted through the V-PCC track (e.g., sequence parameter sets and non-video coded information V-PCC units) to a sample containing the corresponding point cloud data components.

To link a V-PCC track (a track including parameters related to a point cloud) to the component video tracks thereof in accordance with embodiments, a track reference tool of the ISOBMFF standard may be used.

For example, a trak type box (trak box) included in the V-PCC track may include a track reference box (tref box). The track reference box may represent a box for referencing and/or linking a track to another track. The track reference box may include a track reference type box. The track reference type box may be a type of a box having reference_type. The track reference type box (TrackReferenceTypeBox) may contain a list (array) of track_IDs referencing video tracks that the V-PCC track references.

```
aligned(8) class TrackReferenceBox extends Box('tref') {
}
    aligned(8) class TrackReferenceTypeBox (unsigned int(32)
reference_type) extends Box(reference_type) {
        unsigned int(32) track_IDs[ ];
    }
``` track_ID provides a reference for the track to reference another track in the presentation.

The reference_type of the TrackReferenceTypeBox may be, for example, 'pccc'. In other words, The V-PCC component carried by the restricted video track as well as information about the component may be identified from the VPCCUnitHeaderBox in the SchemeInformationBox of the track referenced according to the above-described method due to the aforementioned structure.

The reference_type of a TrackReferenceTypeBox may identify the type of the component (e.g., geometry data, attribute data, or occupancy map). For example, the following reference types may be given.

'pcca': the referenced track(s) contain the video-coded attribute V-PCC component.
'pccg': the referenced track(s) contain the video-coded geometry V-PCC component.
'pcco': the referenced track(s) contain the video-coded occupancy map V-PCC component.
'pcma': the referenced track(s) contain the PCM-coded attribute V-PCC component.

PCM encoding means the encoding of the pulse coding modulation scheme. PCM encoding is described in more detail below.

'pcmg': the referenced track(s) contain the PCM-coded geometry V-PCC component.
'pcmo': the referenced track(s) contain the all PCM-coded geometry or attribute V-PCC component.

A V-PCC track sample format in accordance with embodiments may be configured as follows. Each sample in the V-PCC track corresponds to a single point cloud frame. Samples corresponding to this frame in the various component tracks shall have the same composition time as the V-PCC track sample. Each V-PCC sample only contains one V-PCC unit payload of type VPCC_PDG, which may include one or more patch sequence unit payloads.

```
aligned(8) class VPCCSample {
    unsigned int VPCCLength = sample_size; //Size of Sample e.g.
    from SampleSizeBox
    for (i=0; i< VPCCLength; ) {        // to end of the sample
        sample_stream_vpcc_unit    unit;
        i += (ssvh_unit_size_precision_bytes_minus1 + 1)
+ unit.ssvu_vpcc_unit_size;
    }
}
``` vpcc_unit_payload_size provides the number of bytes for the vpcc_unit_payload( ).

sample_stream_vpcc_unit is a V-PCC unit of type VPCC_PDG.

FIG. 26(B) shows a sample stream vpcc header included in a sample entry in accordance with embodiments. The sample entry in accordance with some embodiments may represent the sample entry described in FIG. 25.

The sample stream vpcc header 26004 includes ssvh_unit_size_precision_bytes_minus1.

ssvh_unit_size_precision_bytes_minus1 will be described. ssvh_unit_size_precision_bytes_minus1 plus 1 specifies the precision, in bytes, of the ssvu_vpcc_unit_size element in all sample stream V-PCC units.

The order of sample stream V-PCC units in the sample stream follows the decoding order of the V-PCC units contained in the sample stream V-PCC units.

The content of each sample stream V-PCC unit is associated with the same access unit as the V-PCC unit contained in the sample stream V-PCC unit.

FIG. 26(C) shows a sample stream vpcc unit included in a sample entry in accordance with embodiments. The sample stream vpcc unit 26005 includes ssvu_vpcc_unit_size.

ssvu_vpcc_unit_size specifies the size in bytes of the subsequent V-PCC unit. The number of bits used to represent ssvu_vpcc_unit_size is equal to (ssvh_unit_size_precision_bytes_minus1+1)×8.

The sample stream V-PCC unit signals the V-PCC unit based on the ssvu_vpcc_unit_size.

Figure 27:
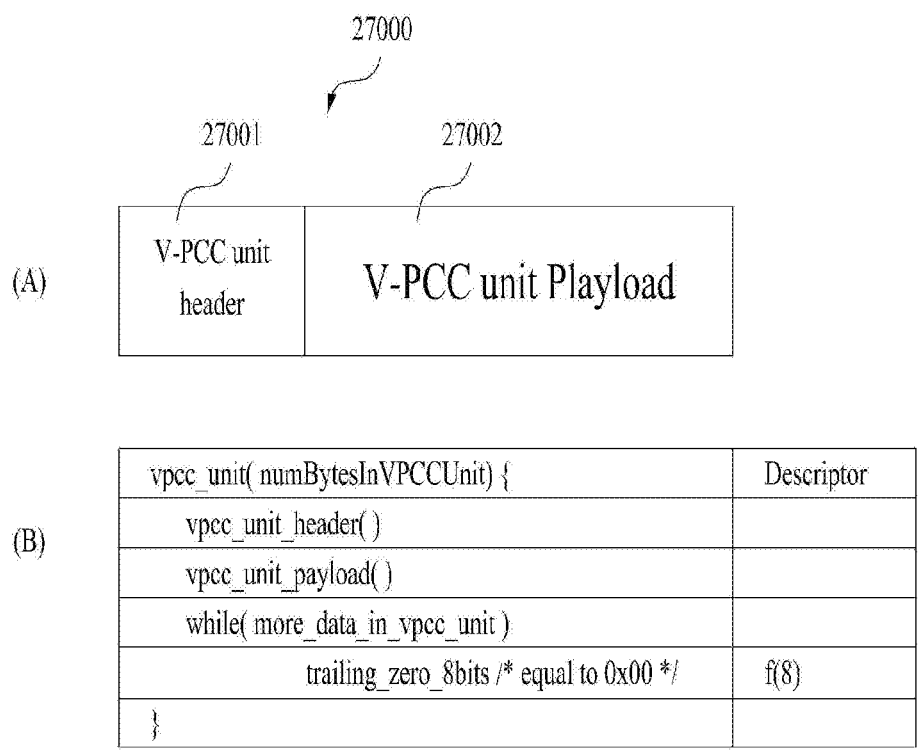
FIG. 27 shows a V-PCC unit in which point cloud data is transmitted in accordance with embodiments.

FIG. 27 shows a V-PCC unit in which point cloud data is transmitted in accordance with embodiments.

A V-PCC unit in accordance with some embodiments may be contained in a V-PCC bitstream. The V-PCC bitstream in accordance with some embodiments may be generated by the V-PCC encoder of FIG. 4, the video/image encoder of FIG. 15, or the multiplexer 18007 of FIG. 18. The V-PCC unit in accordance with some embodiments may be generated by a video encoder or an audio encoder in accordance with embodiments (e.g., the video encoder 20002 of FIG. 20, the image encoder 20003, or the video encoder 21007 or the image encoder 21008 of FIG. 21).

FIG. 27 illustrates transmitting a V-PCC bitstream containing point cloud data in a V-PCC unit 27000 in accordance with embodiments. The V-PCC unit 27000 in accordance with some embodiments includes a V-PCC unit header 27001 and a V-PCC unit payload 27002.

FIG. 27 shows the syntax of a V-PCC unit. The V-PCC unit includes a V-PCC unit header and a V-PCC unit payload. The syntax of the header and the payload will be described in detail below.

Details of the syntax of the V-PCC unit header 27001 in accordance with some embodiments will be described with reference to FIG. 31.

The V-PCC unit header in accordance with some embodiments may include a V-PCC unit header box. The V-PCC unit header box in accordance with some embodiments may have the following syntax.

V-PCC Unit Header Box

This box may be present in both the V-PCC patch data track (in the sample entry) and in all video tracks (in the scheme information).

```
aligned(8) class VPCCUnitHeaderBox extends FullBox('vunt',
version = 0, 0) {
    vpcc_unit_header( )     unit;
}
```

The V-PCC unit payload 27002 in accordance with some embodiments contains point cloud data in accordance with embodiments. The point cloud data may include occupancy video data, geometry video data, and/or attribute video data of the point cloud data. The point cloud data may include PCM-encoded geometry video data and/or PCM-encoded attribute video data.

In accordance with embodiments, the PCM encoding may be referred to as RAW encoding.

The details of the syntax of the V-PCC unit payload 27002 in accordance with some embodiments will be described with reference to FIG. 32.

Figure 28:
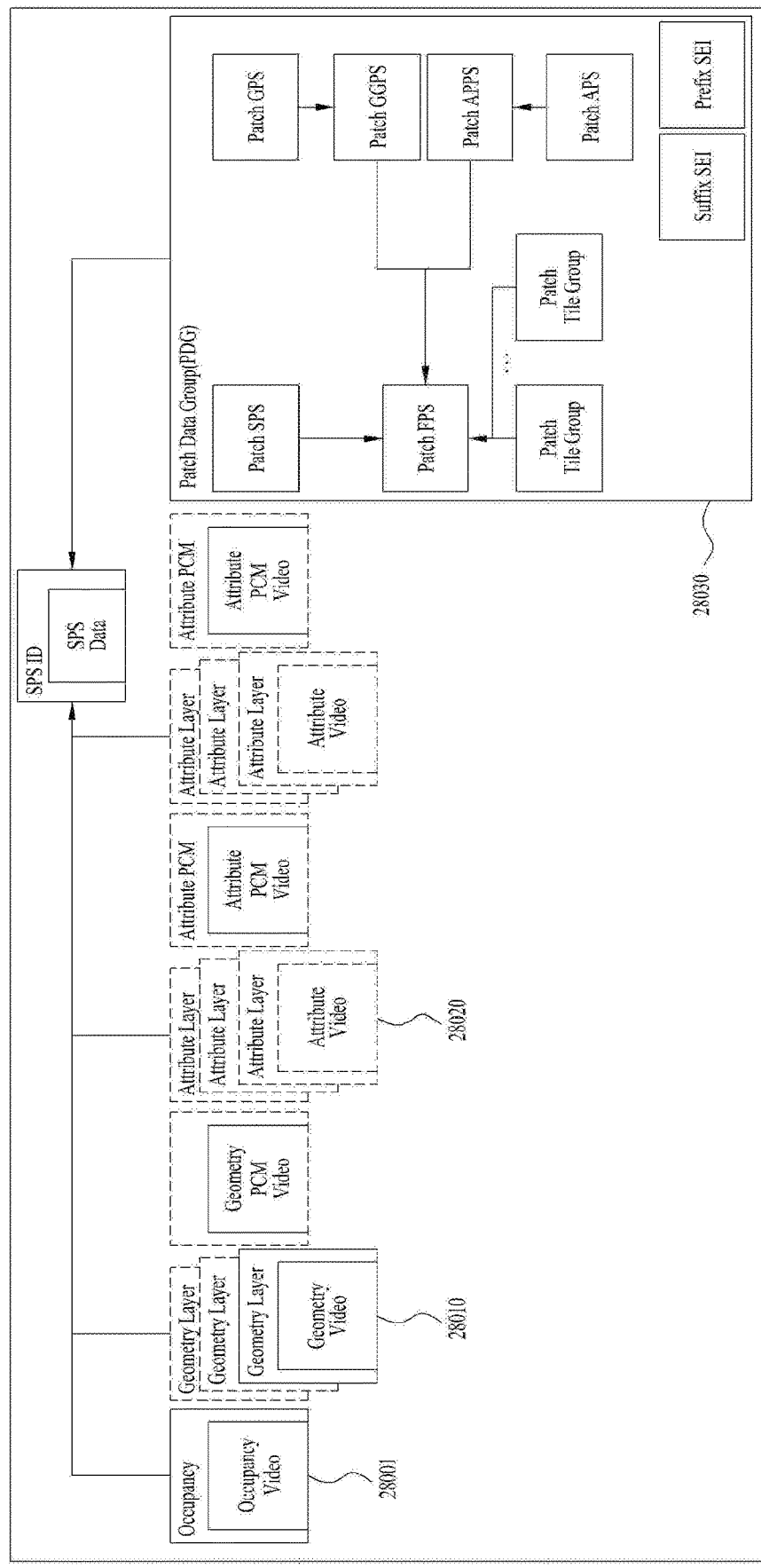
FIG. 28 shows data contained in a V-PCC unit in accordance with embodiments.

FIG. 28 shows data contained in a V-PCC unit in accordance with embodiments.

A V-PCC unit in accordance with some embodiments may be contained in a V-PCC bitstream. The V-PCC bitstream in accordance with some embodiments may be generated by the V-PCC encoder of FIG. 4, the video/image encoder of FIG. 15, or the multiplexer 18007 of FIG. 18.

The V-PCC unit may contain sequence parameter set (SPS) data 28000, a patch data group (PDG) 28001, occupancy video data 28002, one or more geometry layers 28003 including geometry video data, and/or one or more attribute layers 28004 including attribute video data. The SPS data 28000 and/or the PDG 28001 in accordance with some embodiments may be contained in the V-PCC unit payload in accordance with some embodiments.

The point cloud data transmission device in accordance with some embodiments may contain PCM data obtained by PCM-encoding the point cloud data. PCM is a coding scheme that is applied to, for example, the geometry data and/or the attribute data. The PCM encoding is an encoding scheme for encoding geometry and/or attribute data associated with missing points.

The PCM data in accordance with some embodiments includes geometry PCM video data in which the geometry information of the point cloud data is PCM-encoded and/or attribute PCM video data in which the attribute information of the point cloud data is PCM-encoded.

The PCM encoding in accordance with some embodiments may be referred to as RAW encoding. That is, the PCM data in accordance with some embodiments may be referred to as RAW data. The RAW data includes geometry RAW video data in which the geometry information of the point cloud data is encoded by the RAW scheme, and/or attribute RAW video data in which the attribute information of the point cloud data is encoded by the RAW scheme.

The point cloud data transmission device in accordance with some embodiments may also contain EOM data encoded in accordance with the EOM scheme to compensate for occupancy data missing in occupancy coding of the point cloud data.

The EOM data in accordance with some embodiments includes geometry EOM occupancy data in which the geometry information of the point cloud data is encoded by the EOM scheme.

Accordingly, the V-PCC unit in accordance with some embodiments may further contain geometry PCM video data 28003*b* and/or attribute PCM video data 28004*b* in accordance with some embodiments.

Here, the PCM encoding in accordance with some embodiments may be referred to as RAW encoding. Accordingly, the V-PCC unit in accordance with some embodiments may further contain geometry RAW video data 28003*b* and/or attribute RAW video data 28004*b* in accordance with some embodiments. The V-PCC unit in accordance with some embodiments may further contain EOM occupancy data in accordance with some embodiments.

The SPS data 28000 in accordance with some embodiments is a syntax structure containing syntax elements that apply to zero or more entire CVSs as determined by the content of a syntax element found in the PPS referred to by a syntax element found in each slice segment header.)

The occupancy video data 28002 in accordance with some embodiments may be referred to as occupancy video, occupancy video data, occupancy data, occupancy, or the like.

The geometry layer 28003 in accordance with some embodiments includes geometry video data in accordance with embodiments. The geometry video (which may be referred to as geometry data, geometry, geometry video data, or the like) may be present for each geometry layer. The geometry layer may be a unit for distinguishing data in encoding geometry data based on one or more layers. For example, in expressing the geometry data in a tree structure, a depth/level or the like may be interpreted as a geometry layer.

The geometry PCM video data in accordance with some embodiments represents geometry video data encoded by the PCM scheme in accordance with embodiments. That is, when the PCM scheme is applied to V-PCC encoding, a geometry PCM video may be additionally present in the V-PCC bitstream.

PCM is a coding scheme that is applied to, for example, geometry data and/or attribute data. PCM-based encoding is a scheme for encoding geometry and/or attribute data associated with missing points. Hereinafter, PCM may be understood to be the same as RAW.

The attribute layer 28004 in accordance with some embodiments includes attribute video data in accordance with embodiments. The attribute video may be referred to as attribute data, attribute, attribute video data, or the like. The attribute video 28020 may be present for each attribute layer. The attribute layer may be a unit for distinguishing data in encoding attribute data based on one or more layers. For example, in expressing attribute data based on LOD, an LOD index or the like may be interpreted as an attribute layer.

The attribute PCM video data 28004*b* in accordance with some embodiments represents attribute video data encoded by the PCM scheme in accordance with embodiments. When the PCM scheme is applied to V-PCC encoding, an attribute PCM video may be additionally present in the V-PCC bitstream.

The patch data group 28030 is a group including information about a patch. Information about 2D patches for each point cloud frame may be included therein. For example, the group may include a size, a 2D placement, a position corresponding to a 3D region in a 3D point cloud, a projection plane, and an LOD parameter for the patches.

Specifically, the patch data group 28030 may include a patch SPS, a patch FPS, a patch tile group, a patch GPS, a patch GPPS, a patch APPS, a patch APS, a suffix SEI, and a prefix SEI.

A patch tile group in accordance with embodiments may be referred to as an atlas tile group. In accordance with embodiments, a patch data group may include a patch tile group including a plurality of patch tiles, or may include patch tiles individually. Further, in accordance with embodiments, the patch tile group may include one or more atlas tiles.

Accordingly, the patch tile group described below may also be referred to as an atlas tile group. In addition, in the following description, signaling information or flag information related to the patch tile group may be understood as information signaling an atlas tile group or information signaling each atlas tile.

The patch data group will be described in detail below.

The occupancy data 228001, the geometry video 28010 of the geometry layer, the attribute video 28020 of the attribute layer, and the patch data group 28030 may reference SPS data having the same SPS ID. Hereinafter, embodiments of signaling parameters in relation to a patch data group will be described. The patch data group (PDG) 28030 in the V-PCC bitstream may include patch parameters such as PDG_PSPS, PDG_PFPS, PDG_PFGPS, PDG_PFAPS, PDG_GPPS, and PDG_APPS.

A PDG, which is the patch data group 28030, may be included in the V-PCC track 24002*d* in accordance with embodiments. The V-PCC track may be composed of a sample and a sample entry describing the sample. In accordance with embodiments, the V-PCC track sample entry may include patch parameters such as PDG_PSPS, PDG_PFPS, PDG_PFGPS, PDG_PFAPS, PDG_GPPS, and PDG_APPS. The sample entry of the V-PCC track may be configured as follows.

A V-PCC volumetric sample entry includes VPCCConfigurationBox. VPCCConfigurationBox includes VPCCDecoderConfigurationRecord. All data in both the array of setup vpcc units and the samples is stored as sample_stream_vpcc_units with the subsequent V-PCC unit size (ssvu_vpcc_unit_size) configured by the header.

```
aligned(8) class VPCCDecoderConfigurationRecord {
    unsigned int(8) configurationVersion = 1;
    sample_stream_vpcc_header header;
    unsigned int(8) numOfSetupUnits;
    for (i=0; i<numOfSetupUnits; i++) {
        sample_stream_vpcc_unit setupUnit;
    }
    // additional fields
    unsigned int(8) numOfPDGSetupUnits;
    for (i=0; i< numOfPDGSetupUnits; i++) {
        sample_stream_vpcc_unit PDGsetupUnit;
    }
}
``` configurationVersion is a version field. Incompatible changes to the record are indicated by a change of version number.

The header is a sample stream V-PCC header.

The setupUnit includes sequence_parameter_set and other V-PCC units that are constant for the stream referred to by this sample entry.

The sample_streamvpcc_header represents the header of the sample entry.

numOfSetupUnits specifies the number of setup units that are division units of a sample entry. The number of sample units means the number of setup units signaled in the sample group description. The number of setup units indicates the number of V-PCC parameter sets signaled in the decoder configuration record.

setupUnit specifies a setup unit that carries data in the sample entry.

numOfPDGSetupUnits specifies the number of setup units that carry the PDG in the sample entry.

In accordance with embodiments, based on the numOfPDGSetupUnits, the sample entry signals sample_stream_vpcc_unit PDGsetupUnit. The sample_stream_vpcc_unit PDGsetupUnit represents a unit that carries PDG data.

This represents a unit of the PDG of the PDG types in accordance with some embodiments, for example, a NAL unit, which corresponds to the PDG that is signaled by this sample entry or carries data associated with a group of samples.

The numOfSetupUnits specifies the number of patch data group parameters including PDG_PSPS, PDG_PFPS, PDG_PFGPS, PDG_PFAPS, PDG_GPPS, PDG_APPS, PDG_PREFIX_SEI, and/or PDG_SUFFIX_SEI. These parameters may be signaled in accordance with the decoder configuration.

The PDGsetupUnit array includes PDG parameter sets (PDG_PSPS, PDG_PFPS, PDG_PFGPS, PDG_PFAPS, PDG_GPPS, PDG_APPS, PDG_PREFIX_SEI, and/or PDG_SUFFIX_SEI). These parameters are information associated with samples in the track.

Each sample in accordance with embodiments may include parameter sets associated with the sample. Here, each sample in the V-PCC track corresponds to a single point cloud frame. The syntax of the V-PCC sample may be configured as follows.

```
aligned(8) class VPCCSample {
    unsigned int VPCCLength = sample_size; //Size of Sample e.g.
    from SampleSizeBox
    for (i=0; i< VPCCLength; ) {        // to end of the sample
        sample_stream_vpcc_unit        unit;
        i += (ssvh_unit_size_precision_bytes_minus1 + 1)
+ unit.ssvu_vpcc_unit_size;
    }
}
```

VPCCLength corresponds to sample_size specifying the size of a sample. The size of the sample may be described in SampleSizeBox.

vpcc_unit_payload_size provides the number of bytes for the vpcc_unit_payload.

sample_stream_vpcc_unit is a V-PCC unit of type VPCC_PDG. This unit may include parameter sets (PDG_PSPS, PDG_PFPS, PDG_PFGPS, PDG_PFAPS, PDG_GPPS, PDG_APPS, PDG_PREFIX_SEI, or PDG_SUFFIX_SEI).

The V-PCC sample may signal parameter sets based on the size of the sample.

In order to efficiently signal a parameter set applicable to one or more V-PCC samples, sample grouping may be performed as follows.

A V-PCC track may contain zero or one SampleToGroupBox. For the SampleToGroupBox, grouping_type may be 'vpcs'.

The SampleToGroupBox may contain patch parameter sets (PDG_PSPS, PDG_PFPS, PDG_PFGPS, PDG_PFAPS, PDG_GPPS, PDG_APPS, PDG_PREFIX_SEI, or PDG_SUFFIX_SEI) associated with corresponding samples in this track.

When a SampleToGroupBox with grouping_type equal to 'vpcs' is present, a SampleGroupDescriptionBox with the same grouping type is present.

When sample grouping is applied, the syntax of the V-PCC patch group description entry may be configured as follows. Here, SampleGroupDescriptionEntry may be extended as follows.

```
aligned(8) class VPCCPatchGroupDescriptionEntry( ) extends
    SampleGroupDescriptionEntry
('vpcs') {
    unsigned int(8) numOfPDGSetiipUnits;
        for (i=0; i< numOfPDGSetupUnits; i++) {
            sample_stream_vpcc_unit PDGsetupUnit;
        }
}
``` numOfSetupUnits specifies the number of patch data group parameter sets (PDG_PSPS, PDG_PFPS, PDG_PFGPS, PDG_PFAPS, PDG_GPPS, PDG_APPS, PDG_PREFIX_SEI, or PDG_SUFFIX_SEI).

The PDGsetupUnit array may include patch data group parameter sets (PDG_PSPS, PDG_PFPS, PDG_PFGPS, PDG_PFAPS, PDG_GPPS, PDG_APPS, PDG_PREFIX_SEI, or PDG_SUFFIX_SEI) associated with samples of this group.

FIG. 29 illustrates an exemplary method for transmitting PCM data in accordance with embodiments.

FIG. 29 illustrates a method of transmitting PCM-encoded point cloud data (which may be referred to as RAW-encoded point cloud data) described in FIG. 28.

FIG. 29(A) shows point cloud data in an ISOBMFF file format in accordance with embodiments. The point cloud data in accordance with some embodiments contains a moov box and an mdat box.

In accordance with some embodiments, some points may be missing in the process of encoding the point cloud data in accordance with some embodiments. Accordingly, the encoder in accordance with some embodiments may perform encoding in accordance with the PCM scheme in order for the reception device to reconstruct the geometry information and/or attribute information about the missing points.

However, the point cloud data reception device in accordance with some embodiments needs to quickly find point cloud data encoded by the PCM scheme. This is because if a large amount of point cloud data is missing in the encoding process, the quality of the content of the point cloud data may depend on the degree of decoding of the data encoded by the PCM scheme.

Here, the object encoded by the PCM scheme may be transmitted in different tracks depending on whether the object is geometry information or attribute information of the point cloud data. In accordance with some embodiments, the reception device may quickly receive the PCM-encoded geometry information and/or the PCM-encoded attribute information.

Accordingly, in accordance with embodiments, the point cloud data may be stored and transmitted in an ISOBMFF file of a plurality of tracks. For example, the ISOBMFF file in accordance with some embodiments may include a track containing geometry data of the point cloud data and a track containing attribute data of the point cloud data.

In accordance with some embodiments, point cloud data may be encoded by the PCM scheme. That is, the encoder in accordance with some embodiments may encode the point cloud data in accordance with the PCM scheme. Accordingly, the ISOBMFF file in accordance with some embodiments may include a track 29000b-1 containing the geometry data of the point cloud encoded by the PCM scheme and a track 29000b-2 containing the attribute data of the point cloud data encoded by the PCM scheme.

For example, as shown in FIG. 29(A), the moov box in accordance with some embodiments may include a first track box (first trak box) for geometry data encoded by the PCM scheme and a second track box (second trak box) for attribute data encoded by the PCM scheme. In addition, the mdat box in accordance with some embodiments may contain a geometry PCM bitstream 29000c-1 carrying the geometry data encoded by the PCM scheme and an attribute PCM bitstream 29000c-2 carrying the attribute data encoded by the PCM scheme.

The geometry PCM bitstream 29000c-1 in accordance with some embodiments may carry the geometry data encoded by the PCM scheme in one or more PCM samples. Likewise, the attribute PCM bitstream 29000c-2 in accordance with some embodiments may carry the attribute data encoded by the PCM scheme in one or more PCM samples.

FIG. 29(B) shows a PCM sample 29000c in accordance with embodiments.

The PCM sample 29000c in accordance with some embodiments may be contained in the mdat box in accordance with some embodiments. One or more PCM samples in the mdat box may be referred to as a PCM sample stream or a sample stream.

The PCM sample 29000c in accordance with some embodiments may contain attribute data encoded by the PCM scheme in accordance with embodiments (which may be referred to as an attribute PCM video data unit) or geometry data 29001d encoded by the PCM scheme (which may be referred to as a geometry PCM video data unit).

Referring to FIG. 29, for the point cloud data in accordance with some embodiments, the geometry data of the point cloud data and the attribute data of the point cloud data may be transmitted through the first track and the second track, respectively. For example, the mdat box contains one or more samples carrying a geometry PCM bitstream corresponding to the first track, and one or more samples carrying an attribute PCM bitstream corresponding to the second track.

A PCM sample carrying the geometry PCM bitstream includes geometry PCM video data unit 29001d. The PCM sample carrying the geometry PCM bitstream may further include a sequence parameter set 29001b. The PCM sample carrying the geometry PCM bitstream may further include length information 29001a about the sequence parameter set 29001b and/or length information 29001c about the geometry PCM video data unit 29001d.

In accordance with embodiments, a sequence parameter set may be included in a sample entry of a trak box of each track included in the moov box. The sample entry may include a VPCC unit video box (VPCCVideoBox). The VPCCVideoBox may be present in any box under the sample entry.

```
aligned(8) class VPCCVideoBox extends FullBox('vpcc', 0, 0) {
    unsigned int(8) numOfSetupUnits;
    for (i=0; i<numOfSetupUnits; i++) {
        sample_stream_vpcc_unit setupUnit;
    }
}
```

The VPCC unit header box in accordance with some embodiments may have the following syntax.

```
aligned(8) class VPCCUnitHeaderBox extends FullBox('vpch', 0, 0) {
    sample_stream_vpcc_header    header;
}
``` numOfSetupUnits specifies the number of V-PCC parameter sets signaled in the decoder configuration record.

setupUnit may be an array including sequence_parameter_set and may include other VPCC units that are constant for the stream referred to by this sample entry.

The header may be in the form of sample_stream_vpcc_header.

The vpcc_unit_header may contain information about whether the geometry PCM data or attribute PCM is contained in the track.

The syntax of the PCM sample 29000c in accordance with some embodiments may be configured as follows.

```
aligned(8) class PCMSample {
    unsigned int VPCCLength = sample_size; //Size of Sample e.g. from
    SampleSizeBox
    for (i=0; i< VPCCLength; )   {   // to end of the sample
        sample_stream_vpcc_unit   unit;
        i += (ssvh_unit_s         ize_precision_bytes_minus1 + 1)
    + unit.ssvu_vpcc_unit_size;
    }
}
```

Samples that contribute to the same point cloud frame across different video tracks may have the same composition time. When the geometry PCM or attribute PCM is coded by different codecs, rather than same codec with non-PCM video data, the PCM data may be carried in multiple tracks.

The decoder in accordance with some embodiments needs signaling information about the PCM coded point cloud data in accordance with some embodiments. Specifically, since decoded frames from the attribute, geometry, or occupancy map data may not be displayed without reconstructing the point cloud data on the decoder side, a restricted video scheme type may be defined for video-coded tracks.

In accordance with embodiments, it is not meaningful to display the decoded frames from attribute data, geometry data, or occupancy map tracks without reconstructing the point cloud on the reception side. Therefore, a restricted video scheme may be defined for video-coded tracks in accordance with embodiments.

V-PCC component video tracks shall be represented in the file as restricted video. These V-PCC component video tracks may be identified by 'pccv' in the scheme_type field of the SchemeTypeBox of the RestrictedSchemeInfoBox of their restricted video sample entries.

The encoder in accordance with some embodiments may encode the attribute data, geometry data and/or occupancy map data (V-PCC components), and there is no particular restriction on the video codec used for encoding the same.

Scheme Information

The SchemeInformationBox may be present and contain a VPCCUnitHeaderBox.

Box Type: 'vpcc'
Container: SchemeInformationBox
Mandatory: Yes, when scheme_type is equal to 'pccv'
Quantity: Zero or one

```
aligned(8) class VPCCVideoBox extends FullBox('vpcc', 0, 0) {
    unsigned int(1)         pcm_video_present_flag;
    unsigned int(1)         pcm_video_only_flag;
    unsigned int(8)         pcm_codec_id;
    }
```

In accordance with embodiments, the VPCCVideoBox may further include a pcm_video_present_flag, a pcm_video_only_flag, a pcm_patch_enabled_flag, and/or a pcm_codec_id. The pcm_video_present_flag, pcm_video_only_flag, pcm_patch_enabled_flag, and/or pcm_codec_id in accordance with some embodiments may be contained in a VPCC unit header in accordance with embodiments.

The vpcc_unit_header represents the VPCC unit header in accordance with some embodiments.

PCM is a coding scheme that is applied to, for example, the geometry data and/or the attribute data. The PCM encoding is an encoding scheme for encoding geometry and/or attribute data associated with missing points. The PCM may be understood to be the same as RAW. The PCM encoding in accordance with some embodiments may be replaced with EOM encoding.

pcm_video_present_flag equal to 1 indicates that this track may contain PCM coded geometry or attribute video data. pcm_video_present_flag equal to 0 indicates that this track does not contain PCM coded geometry or attribute video data.

That is, when the track contains attribute data, the pcm_video_present_flag in accordance with some embodiments may indicate whether there is data encoded by the PCM scheme among the attribute data. The PCM encoding in accordance with some embodiments may be called RAW encoding. Accordingly, the pcm_video_present_flag in accordance with some embodiments may be called by other terms (e.g., raw_video_present_flag). In addition, the PCM encoding in accordance with some embodiments may be replaced with EOM encoding.

pcm_video_only_flag equal to 1 indicates that this track contains PCM coded geometry or attribute data only. pcm_vieo_only_flag equal to 0 indicates that this track may contain PCM coded geometry or attribute video data.

The pcm_video_only_flag in accordance with some embodiments may be referred to as vuh_auxiliary_video_flag.

The pcm_video_only_flag in accordance with some embodiments may indicate whether the geometry or attribute video data unit (of the corresponding track) associated with the corresponding information includes only points encoded in accordance with the PCM encoding scheme. In other words, pcm_video_only_flag equal to 1 indicates that the geometry or attribute data constituting a sample in accordance with some embodiments is encoded based on the PCM encoding scheme. On the other hand, pcm_video_only_flag equal to 0 indicates that some geometry or attribute data present in the sample in accordance with some embodiments is encoded based on the PCM encoding scheme.

The PCM encoding in accordance with some embodiments may be called RAW encoding. Accordingly, the pcm_video_only_flag in accordance with some embodiments may be called by other terms (e.g., raw_video_only_flag). In addition, the PCM encoding in accordance with some embodiments may be replaced with EOM encoding.

The point cloud data reception device in accordance with some embodiments may check whether point cloud data carried by a specific track (e.g. attribute data, geometry data) is encoded by the PCM scheme, based on pcm_video_only_flag and/or pcm_video_present_flag in accordance with some embodiments. That is, the point cloud data reception device in accordance with some embodiments may search for the point cloud data encoded by the PCM scheme and may or may not selectively perform additional decoding thereon.

pcm_patch_enabled_flag equal to 1 indicates that patches with PCM coded points are used. pcm_patch_enabled_flag equal to 0 indicates that patches with PCM coded points are not used. When pcm_patch_enabled_flag is equal to 1, this indicates that a PCM patch data unit may be carried in the V-PCC track in the file.

The PCM encoding in accordance with some embodiments may be called RAW encoding. Accordingly, the PCM patch enable flag (pcm_patch_enabled_flag) in accordance with embodiments may be called in other terms (e.g., RAW patch enable flag, raw_patch_enabled_flag). Also, the PCM-based encoding in accordance with some embodiments may be replaced with the EOM-based encoding.

pcm_codec_id indicates the identifier of the codec used to compress the pcm-coded geometry or attribute video data in the track.

A point cloud data transmission method and transmission device in accordance with embodiments may signal whether to carry point cloud data encoded by a specific scheme (e.g., the PCM scheme) in a single track or multiple tracks, thereby allowing decoding to be adaptively performed in accordance with the performance of the receiver.

A point cloud data reception method and reception device in accordance with embodiments may perform decoding based on information indicating whether point cloud data encoded by a specific method (e.g., the PCM scheme) is carried in a single track or multiple tracks. Thereby, decoding may be performed adaptively in accordance with the performance of the receiver.

FIG. 30 illustrates another exemplary method for transmitting PCM data through point cloud data in accordance with embodiments.

FIG. 30 shows another example of a method of transmitting PCM-encoded point cloud data (which may be referred to as RAW encoded point cloud data) illustrated in FIG. 28. The point cloud data in accordance with some embodiments may be transmitted using the method illustrated in FIG. 29 or the method illustrated in FIG. 30.

FIG. 30 shows point cloud data of an ISOBMFF file format in accordance with embodiments. The point cloud data in accordance with some embodiments contains a moov box and an mdat box.

In accordance with some embodiments, some points may be missing in the process of encoding the point cloud data in accordance with some embodiments. Accordingly, the encoder in accordance with some embodiments may perform encoding in accordance with the PCM scheme in order for the reception device to reconstruct the geometry information and/or attribute information about the missing points.

However, the point cloud data reception device in accordance with some embodiments needs to quickly find point cloud data encoded by the PCM scheme. This is because if a large amount of point cloud data is missing in the encoding process, the quality of the content of the point cloud data may depend on the degree of decoding of the data encoded by the PCM scheme.

Here, the point cloud data may be transmitted in a separate track depending on whether the point cloud data is encoded by the PCM scheme. In accordance with some embodiments, the reception device may quickly receive the PCM-encoded point cloud data.

Accordingly, in accordance with embodiments, the point cloud data may be stored and transmitted in an ISOBMFF file of a single track. For example, the ISOBMFF file in accordance with some embodiments may include a single track containing geometry data and attribute data of the point cloud data.

In accordance with embodiments, the point cloud data may be stored and transmitted in an ISOBMFF file of a single track. For example, the ISOBMFF file in accordance with some embodiments may include a track containing the geometry data and attribute data (and/or occupancy data) of the point cloud data together.

In accordance with some embodiments, point cloud data may be encoded by the PCM scheme. That is, the encoder in accordance with some embodiments may encode the point cloud data in accordance with the PCM scheme. Accordingly, the ISOBMFF file in accordance with some embodiments may include a single track 30000b-1 containing the geometry data of the point cloud encoded by the PCM scheme and the attribute data of the point cloud data encoded by the PCM scheme (and occupancy data of the point cloud data encoded by the PCM scheme).

For example, as shown in FIG. 30(A), the moov box in accordance with some embodiments may include a track box (trak box) for the geometry data encoded by the PCM scheme and the attribute data encoded by the PCM scheme. In addition, the mdat box in accordance with some embodiments may contain a PCM bitstream 30000c-1 carrying the geometry data encoded by the PCM scheme and the attribute data encoded by the PCM scheme.

PCM is a coding scheme that is applied to, for example, geometry data and/or attribute data. PCM-based encoding is a scheme for encoding geometry and/or attribute data associated with missing points. PCM may be understood to be the same as RAW.

The PCM bitstream 30000c-1 in accordance with some embodiments may carry the geometry data encoded by the PCM scheme and the attribute data encoded by the PCM scheme in one PCM sample. Alternatively, each PCM sample in accordance with embodiments may contain all or part of the geometry data encoded by the PCM scheme and the attribute data encoded by the PCM scheme.

FIG. 30(B) shows a PCM sample 30001 in accordance with embodiments.

The PCM sample 30001 in accordance with some embodiments may be contained in the mdat box in accordance with some embodiments. One or more PCM samples in the mdat box may be referred to as a PCM sample stream or a sample stream.

The PCM sample 30001 in accordance with some embodiments may contain one or more PCM-encoded attribute data (which may be referred to as attribute PCM video data units) 30001c and 30001d in accordance with embodiments. The PCM sample 30001 in accordance with some embodiments of PCM may contain one or more PCM-encoded geometry data (which may be referred to as geometry PCM video data units) 30001b.

Referring to FIG. 30, for the point cloud data in accordance with some embodiments, the geometry data of the point cloud data and the attribute data of the point cloud data may be transmitted through one track. For example, the mdat box contains one or more samples carrying a geometry PCM bitstream and an attribute PCM bitstream corresponding to the track.

A PCM sample carrying a PCM bitstream includes a geometry PCM video data unit 30001a and one or more attribute PCM video data units 30001c and 30001d. The PCM sample carrying the PCM bitstream may further include a sequence parameter set. The PCM sample carrying the PCM bitstream may further include length information about the sequence parameter set, and/or length information 31000a about the geometry PCM video data unit 31000b, and/or length information 30001d about the attribute PCM video data unit 30001d.

In accordance with embodiments, each sample in the track may include one or more sub-samples. Each sub-sample may include a vpcc unit containing geometry PCM data and attribute PCM data in accordance with embodiments.

In accordance with embodiments, a sequence parameter set may be included in a sample entry of a trak box of each track included in the moov box. The sample entry may include a VPCC unit video box (VPCCVideoBox). The VPCCVideoBox may be present in any box under the sample entry.

```
aligned(8) class VPCCVideoBox extends FullBox('vpcc', 0, 0) {
    unsigned int(8) numOfSetupUnits;
    for (i=0; i<numOfSetupUnits; i++) {
        sample_stream_vpcc_unit setupUnit;
    }
}
```

The VPCC unit header box in accordance with some embodiments may have the following syntax.

```
aligned(8) class VPCCUnitHeaderBox extends FullBox('vpch', 0, 0) {
    sample_stream_vpcc_header    header;
}
numOfSetupUnits specifies the number of V-PCC parameter sets signaled in the decoder configuration record.
    setupUnit may be an array including sequence_parameter_set and may include other VPCC units that are constant for the stream referred to by this sample entry.
```

The header may be in the form of sample_stream_vpcc_header.

The vpcc_unit_header may contain information about whether the geometry PCM data or attribute PCM is contained in the track.

numOfVPCCUnitHeaders specifies the number of V-PCC unit headers signaled in the decoder structure.

In order to efficiently access the PCM video data unit included in a sub-sample in each sample, the moov box or the sample in accordance with some embodiments may further include SubSampleInformationBox. For example, exactly one SubSampleInformation box may be present in the SampleTableBox as well as in the TrackFragment boxes of the G-PCC track.

The syntax of the SubSampleInformationBox in accordance with some embodiments may be configured as follows.

Box Type: 'subs'
Container: SampleTableBox or TrackFragmentBox
Mandatory: No
Quantity: Zero or more

```
aligned(8) class SubSampleInformationBox extends FullBox('subs', version, flags) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if(version == 1) {
                    unsigned int(32) subsample_size;
                }
                else {
                    unsigned int(16) subsample_size;
                }
                unsigned int(8) subsample_priority;
                unsigned int(8) discardable;
                unsigned int(32) codec_specific_parameters;
            }
        }
    }
}
```

V-PCC PCM sub-samples in accordance with embodiments may be defined as a VPCC unit corresponding to the same presentation time. These may be comprised of a V-PCC unit header and/or a payload.

The point cloud data transmission method and transmission device in accordance with embodiments may signal whether to carry point cloud data encoded by a specific scheme (e.g., the PCM scheme) in a single track or multiple tracks, thereby allowing decoding to be adaptively performed in accordance with the performance of the receiver.

The point cloud data reception method and reception device in accordance with embodiments may perform decoding based on information indicating whether point cloud data encoded by a specific method (e.g., the PCM scheme) is carried in a single track or multiple tracks. Thereby, decoding may be performed adaptively in accordance with the performance of the receiver.

FIG. 31 shows the syntax of a V-PCC unit header in accordance with embodiments.

The vpcc_unit_type indicates a V-PCC unit type. The following types may be indicated in accordance with the respective type values.

Specifically, when the value of vpcc_unit_type is 0, the V-PCC unit is VPCC_SPS, and a sequence parameter set that describes sequence level parameters is indicated.

When the value of vpcc_unit_type is 1, the V-PCC unit is VPCC_PDG, and Patch Data Group that describes patch group information.

When the value of vpcc_unit_type is 2, the V-PCC unit is VPCC_OVD, and Occupancy Video Data that describes occupancy information is indicated.

When the value of vpcc_unit_type is 3, the V-PCC unit is VPCC_GVD and Geometry Video Data that describes geometry information is indicated.

When the value of vpcc_unit_type is 4, the V-PCC unit is VPCC_AVD, and Attribute Video Data that describes attribute information is indicated.

When vpcc_unit_type has other values, for example, 5 to 31, the V-PCC unit is VPCC_RSVD, and the values are reserved for future use.

vpcc_sequence_parameter_set_id specifies the value of sps_sequence_parameter_set_id for the active VPCC SP. The value of vpcc_sequence_parameter_set_id shall be in the range of 0 to 15, inclusive. The vpcc_sequence_parameter_set_id may be signaled when vpcc_unit_type is VPCC_AVD, VPCC_GVD, VPCC_OVD, or VPCC_PDG.

When vpcc_unit_type is VPCC_AVD, information about the attribute may be signaled.

When vpcc_unit_type is VPCC_GVD, information about geometry may be signaled.

When vpcc_unit_type is VPCC_OVD or VPCC_PDG, occupancy information, patch group information, or the like may be signaled.

vpcc_attribute_index indicates the index of the attribute data carried in the Attribute Video Data unit. The value of vpcc_attribute_index shall be in the range of 0 to (ai_attribute_count−1), inclusive.

vpcc_attribute_dimension_index indicates the index of the attribute dimension group carried in the Attribute Video Data unit. The value of vpcc_attribute_dimension_index shall be in the range of 0 to 127, inclusive.

vpcc_layer_index indicates the index of the current layer.

Next, the syntax of pcm_separate_video_data shown in the upper right part of FIG. 31 will be described.

The pcm_separate_video_data may be signaled in the V-PCC unit header in the case of VPCC_AVD, VPCC_GVD, or the like.

vpcc_pcm_video_flag equal to 1 indicates that the associated geometry or attribute video data unit is a PCM coded points video only. vpcc_pcm_video_flag equal to 0 indicates that the associated geometry or attribute video data unit may contain PCM coded points. When vpcc_pcm_video_flag is not present, it shall be inferred to be equal to 0.

FIG. 32 shows the syntax of a V-PCC unit payload in accordance with some embodiments.

FIG. 32 shows the syntax of the V-PCC unit payload of the V-PCC unit of FIG. 27.

The V-PCC unit payload may include data (parameters) in accordance with vpcc_unit_type.

When the type is VPCC_SPS, sequence_parameter_set( ) may be carried in the payload. When the type is VPCC_PDG, tpatch_data_group( ) may be carried in the payload. When the type is VPCC_OVD, VPCC_GVD or VPCC_AVD, a corresponding video data unit may be carried in the payload.

A patch data group in accordance with embodiments may be composed of one or more PDG units. The PDG units carry various kinds of parameters in accordance with multiple types For example, as shown in FIG. 26, the type (pdg_unit_type) equal to 0 indicates a PDG unit that is a patch sequence parameter set (PDG_PSPS) of sequence level parameters.

The type (pdg_unit_type) equal to 1 indicates a PDG unit that is a patch frame parameter set (PDG_PFPS) of frame level parameters.

The type (pdg_unit_type) equal to 2 indicates a PDG unit that is a patch frame geometry parameter set (PDG_PFGPS) of frame level geometry type parameters.

The type (pdg_unit_type) equal to 3 indicates a PDG unit that is a patch frame attribute parameter set (PDG_PFAPS) of frame level attribute type parameters.

The type (pdg_unit_type) equal to 4 indicates a PDG unit that is a geometry patch parameter set (PDG_GPPS) of patch level geometry type parameters.

The type (pdg_unit_type) equal to 5 indicates a PDG unit that is an attribute patch parameter set (PDG_APPS) of patch level attribute type parameters.

The type (pdg_unit_type) equal to 7 indicates a PDG unit that is a prefix SEI message (PDG_PREFIX_SEI).

The type (pdg_unit_type) equal to 8 indicates a PDG unit that is a suffix SEI message (PDG_SUFFIX_SEI).

FIG. 33 shows the syntax of sequence parameter set data in accordance with embodiments.

FIG. 33 shows the syntax of the sequence parameter set (sequence_parameter_set( )) of FIG. 32 in detail.

sps_sequence_parameter_set_id provides an identifier for the VPCC SPS for reference by other syntax elements. Through the value of sps_sequence_parameter_set_id, a reference relationship with other information may be known.

sps_frame_width indicates the nominal frame width in terms of integer luma samples.

sps_frame_height indicates the nominal frame height in terms of integer luma samples.

sps_avg_frame_rate_present_flag equal to 0 indicates that no average nominal frame rate information is indicated in the bitstream. sps_avg_frame_rate_present_flag equal to 1 indicates that the average nominal frame rate information shall be indicated in the bitstream.

sps_avg_frame_rate indicates the average nominal point cloud frame rate, in units of point cloud frames per 256 seconds. When sps_avg_frame_rate is not present, its value shall be inferred as 0.

During the reconstruction operation, the decoded occupancy, geometry, and attribute videos may be converted to the normal width, height, and frame rate using appropriate scaling.

sps_enhanced_occupancy_map_for_depth_flag equal to 1 indicates that the decoded accumulate map video contains information about whether intermediate depth positions between two depth layers are occupied. sps_enhanced_depth_code_enabled_flag equal to 0 indicates that the decoded occupancy map video does not contain information about whether intermediate depth positions between two depth layers are occupied.

sps_layer_count_minus1 plus 1 indicates the number of layers used to encode the geometry and attribute data.

sps_multiple_layer_streams_present_flag equal to 0 indicates that all geometry or attribute layers are placed in a single geometry or attribute video stream. sps_multiple_layer_streams_present_flag equal to 1 indicates that all geometry or attribute layers are placed in separate video streams.

sps_layer_absolute_coding_enabled_flag[i] equal to 2 indicates that the geometry layer with index i is coded without any form of layer prediction. sps_layer_absolute_coding_enabled_flag[i] equal to 0 indicates that the geometry layer with index i is first predicted from the another, earlier coded layer, prior to coding.

sps_layer_predictor_index_diff[i] is used to compute the predictor of the geometry layer with index i when sps_layer_predictor_index_diff[i] is equal to 0.

sps_pcm_patch_enabled_flag equal to 1 indicates that patches with PCM coded points may be present in the bitstream.

sps_pcm_separate_video_present_flag equal to 1 indicates that PCM coded geometry and attribute information may be stored in a separate video stream.

sps_attribute_count indicates the number of attributes associated with the point cloud sps_patch_sequence_orientation_enabled_flag indicates whether flexible orientation may be signaled in the patch sequence data unit or not. sps_patch_sequence_orientation_enabled_flag equal to 1 indicates that flexible orientation may be signaled. sps_patch_sequence_orientation_enabled_flag equal to 0 indicates that flexible orientation is not signaled.

sps_patch_inter_prediction_enabled_flag equal to 1 indicates that inter prediction for patch information, using patch information from previously encoded patch frames, may be used.

sps_pixel_deinterleaving_flag equal to 1 indicates that the decoded geometry and attribute videos corresponding to a single stream contain interleaved pixels from two layers. sps_pixel_deinterleaving_flag equal to 0 indicates that the decoded geometry and attribute videos corresponding to a single stream contain pixels from only a single layer.

sps_point_local_reconstruction_enabled_flag equal to 1 indicates that the local reconstruction mode may be used during the point cloud reconstruction process.

sps_remove_duplicate_point_enabled_flag equal to 1 indicates that duplicated points shall not be reconstructed, where a duplicated point is a point with the same 2D and 3D geometry coordinates as another point from a lower layer.

sps_geometry_attribute_different_layer_flag equal to 1 indicates the numbers of layers used for encoding the geometry and attribute data are different. For example, while two layers could be used for the geometry coding, the one layer could be used for attribute. sps_geometry_attribute_different_layer_flag equal to 1 indicates whether the number of layers used for encoding geometry and attribute data may be signaled in the patch sequence data unit or not.

sps_layer_count_geometry_minus1 plus 1 indicates the number of layers used for encoding the geometry data.

sps_layer_count_attribute_minus1[i] plus 1 indicates the number of layers used for encoding the encoding) i-th attribute data associated with the point cloud).

FIG. 34 shows the syntax of a patch data group (PDG) in accordance with embodiments.

The patch data group (patch_data_group( )) in accordance with some embodiments refers to the patch data group 28830 shown in FIG. 28. For simplicity, the patch data group 2830 of FIG. 28 is shown on the right side in FIG. 34.

The syntax of the patch data group will be described.

pdg_unit_type indicates the type of a patch data group.

pdg_terminate_patch_data_group_flag indicates the end of a patch data group.

pdg_terminate_patch_data_group_information_flag equal to 0 indicates that there are additional patch data group units present in the patch data group. pdg_terminate_patch_data_group_flag equal to 1 indicates that there are no more patch data group units present in the patch data group and that this is the end of the current patch data group unit.

patch_data_group_unit_payload(unitType) indicates the payload of a patch data group unit in accordance with embodiments. One or more patch_data_group_unit_payload (unitType)'s may be included in patch_data_group in accordance with embodiments. patch_data_group_unit_payload may have the type (unitType) of a patch data group unit as a parameter, wherein unitType may be pdg_unit_type described above.

Hereinafter, the syntax of patch_data_group_unit_payload will be described.

patch_sequence_parameter_set represents a patch sequence parameter set in accordance with embodiments. The patch_sequence_parameter_set may be signaled when unitType received as a parameter is PDG_PSPS described with reference to FIG. 32.

The patch sequence parameter set in accordance with some embodiments may represent a syntax structure containing syntax elements that apply to zero or more entire coded patch sequences. The patch sequence parameter set in accordance with some embodiments may be referred to as an atlas sequence parameter set. An example of the syntax of the patch frame parameter set will be described later with reference to FIG. 35.

geometry_patch_parameter_set represents a geometry patch parameter set in accordance with embodiments. The geometry_patch_parameter_set may be signaled when unitType received as a parameter is PDG_GPPS described with reference to FIG. 32.

attribute_patch_parameter_set represents an attribute patch parameter set in accordance with embodiments. The attribute_patch_parameter_set may be signaled when unitType received as a parameter is PDG_APPS described with reference to FIG. 32.

patch_frame_parameter_set represents a patch frame parameter set in accordance with embodiments. The represents may be signaled when unitType received as a parameter is PDG_PFPS described with reference to FIG. 32.

The patch frame parameter set in accordance with some embodiments may represent a syntax structure containing syntax elements that apply to zero or more entire coded patch frames or atlas frames. The patch frame parameter set in accordance with some embodiments may be referred to as an atlas sequence parameter set.

patch_frame_attribute_parameter_set represents a patch frame attribute parameter set in accordance with embodiments. The patch_frame_attribute_parameter_set may be signaled when unitType received as a parameter is PDG_PFAPS described in FIG. 32.

patch_frame_geometry_parameter_set represents a patch frame attribute parameter set in accordance with embodiments. The patch_frame_geometry_parameter_set may be signaled when unitType received as a parameter is PDG_PFAPS described in FIG. 32.

patch_tile_group_layer_unit represents a patch tile group layer unit in accordance with embodiments. The patch_tile_group_layer_unit may be signaled when unitType received as a parameter is PDG_PTGLU described in FIG. 32.

sei_message represents an SEI message in accordance with embodiments. The sei_message may be signaled when unitType received as a parameter is PDG_PREFIX_SEI or PDG_SUFFIX_SEI described in FIG. 32.

As described above, a patch tile group in accordance with embodiments may be referred to as an atlas tile group. In accordance with embodiments, the patch data group may include a patch tile group including a plurality of patch tiles, or may include patch tiles individually. Further, in accordance with embodiments, the patch tile group may include one or more atlas tiles.

Accordingly, the patch tile group described below may also be referred to as an atlas tile group. In addition, in the following description, signaling information or flag information related to the patch tile group may be understood as information signaling an atlas tile group or information signaling each atlas tile.

FIG. 35 shows the syntax of a patch sequence parameter set in accordance with embodiments.

The patch sequence parameter set in accordance with some embodiments shown at the top of FIG. 35 may represent the patch sequence parameter set (patch_sequence_paraeter_set( ), patch SPS) of FIG. 34. Hereinafter, the syntax of the patch sequence parameter set (Patch SPS) will be described.

psps_patch_sequence_parameter_set_id provides an identifier for the patch sequence parameter set for reference by other syntax elements. The value of psps_patch_sequence_parameter_set_id may be in the range of 0 to 15, inclusive.

psps_log2_patch_packing_block_size specifies the value of the variable PatchPackingBlockSize, that is used for the horizontal and vertical placement of the patches within the frame canvas.

psps_log2_max_patch_frame_order_cnt_lsb_minus4 specifies the value of the variable MaxPatchFrmOrderCntLsb that is used in the decoding process for the patch frame order count.

psps_max_dec_patch_frame_buffering_minus1 plus 1 specifies the maximum required size of the decoded patch frame buffer for the CPCS in units of patch frame storage buffers. The value of psps_max_dec_patch_frame_buffering_minus1 may be in the range of 0 to MaxDpfbSize−1, inclusive.

psps_long_term_ref_patch_frames_flag equal to 0 specifies that no long term reference patch frame is used for inter prediction of any coded patch frame in the CPCS. psps_long_term_ref_patch_frames_flag equal to 1 specifies that long term reference patch frames may be used for inter prediction of one or more coded patch frames in the CPCS.

psps_num_ref_patch_frame_lists_in_psps specifies the number of the ref_list_struct(rlsIdx) syntax structures included in the patch sequence parameter set. The value of psps_num_ref_patch_frame_lists_in_psps may be in the range of 0 to 64, inclusive.

psps_use_eight_orientations_flag equal to 0 specifies that the patch orientation index for a patch with index j in a frame with index i, pdu_orientation_index[i][j], is in the range of 0 to 1, inclusive. psps_use_eight_orientations_flag equal to 1 specifies that the patch orientation index for a patch with index j in a frame with index i, pdu_orientation_index[i][j], is in the range of 0 to 7, inclusive.

psps_normal_axis_limits_quantization_enable_flag equal to 1 specifies that quantization parameters may be signaled and used for quantizing the normal axis related elements of a patch data unit or a delta patch data unit. If psps_normal_axis_limits_quantization_enable_flag is equal to 0, then no quantization is applied on any normal axis related elements of a patch data unit or a delta patch data unit.

psps_normal_axis_max_delta_value_enable_flag equal to 1 specifies that the maximum nominal shift value of the normal axis that may be present in the geometry information of a patch with index i in a frame with index j will be indicated in the bitstream for each patch data unit or a delta patch data unit. If psps_normal_axis_max_delta_value_enable_flag is equal to 0 then the maximum nominal shift value of the normal axis that may be present in the geometry information of a patch with index i in a frame with index j may not be indicated in the bitstream for each patch data unit or a delta patch data unit.

FIG. 36 shows a patch frame geometry parameter set in accordance with embodiments.

The patch frame geometry parameter set in accordance with some embodiments shown on the left side in FIG. 36 may represent a patch frame geometry parameter set included in the patch data group (PDG) in accordance with some embodiments. The syntax of the patch frame geometry parameter set may be configured as follows.

pfgps_geometry_frame_parameter_set_id identifies the patch frame geometry parameter set for reference by other syntax elements. The value of pfgps_geometry_frame_parameter_set_id may be in the range of 0 to 63, inclusive.

pfgps_patch_sequence_parameter_set_id specifies the value of psps_patch_sequence_parameter_set_id for the active patch sequence parameter set. The value of pfgps_patch_sequence_parameter_set_id may be in the range of 0 to 15, inclusive.

pfgps_geometry_patch_scale_params_enabled_flag indicates whether geometry patch scale parameters may be signaled or not. pfgps_geometry_patch_scale_params_enabled_flag equal to 1 indicates that geometry patch scale parameters may be signaled. pfgps_geometry_patch_scale_params_enabled_flag equal to 0 indicates that geometry patch scale parameters may not be signaled. When pfgps_geometry_patch_scale_params_enabled_flag is not present, it may be inferred to be equal to 0.

pfgps_geometry_patch_offset_params_enabled_flag indicates whether geometry patch offset parameters may be signaled or not. pfgps_geometry_patch_offset_params_enabled_flag equal to 1 indicates that geometry patch offset parameters may be signaled. pfgps_geometry_patch_offset_params_enabled_flag equal to 0 indicates that geometry patch offset parameters shall not be signaled. When pfgps_geometry_patch_offset_params_enabled_flag is not present, it may be inferred to be equal to 0.

pfgps_geometry_patch_rotation_params_enabled_flag indicates whether geometry patch rotation parameters may be signaled or not. pfgps_geometry_patch_rotation_params_enabled_flag equal to 1 indicates that geometry patch rotation parameters may be signaled. pfgps_geometry_patch_rotation_params_enabled_flag equal to 0 indicates that geometry patch rotation parameters may not be signaled. When pfgps_geometry_patch_rotation_params_enabled_flag is not present, it may be inferred to be equal to 0.

pfgps_geometry_patch_point_size_info_enabled_flag indicates whether geometry patch point size information may be signalled or not. pfgps_geometry_patch_point_size_info_enabled_flag equal to 1 indicates that geometry patch point size information may be signaled. pfgps_geometry_patch_point_size_info_enabled_flag equal to 0 indicates that geometry patch point size information may not be signaled. When pfgps_geometry_patch_point_size_info_enabled_flag is not present, it may be inferred to be equal to 0.

pfgps_geometry_patch_point_shape_info_enabledflag indicates whether geometry patch point shape information may be signalled or not. pfgps_geometry_patch_point_shape_info_enabled_flag equal to 1 indicates that geometry patch point size information may be signaled. pfgfps_geometry_patch_point_shape_info_enabled_flag equal to 0 indicates that geometry patch point shape information may not be signaled. When pfgps_geometry_patch_point_shape_info_enabled_flag is not present, it may be inferred to be equal to 0.

The patch frame geometry parameter set in accordance with some embodiments shown on the left side in FIG. 36 may further include geometry frame parameters (geometry_frame_params( )). The geometry frame parameters in accordance with some embodiments shown on the right side in FIG. 36 may represent geometry frame parameters (geometry_frame_params( )) included in the patch frame geometry parameter set shown on the left side in FIG. 36. The syntax structure of the geometry_frame_params( ) may be configured as follows.

gfp_geometry_smoothing_params_present_flag equal to 1 indicates that geometry smoothing parameters are present. gfp_geometry_smoothing_params_present_flag equal to 0 indicates that geometry smoothing parameters are not present. When gfp_geometry_smoothing_params_present_flag is not present, it may be inferred to be equal to 0.

gfp_geometry_scale_params_present_flag equal to 1 indicates that geometry scale parameters are present. gfp_geometry_scale_params_present_flag equal to 0 indicates that geometry scale parameters are not present.

gfp_geometry_offset_params_present_flag equal to 1 indicates that geometry offset parameters are present. gfp_geometry_offset_params_present_flag equal to 0 indicates that geometry offset parameters are not present. When gfp_geometry_offset_params_present_flag is not present, it may be inferred to be equal to 0.

gfp_geometry_rotation_params_present_flag equal to 1 indicates that geometry rotation parameters are present. gfp_geometry_rotation_params_present_flag equal to 0 indicates that geometry rotation parameters are not present.

When gfp_geometry_rotation_params_present_flag is not present, it shall be inferred to be equal to 0.

gfp_geometry_point_size_info_present_flag equal to 1 indicates that geometry point size information is present. gfp_geometry_point_size_info_present_flag equal to 0 indicates that geometry point size information is not present. When gfp_geometry_point_size_info_present_flag is not present, it may be inferred to be equal to 0.

gfp_geometry_point_shape_info_present_flag equal to 1 indicates that geometry point shape information is present. gfp_geometry_point_shape_info_present flag equal to 0 indicates that geometry point shape information is not present. When gfp_geometry_point_shape_info_ present_flag is not present, it may be inferred to be equal to 0.

gfp_geometry_smoothing_enabled_flag equal to 1 specifies that the geometry smoothing is applied to the decoded geometry in the reconstruction process. gfp_geometry_smoothing_enabled_flag equal to 0 specifies the geometry smoothing is not applied in the reconstruction process. When not present, the value of gfp_geometry_smoothing_enabled_flag is inferred to be equal to 0.

gfp_geometry_smoothing_grid_size_minus2 specifies the value of the variable GeometrySmoothingGridSize used for the geometry smoothing. The value of gfp_geometry_smoothing_grid_size may be in the range of 0 to 126, inclusive. When not present, the value of gfp_geometry_smoothing_grid_size_minus2 is inferred to be equal to 0. The value of GeometrySmoothingGridSize is computed as follows.

GeometrySmoothingGridSize=gfp_geometry_smoothing_grid_size_minus2+2 gfp_geometry_smoothing_threshold indicates the smoothing threshold. The value of gfp_geometry_smoothing_threshold may be in the range of 0 to 255, inclusive. When not present, the value of gfp_geometry_smoothing_threshold may be inferred to be equal to 0.

gfp_geometry_scale_on_axis[d] indicates the value of the scale along the d axis. The value of gfp_geometry_scale_on_axis[d] may be in the range of 0 to $2^{32}-1$, inclusive, where d is in the range of 0 to 2, inclusive. The values of d equal to 0, 1, and 2 correspond to the X, Y, and Z axes, respectively. When gfp_geometry_scale_on_axis[d] is not present, it may be inferred to be equal to 0.

gfp_geometry_offset_on_axis[d] indicates the value of the offset along the d axis. The value of gfp_geometry_offset_on_axis[d] may be in the range of $-2^{31}$ to $2^{31}-1$, inclusive, where d is in the range of 0 to 2, inclusive. The values of d equal to 0, 1, and 2 correspond to the X, Y, and Z axis, respectively. When gfp_geometry_offset_on_axis[d] is not present, it may be inferred to be equal to 0.

gfp_geometry_rotation_x indicates the geometry rotation quaternion component along the x axis. The value of gfp_geometry_rotation_x may be in the range of $-2^{15}$ to $2^{15}-1$, inclusive. When gfp_geometry_rotation_x is not present, its value may be inferred to be equal to 0.

gfp_geometry_rotation_y indicates the geometry rotation quaternion component along the y axis. The value of gfp_geometry_rotation_y may be in the range of $-2^{15}$ to $2^{15}-1$, inclusive. When gfp_geometry_rotation_y is not present, its value may be inferred to be equal to 0.

gfp_geometry_rotation_z indicates the geometry rotation quaternion component along the z axis. The value of gfp_geometry_rotation_z may be in the range of $-2^{15}$ to $2^{15}-1$, inclusive. When gfp_geometry_rotation_z is not present, its value may be inferred to be equal to 0.

gfp_geometry_rotation_w indicates the geometry rotation quaternion component along the w axis. The value of gfp_geometry_rotation_w may be in the range of $-2^{15}$ to $2^{15}-1$, inclusive. When gfp_geometry_rotation_w is not present, its value may be inferred to be equal to 0.

gfp_geometry_point_size_info_minus1 plus 1 indicates the geometry point size to be used for rendering. The value of gfp_geometry_point_size_info_minus1 may be in the range of 0 to 65535, inclusive. When gfp_geometry_point_size_info_minus1 is not present, it may be inferred to be equal to 0.

gfp_geometry_point_shape_info indicates the geometry point shape to be used for rendering. The value of gfp_geometry_point_shape_info may be in the range of 0 to 15, inclusive. When gfp_geometry_point_shape_info is not present, it may be inferred to be equal to 0.

A patch sequence parameter set in accordance with embodiments may include as a reference list structure (ref_list_struct) corresponding to the value of psps_num_ref_patch_frame_lists_in_psps. The syntax of the reference list structure will be described with reference to FIG. 42.

FIG. 37 shows a patch frame attribute parameter set in accordance with embodiments. The patch frame attribute parameter set in accordance with some embodiments illustrated in FIG. 37 may represent the patch frame attribute parameter set (patch_frame_attribute_parameter_set) of FIG. 34.

As described above, the patch tile group described below may also be referred to as an atlas tile group. In addition, signaling information or flag information related to the patch tile group described below may be understood as information signaling an atlas tile group or information signaling each atlas tile.

pfaps_attribute_frame_parameter_set_id identifies the attribute frame parameter set for reference by other syntax elements. The value of pfaps_attribute_frame_parameter_set_id may be in the range of 0 to 63, inclusive.

pfaps_patch_sequence_parameter_set_id specifies the value of psps_patch_sequence_parameter_set_id for the active patch sequence parameter set. The value of pfaps_patch_sequence_parameter_set_id may be in the range of 0 to 15, inclusive.

pfaps_attribute_dimension_minus1 plus 1 indicates the total number of dimensions (i.e., number of channels) of the attribute assigned to the pfaps_attribute_frame_parameter_set_id. pfaps_attribute_dimension_minus1 may be in the range of 0 to 255, inclusive. It is a requirement of bitstream conformance than when an attribute with index i is assigned to a path frame attribute parameter set with an id of pfaps_attribute_frame_parameter_set_id that the value of pfaps_attribute_dimension_minus1 of that patch frame attribute parameter set shall be equal to ai_attribute_dimension_minus1[i].

pfaps_attribute_patch_scale_params_enabled_flag indicates whether attribute patch scale parameters may be signaled or not for an attribute associated with pfaps_attribute_frame_parameter_set_id. pfaps_attribute_patch_scale_params_enabled_flag equal to 1 indicates that attribute patch scale parameters may be signaled for an attribute associated with pfaps_attribute_frame_parameter_set_id. pfaps_attribute_patch_scale_params_enabled_flag equal to 0 indicates that attribute patch scale parameters may not be signaled for an attribute associated with pfaps_attribute_frame_parameter_set_id. When pfaps_attribute_patch_scale_params_enabled_flag is not present, it may be inferred to be equal to 0.

pfaps_attribute_patch_offset_params_enabled_flag indicates whether attribute patch offset parameters may be signaled or not for an attribute associated with pfaps_attribute_frame_parameter_set_id. pfaps_attribute_patch_offset_params_enabled_flag equal to 1 indicates that attribute patch offset parameters may be signaled for an attribute associated with pfaps_attribute_frame_parameter_set_id. pfaps_attribute_patch_offset_params_enabled_flag equal to 0 indicates that attribute patch offset parameters may not be signaled for an attribute associated with pfaps_attribute_frame_parameter_set_id. When pfaps_attribute_patch_offset_params_enabled_flag is not present, it may be inferred to be equal to 0.

In accordance with embodiments, the patch frame attribute parameter set may further include attribute frame parameters (attribute_frame_params( )). The syntax of the attribute frame parameters may be configured as follows.

afp_attribute_smoothing_params_present_flag[i] equal to 1 indicates that attribute smoothing parameters are present in the current patch tile group attribute parameter set. afp_attribute_smoothing_params_present_flag equal to 0 indicates that attribute smoothing parameters are not present in the current patch tile group attribute parameter set. When afp_attribute_smoothing_params_present_flag is not present, it may be inferred to be equal to 0.

afp_attribute_scale_params_present_flag equal to 1 indicates that attribute scale parameters are present in the current patch tile group attribute parameter set. afp_attribute_scale_params_present_flag equal to 0 indicates that attribute scale parameters are not present in the current patch tile group attribute parameter set. When afp_attribute_scale_params_present_flag is not present, it may be inferred to be equal to 0.

afp_attribute_offset_params_present_flag equal to 1 indicates that attribute offset parameters are present in the current patch tile group attribute parameter set. afp_attribute_offset_params_present_flag equal to 0 indicates that attribute offset parameters are not present in the current patch tile group attribute parameter set. When afp_attribute_offset_params_present_flag is not present, it may be inferred to be equal to 0.

afp_attribute_smoothing_grid_size_minus2[i] specifies the value of the variable AttributeSmoothingGridSize used for the attribute smoothing. The value of afp_attribute_smoothing_grid_size_minus2 may be in the range of 0 to 126, inclusive. When not present, the value of afp_attribute_smoothing_grid_size_minus2 is inferred to be equal to 0. The value of AttributeSmoothingGridSize is computed as follows.

AttributeSmoothingGridSize[$i$]=afp_attribute_smoothing_grid_size_minus2[$i$]+2 afp_attribute_smoothing_threshold[i] indicates the attribute smoothing threshold for an attribute associated with pfaps_attribute_frame_parameter_set_id. The value of afp_attribute_smoothing_threshold may be in the range of 0 to 255, inclusive. When afp_attribute_smoothing_threshold is not present, it may be inferred to be equal to 0.

afp_attribute_smoothing_local_entropy_threshold[i] indicates the local entropy threshold in the neighbourhood of a boundary point for an attribute associated with pfaps_attribute_frame_parameter_set_id. The value of afp_attribute_smoothing_local_entropy_threshold may be in the range of 0 to 7, inclusive. When afp_attribute_smoothing_local_entropy threshold is not present, it may be inferred to be equal to 0.

afp_attribute_smoothing_threshold_attribute_variation[i] indicates the threshold of attribute variation for the attribute smoothing. The value of afp_attribute_smoothing_threshold_attribute_variation may be in the range of 0 to 255, inclusive. When afp_attribute_smoothing_threshold_attribute_variation is not present, it may be inferred to be equal to 255.

afp_attribute_smoothing_threshold_attribute_difference[i] indicates the threshold of attribute difference for the attribute smoothing. The value of afp_attribute_smoothing_threshold_attribute_difference may be in the range of 0 to 255, inclusive. When afp_attribute_smoothing_threshold_attribute_difference is not present, it may be inferred to be equal to 255.

afp_attribute_scale[i] indicates the value of the scale to be applied to the values of the i th dimension of an attribute associated with pfaps_attribute_frame_parameter_set_id. The value of afp_attribute_scale[i] may be in the range of 0 to $2^{32}-1$, inclusive. When afp_attribute_scale[i] is not present, it may be inferred to be equal to 0.

afp_attribute_offset[i] indicates the value of the offset to be added to the values of the i th dimension of an attribute associated with pfaps_attribute_frame_parameter_set_id. The value of afp_attribute_offset[i] may be in the range of $-2^{31}$ to $2^{31}-1$, inclusive. When afp_attribute_offset[j][i] is not present, it may be inferred to be equal to 0.

FIG. 38 shows a geometry patch parameter set in accordance with embodiments.

The patch geometry patch parameter set shown in FIG. 38 may represent the patch geometry patch parameter set (geometry_patch_parameter_set) of FIG. 34.

gpps_geometry_patch_parameter_set_id identifies the geometry patch parameter set for reference by other syntax elements. The value of gpps_geometry_patch_parameter_set_id may be in the range of 0 to 63, inclusive.

gpps_geometry_frame_parameter_set_id specifies the value of gfps_geometry_frame_parameter_set_id for the active geometry frame parameter set. The value of gpps_geometry_frame_parameter_set_id may be in the range of 0 to 63, inclusive.

gpps_geometry_patch_params_present_flag equal to 1 indicates that geometry patch parameters are present. gpps_geometry_patch_params_present_flag equal to 0 indicates that geometry patch parameters are not present. When gpps_geometry_patch_params_present_flag is not present, it may be inferred to be equal to 0.

In accordance with embodiments, the geometry patch parameter set may further include geometry patch parameters (geometry_patch_params( )). The syntax of the geometry patch parameter set may be configured as follows.

gpp_geometry_patch_scale_params_present_flag equal to 1 indicates that geometry patch scale parameters are present. gpp_geometry_patch_scale_params_present_flag equal to 0 indicates that geometry patch scale parameters are not present. When gpp_geometry_patch_scale_params_present_flag is not present, it may be inferred to be equal to 0.

gpp_geometry_patch_scale_on_axis[d] indicates the value of scale along d axis. The value of gpp_geometry_patch_scale_on_axis d may be in the range of 0 to $2^{32}-1$, inclusive, where d is in the range of 0 to 2, inclusive. The values of d equal to 0, 1, and 2 correspond to the X, Y, and Z axis, respectively. When gpp_geometry_patch_scale_on_axis[d] is not present, it may be inferred to be equal to 0.

gpp_geometry_patch_offset_params_present_flag equal to 1 indicates that geometry patch offset parameters are present. gpp_geometry_patch_offset_params_present_flag equal to 0 indicates that geometry patch offset parameters are not present. When gpp_geometry_patch_offset_params_present_flag is not present, it may be inferred to be equal to 0.

gpp_geometry_patch_offset_on_axis[d] indicates the value of offset along d axis. The value of gpp_geometry_patch_offset_on_axis[d] may be in the range of −231 to 231−1, inclusive, where d is in the range of 0 to 2, inclusive. The values of d equal to 0, 1, and 2 correspond to the X, Y, and Z axis, respectively. When gpp_geometry_patch_offset_on_axis[d] is not present, it may be inferred to be equal to 0.

gpp_geometry_patch_rotation_params_present_flag equal to 1 indicates that geometry patch rotation parameters is present. gpp_geometry_patch_rotation_params_present_flag equal to 0 indicates that geometry patch rotation parameters are not present. When gpp_geometry_patch_rotation_params_present_flag is not present, it may be inferred to be equal to 0.

gpp_geometry_patch_rotation_x indicates the geometry patch rotation quaternion component along the x axis. The value of gpp_geometry_patch_rotation_x may be in the range of −2^15 to 2^15−1, inclusive. When gpp_geometry_rotation_x is not present, it's value may be inferred to be equal to 0.

gpp_geometry_patch_rotation_x indicates the geometry patch rotation quaternion component along the y axis. The value of gpp_geometry_patch_rotation_y may be in the range of −2^15 to 2^15−1, inclusive. When gpp_geometry_rotation_y is not present, its value may be inferred to be equal to 0.

gpp_geometry_patch_rotation_z indicates the geometry rotation quaternion component along the z axis. The value of gpp_geometry_patch_rotation_z may be in the range of −2^15 to 2^15−1, inclusive. When gpp_geometry_rotation_z is not present, its value may be inferred to be equal to 0.

gpp_geometry_patch_rotation_w indicates the geometry rotation quaternion component along the w axis. The value of gfp_geometry_patch_rotation_w may be in the range of −2^15 to 2^15−1, inclusive. When gpp_geometry_rotation_w is not present, its value may be inferred to be equal to 0.

gpp_geometry_patch_point_size_info_present_flag equal to 1 indicates that the geometry patch point size information is signaled. gpp_geometry_patch_point_size_info_present_flag equal to 0 indicates that the geometry patch point size information is not signaled. When gpp_geometry_patch_point_size_info_present_flag is not present, it may be inferred to be equal to 0.

gpp_geometry_patch_point_size_info_minus1 plus 1 indicates the geometry patch point size to be used for rendering. The value of gpp_geometry_patch_point_size_info_minus1 may be in the range of 0 to 65535, inclusive. When gpp_geometry_patch_point_size_info_minus1 is not present, it may be inferred to be equal to gfp_geometry_point_size_info_minus1.

gpp_geometry_patch_point_shape_info_present_flag equal to 1 indicates that geometry patch point shape information is signalled. gpp_geometry_point shape_info_present_flag equal to 0 indicates that geometry patch point shape information is not signalled. When gpp_geometry_patch_point_shape_info_present_flag is not present, it may be inferred to be equal to 0.

gpp_geometry_patch_point_shape_info indicates the geometry patch point shape to be used for rendering. The value of gpp_geometry_patch_point_shape_info may be in the range of 0 to 15, inclusive. When gpp_geometry_patch_point_shape_info is not present, it may be inferred to be equal to gfp_geometry_point_shape_info.

FIG. 39 shows an attribute patch parameter set in accordance with embodiments.

The patch attribute patch parameter set shown in FIG. 39 may represent the patch attribute patch parameter set (attribute_patch_parameter_set) of FIG. 34.

apps_attribute_patch_parameter_set_id identifies the attribute patch parameter set for reference by other syntax elements. The value of apps_attribute_patch_parameter_set_id may be in the range of 0 to 63, inclusive.

apps_attribute_frame_parameter_set_id specifies the value of afps_attribute_frame_parameter_set_id for the active geometry frame parameter set. The value of apps_attribute_frame_parameter_set_id may be in the range of 0 to 63, inclusive.

apps_attribute_dimension_minus1 plus 1 indicates the total number of dimensions (i.e., number of channels) of the attribute assigned to the apps_attribute_frame_parameter_set_id. apps_attribute_dimension_minus1 may be in the range of 0 to 255, inclusive. It is a requirement of bitstream conformance than when an attribute with index i is assigned to an attribute patch parameter set with an id of apps_attribute_frame_parameter_set_id that the value of apps_attribute_dimension_minus1 of that attribute patch parameter set may be equal to ai_attribute_dimension_minus1[i].

apps_attribute_patch_params_present_flag equal to 1 indicates that attribute patch parameters are signaled in the current attribute patch parameter set. apps_attribute_patch_params_present_flag equal to 0 indicates that attribute patch parameters are not signaled for the current attribute patch parameter set. When apps_attribute_patch_params_present_flag is not present, it may be inferred to be equal to 0.

In accordance with embodiments, the attribute patch parameter set may further include attribute patch parameters (attribute_patch_params( )). The syntax of the attribute patch parameter set may be configured as follows.

app_attribute_patch_scale_params_present_flag equal to 1 indicates that attribute patch scale parameters are signaled in the current attribute patch parameter set. app_attribute_patch_scale_params_present_flag equal to 0 indicates that attribute patch scale parameters are not signaled. When app_attribute_patch_scale_params_present_flag is not present, it may be inferred to be equal to 0.

app_attribute_patch_scale[i] indicates the value of the scale to be applied to the values of the i th dimension of an attribute associated with the current attribute patch parameter set. The value of app_attribute_patch_scale[i] may be in the range of 0 to 2^32−1, inclusive. When app_attribute_patch_scale[i] is not present, it may be inferred to be equal to 2^16.

app_attribute_patch_offset_params_present_flag equal to 1 indicates that attribute patch offset parameters are signaled in the current attribute patch parameter set. app_attribute_patch_offset_params_present_flag equal to 0 indicates that attribute patch offset parameters are not signaled. When app_attribute_patch_offset_params_present_flag is not present, it may be inferred to be equal to 0.

app_attribute_patch_offset[i] indicates the value of the offset to be applied to the values of the i th dimension of an attribute associated with the current attribute patch parameter set. The value of app_attribute_patch_offset[i] may be in the range of −2^31 to 2^31−1, inclusive. When app_attribute_patch_offset[j][i] is not present, it may be inferred to be equal to 0.

FIG. 40 shows a patch frame parameter set in accordance with embodiments.

The patch frame parameter set shown in FIG. 40 may represent the patch attribute patch frame parameter set (patch_frame_parameter_set) of FIG. 34.

As described above, the patch tile group described below may also be referred to as an atlas tile group. In addition, signaling information or flag information related to the patch tile group described below may be understood as information signaling an atlas tile group or information signaling each atlas tile.

pfps_patch_frame_parameter_set_id identifies the patch frame parameter set for reference by other syntax elements. The value of pfps_patch_frame_parameter_set_id may be in the range of 0 to 63, inclusive.

pfps_patch_sequence_parameter_set_id specifies the value of psps_patch_sequence_parameter_set_id for the active patch sequence parameter set. The value of pfps_patch_sequence_parameter_set_id may be in the range of 0 to 15, inclusive.

pfps_geometry_patch_parameter_set_id specifies the value of gpps_geometry_patch_parameter_set_id for the active geometry patch parameter set. The value of pfps_geometry_patch_parameter_set_id may be in the range of 0 to 63, inclusive.

pfps_attribute_patch_parameter_set_id[i] specifies the value of apps_attribute_patch_parameter_set_id[i] for the active attribute patch parameter set for attribute with index i. The value of pfps_attribute_patch_parameter_set_id[i] may be in the range of 0 to 63, inclusive.

pfps_local_override_geometry_patch_enable_flag equal to 1 indicates that overriding the specified geometry patch parameters at the patch level is permitted. pfps_local_override_geometry_patch_enable_flag equal to 0 indicates that overriding the specified geometry patch parameters at the patch level is not permitted. Overwriting will only be applied to the current frame and not carried over to successive frames.

pfps_local_override_attribute_patch_enable_flag[i] equal to 1 indicates that overriding the specified attribute patch parameters for attribute with index i at the patch level is permitted. pfps_local_override_geometry_patch_enable_flag[i] equal to 0 indicates that overriding the specified attribute patch parameters for attribute with index i at the patch level is not permitted. Overwriting will only be applied to the current frame and not carried over to successive frames.

pfps_additional_lt_pfoc_lsb_len specifies the value of the variable MaxLtPatchFrmOrderCntLsb that is used in the decoding process for reference patch frame lists.

pfps_45degree_projection_patch_enabled_flag equal to 1 specifies that the patch may be projected to one of the diagonal 45 degree projection planes of the patch bounding box. pfps_45degree_projection_patch_enabled_flag equal to 0 indicates the diagonal patch projection that the patch is projected to one of the 6 projection planes of the patch bounding box is enabled. When pfps_45degree_projection_patch_enabled_flag is not present, the value is inferred to be equal to 0.

pfti_single_tile_in_patch_frame_flag equal to 1 specifies that there is only one tile in each patch frame referring to the PFPS. single_tile_in_pic_flag equal to 0 specifies that there is more than one tile in each patch frame referring to the PPS.

pfti_uniform_tile_spacing_flag equal to 1 specifies that tile column and row boundaries are distributed uniformly across the picture and signaled using the syntax elements pfti_tile_col_width_minus1 and pfti_tile_row_height_minus1, respectively. pfti_uniform_tile_spacing_flag equal to 0 specifies that tile column and row boundaries may or may not be distributed uniformly across the picture and are signaled using the syntax elements pfti_num_tile_columns_minus1 and pfti_num_tile_rows_minus1 and a list of syntax element pairs pfti_tile_column_width_minus1[i] and pfti_tile_row_height_minus1[i]. When not present, the value of pfti_uniform_tile_spacing_flag is inferred to be equal to 1.

pfti_tile_cols_width_minus1 plus 1 specifies the width of the tile columns excluding the right-most tile column of the patch frame in units of 64 samples when pfti_uniform_tile_spacing_flag is equal to 1. The value of pfti_tile_cols_width_minus1 may be in the range of 0 to (sps_frame_width+63)/64−1, inclusive. When not present, the value of pfti_tile_cols_width_minus1 is inferred to be equal to (sps_frame_width+63)/64−1.

pfti_tile_rows_height_minus1 plus 1 specifies the height of the tile rows excluding the bottom tile row of the patch frame in units of 64 samples when pfti_uniform_tile_spacing_flag is equal to 1. The value of pfti_tile_rows_height_minus1 may be in the range of 0 to (sps_frame_height+63)/64−1, inclusive. When not present, the value of pfti_tile_rows_height_minus1 is inferred to be equal to (sps_frame_height+63)/64−1.

pfti_num_tile_columns_minus1 plus 1 specifies the number of tile columns partitioning the patch frame when pfti_uniform_tile_spacing_flag is equal to 0. The value of pfti_num_tile_columns_minus1 may be in the range of 0 to (sps_frame_width+63)/64−1, inclusive. If pfti_single_tile_in_patch_frame_flag is equal to 1, the value of pfti_num_tile_columns_minus1 is inferred to be equal to 0. Otherwise, when pfti_uniform_tile_spacing_flag is equal to 1, the value of pfti_num_tile_columns_minus1 is inferred.

pfti_num_tile_rows_minus1 plus 1 specifies the number of tile rows partitioning the patch frame (when pti_uniform_tile_spacing_flag is equal to 0).

pfti_tile_column_width_minus1[i]) plus 1 specifies the width of the i-th tile column in units of 64 samples).

pfti_tile_row_height_minus1[i] plus 1 specifies the height of the i-th tile row in units of 64 samples.

pfti_single_tile_per_tile_group_flag equal to 1 specifies that each tile group that refers to this PFPS includes one tile.

pfti_num_tile_groups_in_patch_frame_minus1 plus 1 specifies the number of tile groups in each patch frame referring to the PFPS. The value of pfti_num_tile_groups_in_patch_frame_minus1 may be in the range of 0 to NumTilesInPatchFrame−1, inclusive. When not present and pfti_single_tile_per_tile_group_flag is equal to 1, the value of pfti_num_tile_groups_in_patch_frame_minus1 is inferred to be equal to NumTilesInPatchFrame−1.

pfti_top_left_tile_idx[i] specifies the tile index of the tile located at the top-left corner of the i-th tile group. The value of pfti_top_left_tile_idx[i] may not be equal to the value of pfti_top_left_tile_idx[j] for any i not equal to j. When not present, the value of pfti_top_left_tile_idx[i] is inferred to be equal to 1. The length of the pfti_top_left_tile_idx[i] syntax element is Ceil(Log 2(NumTilesInPatchFrame) bits.

pfti_bottom_right_tile_idx_delta[i] specifies the difference between the tile index of the tile located at the bottom-right corner of the i-th tile group and pfti_top_left_tile_idx[i]. When pfti_single_tile_per_tile_group_flag is equal to 1, the value of pfti_bottom_right_tile_idx_delta[i] is inferred to be equal to 0. The length of the pfti_bottom_right_tile_idx_delta[i] syntax element is Ceil(Log 2(NumTilesInPatchFrame−pfti_top_left_tile_idx[i])) bits.

pfti_signalled_tile_group_id_flag equal to 1 specifies that the tile group ID for each tile group is signaled. pfti_signalled_tile_group_id_flag equal to 0 specifies that tile group IDs are not signaled.

pfti_signalled_tile_group_id_length_minus1 plus 1 specifies the number of bits used to represent the syntax element pfti_tile_group_id[i] when present, and the syntax element ptgh_address in tile group headers.

pfti_tile_group_id[i] specifies the tile group ID of the i-th tile group.

FIG. 41 shows a patch tile group header included in a patch tile group layer unit in accordance with embodiments.

The patch tile group layer unit shown in FIG. 41 may represent the patch attribute patch tile group layer unit (patch_tile_group_layer_unit) of FIG. 34.

As described above, the patch tile group described below may also be referred to as an atlas tile group. In addition, signaling information or flag information related to the patch tile group described below may be understood as information signaling an atlas tile group or information signaling each atlas tile.

The patch tile group layer unit (patch_tile_group_layer_unit) in accordance with some embodiments may have the following syntax.

| | Descriptor |
|---|---|
| patch_tile_group_layer_unit( ){ | |
|     patch_tile_group_header( ) | |
|     patch_tile_group_data_unit( ) | |
| } | |

The patch tile group header (patch_tile_group_header) represents the header of the patch tile group layer unit. The patch tile group header indicates the payload of the patch tile group layer unit. FIG. 42 shows the syntax of the patch tile group header. Hereinafter, the syntax of the patch tile group header will be described.

ptgh_patch_frame_parameter_set_id specifies the value of pfps_patch_frame_parameter_set_id for the active patch frame parameter set for the current patch tile group. The value of ptgh_patch_frame_parameter_set_id may be in the range of 0 to 63, inclusive.

ptgh_address specifies the tile group address of the tile group. When not present, the value of ptgh_address is inferred to be equal to 0.

When ptgh_type is equal to 0, the type may be P (P patch tile group). When ptgh_type is equal to 1, the type may be I (I patch tile group).

| ptgh_type | Name of ptgh_type |
|---|---|
| 0 | P (P patch tile group) |
| 1 | I (I patch tile group) |

The PTGH patch order-related variable, ptgh_patch_frm_order_cnt_lsb, specifies the patch frame order count modulo MaxPatchFrmOrderCntLsb for the current patch tile group.

ptgh_ref_patch_frame_list_sps_flag equal to 1 specifies that the reference patch frame list of the current patch tile group is derived based on one of the ref_list_struct(rlsIdx) syntax structures in the active PSPS. ptgh_ref_patch_frame_list_sps_flag equal to 0 specifies that the reference patch frame list of the current patch tile list is derived based on the ref_list_struct(rlsIdx) syntax structure that is directly included in the tile group header of the current patch tile group. When psps_num_ref_patch_frame_lists_in_psps is equal to 0, the value of ptgh_ref_patch_frame_list_sps_flag is inferred to be equal to 0.

ptgh_ref_patch_frame_list_idx specifies the index, into the list of the ref_list_struct(rlsIdx) syntax structures included in the active PSPS, of the ref_list_struct(rlsIdx) syntax structure that is used for derivation of the reference patch frame list for the current patch tile group. The syntax element ptgh_ref_patch_frame_list_idx is represented by Ceil(Log 2(psps_num_ref_patch_frame_lists_in_psps)) bits. When not present, the value of ptgh_ref_patch_frame_list_idx is inferred to be equal to 0. The value of ptgh_ref_patch_frame_list_idx may be in the range of 0 to psps_num_ref_patch_frame_lists_in_psps−1, inclusive. When ptgh_ref_patch_frame_list_sps_flag is equal to 1 and psps_num_ref_patch_frame_lists_in_psps is equal to 1, the value of ptgh_ref_patch_frame_list_idx is inferred to be equal to 0.

ptgh_additional_pfoc_lsb_present_flag[j] equal to 1 specifies that ptgh_additional_pfoc_lsb_val[j] is present for the current patch tile group. ptgh_additional_pfoc_lsb_present_flag[j] equal to 0 specifies that ptgh_additional_pfoc_lsb_val[j] is not present.

ptgh_additional_pfoc_lsb_val[j] specifies the value of FullPatchFrmOrderCntLsbLt[RlsIdx][j] for the current patch tile group. The syntax element ptgh_additional_pfoc_lsb_val[j] is represented by pfps_additional_lt_pfoc_lsb_len bits. When not present, the value of ptgh_additional_pfoc_lsb_val[j] is inferred to be equal to 0.

ptgh_num_ref_idx_active_override_flag equal to 1 specifies that the syntax element ptgh_num_ref_idx_active_minus1 is present for the current patch tile group. ptgh_num_ref_idx_active_override_flag equal to 0 specifies that the syntax element ptgh_num_ref_idx_active_minus1 is not present. If ptgh_num_ref_idx_active_override_flag is not present, its value may be inferred to be equal to 0.

ptgh_num_ref_idx_active_minus1 is used for the derivation of the variable NumRefIdxActive as specified by Equation 78 for the current patch tile group. The value of ptgh_num_ref_idx_active_minus1 may be in the range of 0 to 14, inclusive. When the current patch tile group is a P patch frame, ptgh_num_ref_idx_active_override_flag is equal to 1, and ptgh_num_ref_idx_active_minus1 is not present, ptgh_num_ref_idx_active_minus1 is inferred to be equal to 0. The value of NumRefIdxActive−1 specifies the maximum reference index for reference the patch frame list that may be used to decode the current patch tile group. When the value of NumRefIdxActive is equal to 0, no reference index for the reference patch frame list may be used to decode the current patch tile group.

ptgh_2d_shift_u_bit_count_minus1 plus 1 specifies the number of bits in the fixed-length representation of pdu_2d_shift_u[j] of patch with index j in the current patch tile group.

ptgh_2d_shift_v_bit_count_minus1 plus 1 specifies the number of bits in the fixed-length representation of pdu_2d_shift_v[j] of patch with index j in the current patch tile group.

ptgh_3d_shift_tangent_axis_bit_count_minus1 plus 1 specifies the number of bits in the fixed-length representation of pdu_3d_shift_tangent_axis[j] of patch with index j in the current patch tile group.

ptgh_3d_shift_bitangent_axis_bit_count_minus1 plus 1 specifies the number of bits in the fixed-length representation of pdu_3d_shift_bitangential_axis[j] of a patch with index j in the current patch tile group.

ptgh_lod_bit_count specifies the number of bits in the fixed-length representation of pdu_lod[j] of patch with index j in the current patch tile group.

ptgh_inter_predict_bit_count_flag equal to 0 indicates that values of the parameters for the current patch tile group (ptgh_2d_shift_u_bit_count_minus1, ptgh_2d_shift_v_bit_count_minus1, ptgh_3d_shift_tangent_axis_bit_count_minus1, ptgh_3d_shift_bitangent_axis_bit_count_minus1, and ptgh_lod_bit_count) are copied from the corresponding parameters of the first reference patch frame in the reference patch frame list of the current patch tile group. ptgh_inter_predict_bit_count_flag equal to 1 indicates that some of these parameters may be explicitly changed for the current patch tile group. If the ptgh_inter_predict_bit_count_flag is not present, it may be inferred as equal to 1.

ptgh_inter_predict_2d_shift_u_bitcount_flag equal to 0 indicates that the value of ptgh_2d_shift_u_bit_count_minus1 for the current patch tile group may be explicitly coded in the current patch tile group header. ptgh_inter_predict_2d_shift_u_bit_count_flag equal to 1 indicates that the value of ptgh_2d_shift_u_bit_count_minus1 for the current patch tile group is copied from the corresponding parameter of the first reference patch frame in the reference patch frame list of the current patch tile group. If ptgh_inter_predict_2d_shift_u_bit_count_flag is not present and ptgh_type is equal to I, its value may be inferred as being equal to 0. If ptgh_inter_predict_2d_shift_u_bit_count_flag is not present and ptgh_type is equal to P, its value may be inferred as being equal to 1.

ptgh_inter_predict_2d_shift_v_bit_count_flag equal to 0 indicates that the value of ptgh_2d_shift_v_bit_count_minus1 for the current patch tile group may be explicitly coded in the current patch tile group header. ptgh_inter_predict_2d_shift_vbit_countflag equal to 1 indicates that the value of ptgh_2d_shift_v_bit_count_minus1 for the current patch tile group is copied from the corresponding parameter of the first reference patch frame in the reference patch frame list of the current patch tile group. If ptgh_inter_predict_2d_shift_v_bit_count_flag is not present and ptgh_type is equal to I, its value may be inferred as being equal to 0. If ptgh_inter_predict_2d_shift_v_bit_count_flag is not present and ptgh_type is equal to P, its value may be inferred as being equal to 1.

ptgh_inter_predict_3d_shift_tangent_axis_bit_count_flag equal to 0 indicates that the value of ptgh_3d_shift_tangent_axis_bit_count_minus1 for the current patch tile group may be explicitly coded in the current patch tile group header. ptgh_inter_predict_3d_shift_tangent_axis bit_count_flag equal to 1 indicates that the value of ptgh_3d_shift_tangent_axis_bit_count_minus1 for the current patch tile group is copied from the corresponding parameter of the first reference patch frame in the reference patch frame list of the current patch tile group. If ptgh_inter_predict_3d_shift_tangent_axis_bit_count_flag is not present and ptgh_type is equal to I, its value may be inferred as being equal to 0. If ptgh_inter_predict_3d_shift_tangent_axis_bit_count_flag is not present and ptgh_type is equal to P, its value may be inferred as being equal to 1.

ptgh_inter_predict_3d_shift_bitangent_axisbit_count_flag equal to 0 indicates that the value of ptgh_3d_shift_bitangent_axis_bit_count_minus1 for the current patch tile group may be explicitly coded in the current patch tile group header. ptgh_inter_predict_3d_shift_bitangent_axis_bit_count_flag equal to 1 indicates that the value of ptgh_3d_shift_bitangent_axis_bit_count_minus1 for the current patch tile group is copied from the corresponding parameter of the first reference patch frame in the reference patch frame list of the current patch tile group. If ptgh_inter_predict_3d_shift_bitangent_axis_bit_count_flag is not present and ptgh_type is equal to I, its value may be inferred as being equal to 0. If ptgh_inter_predict_3d_shift_bitangent_axis_bit_count_flag is not present and ptgh_type is equal to P, its value may be inferred as being equal to 1.

ptgh_inter_predict_lod_bit_count_flag equal to 0 indicates that the value of ptgh_lod_bit_count for the current patch tile group may be explicitly coded in the current patch tile group header. ptgh_inter_predict_lod_bit_count_flag equal to 1 indicates that the value of ptgh_lod_bit_count for the current patch tile group is copied from the corresponding parameter of the first reference patch frame in the reference patch frame list of the current patch tile group. If ptgh_inter_predict_lod_bit_count flag is not present and ptgh_type is equal to I, its value may be inferred as being equal to 0. If ptgh_inter_predict_lod_bit_count_flag is not present and ptgh_type is equal to P, its value may be inferred as being equal to 1.

ptgh_pcm_3d_shift_bit_count_flag equal to 1 indicates that the bit count for ppdu_3d_pcm_shift_tangent_axis, ppdu_3d_pcm_shift_bitangent_axis, and ppdu_3d_pcm_shift_normal_axis is explicitly coded in the current patch tile group header. ptgh_pcm_3d_shift_bit_count_flag equal to 0 indicates that the bit count for ppdu_3d_pcm_shift_tangent_axis, ppdu_3d_pcm_shift_bitangent_axis, and ppdu_3d_pcm_shift_normal_axis may be set to gi_geometry_3d_coordinates_bitdepth_minus1–gi_geometry_nominal_2d_bitdepth_minus1.

ptgh_pcm_3d_shift_axis_bit_count_minus1 plus 1 specifies the bit count of ppdu_3d_pcm_shift_tangent_axis, ppdu_3d_pcm_shift_bitangent_axis, and ppdu_3d_pcm_shift_normal_axis. The bit count for ptgh_pcm_3d_shift_axis_bit_count_minus1 is equal to gi_geometry_3d_coordinates_bitdepth_minus1.

The patch tile group header in accordance with some embodiments may further include a reference list structure (ref_list_struct) in accordance with some embodiments. The reference list structure will be described with reference to FIG. 42.

As described above, parameters ptgh_pcm_3d_shift_bit_count_flag and ptgh_pcm_3d_shift_axis_bit_count_minus1 may represent signaling information for a PCM coded patch, but embodiments are not limited to parameters related to the PCM coding scheme. That is, the patch tile group data unit in accordance with some embodiments may include parameters similar to those described above, for a patch (e.g., an EOM patch) generated by a scheme other than the PCM coding scheme. In accordance with embodiments, PCM may be understood to be the same as RAW.

FIG. 42 shows a reference list structure in accordance with embodiments.

The patch reference list structure shown in FIG. 42 may represent the reference list structure (ref_list_struct( )) included in the patch tile group header of FIG. 41. Hereinafter, the syntax of the reference list structure will be described.

As described above, the patch tile group described below may also be referred to as an atlas tile group. In addition, signaling information or flag information related to the patch tile group described below may be understood as information signaling an atlas tile group or information signaling each atlas tile.

num_ref_entries[rlsIdx] specifies the number of entries in the ref_list_struct(rlsIdx) syntax structure. The value of num_ref_entries[rlsIdx] may be in the range of 0 to psps_max_dec_patch_frame_buffering_minus1+1, inclusive.

st_ref_patch_frame_flag[rlsIdx][i] equal to 1 specifies that the i-th entry in the ref_list_struct(rlsIdx) syntax structure is a short term reference patch frame entry. st_ref_patch_frame_flag[rlsIdx][i] equal to 0 specifies that the i-th entry in the ref_list_struct(rlsIdx) syntax structure is a long term reference patch frame entry. When not present, the value of st_ref_patch_frame_flag[rlsIdx][i] is inferred to be equal to 1.

abs_delta_pfoc_st[rlsIdx][i] specifies, when the i-th entry is the first short term reference patch frame entry in ref_list_struct(rlsIdx) syntax structure, the absolute difference between the patch frame order count values of the current patch tile group and the patch frame referred to by the i-th entry, or specifies, when the i-th entry is a short term reference patch frame entry but not the first short term reference patch frame entry in the ref_list_struct(rlsIdx) syntax structure, the absolute difference between the patch frame order count values of the patch frames referred to by the i-th entry and by the previous short term reference patch frame entry in the ref_list_struct(rlsIdx) syntax structure.

The value of abs_delta_pfoc_st[rlsIdx][i] may be in the range of 0 to 2^15−1, inclusive.

strpf_entry_sign_flag[rlsIdx][i] equal to 1 specifies that i-th entry in the syntax structure ref_list_struct(rlsIdx) has a value greater than or equal to 0. strpf_entry_sign_flag[rlsIdx][i] equal to 0 specifies that the i-th entry in the syntax structure ref_list_struct(rlsIdx) has a value less than 0. When not present, the value of strpf_entry_sign_flag[rlsIdx][i] is inferred to be equal to 1.

pfoc_lsb_lt[rlsIdx][i] specifies the value of the patch frame order count modulo MaxPatchFrmOrderCntLsb of the patch frame referred to by the i-th entry in the ref_list_struct (rlsIdx) syntax structure. The length of the pfoc_lsb_lt [rlsIdx][i] syntax element is psps_log2_max_patch_frame_order_cnt_lsb_minus4+4 bits.

FIG. 43 shows a patch tile group data unit in accordance with embodiments.

The patch tile group data unit shown in FIG. 43 may represent the patch tile group data unit (patch_tile_group_layer_unit) of FIG. 41. Hereinafter, the syntax of the patch tile group data unit will be described.

As described above, the patch tile group described below may also be referred to as an atlas tile group. In addition, signaling information or flag information related to the patch tile group described below may be understood as information signaling an atlas tile group or information signaling each atlas tile.

ptgdu_patch_mode[p] indicates the patch mode for the patch with index p in the current patch tile group. The permitted values for ptgdu_patch_mode[p] are specified in Table 7 5 for patch tile groups with ptgh_type=I and in Table 7 6 for patch tile groups with ptgh_type=P.

Patch Mode Types for I Patch Tile Groups

| ptgdu_patch_mode | Identifier | Description |
| --- | --- | --- |
| 0 | I_INTRA | Non-predicted Patch mode |
| 1 | I_PCM | PCM Point Patch mode |
| 2-13 | I_RESERVED | Reserved modes |
| 14 | I_END | Patch termination mode |

Patch Mode Types for P Patch Tile Groups

| ptgdu_patch_mode | Identitier | Description |
| --- | --- | --- |
| 0 | P_SKIP | Patch Skip mode |
| 1 | P_INTRA | Non-predicted Patch mode |
| 2 | P_INTER | Inter predicted Patch mode |
| 3 | P_PCM | PCM Point Patch mode |
| 4-13 | P_RESERVED | Reserved modes |
| 14 | P_END | Patch termination mode | pid_override_geometry_patch_flag[p] indicates whether a different geometry patch parameter set may be associated with patch p in the current patch tile group. If pid_override_geometry_patch_flag[p] is equal to 1, then a new geometry patch parameter set is associated with patch p in the current patch tile group. If pid_override_geometry_patch_flag[p] is equal to 0, then the geometry patch parameter set associated with the entire patch frame may be used. If pid_override_geometry_patch_flag[p] is not present, its value may be inferred to be equal to 0.

pid_geometry_patch_parameter_set_id[p] specifies the value of gpps_geometry_patch_parameter_set_id for the geometry patch parameter set associated with the patch p of the current patch tile group. The value of pid_geometry_patch_parameter_set_id[p] may be in the range of 0 to 63, inclusive.

pid_override_attribute_patch_flag[p][i] indicates whether a different attribute patch parameter set, for attribute with index i may be associated with patch p in the current patch tile group. If pid_override_attribute_patch_flag[p][i] is equal to 1, then a new attribute patch parameter set is associated with attribute of index i of patch p in the current patch tile group. If pid_override_attribute_patch_flag[p][i] is equal to 0, then the attribute patch parameter set associated with attribute i of the entire patch frame may be used. If pid_override_attribute_patch_flag[p][i] is not present, its value may be inferred to be equal to 0.

pid_attribute_patch_parameter_set_id[p][i] specifies the value of apps_attribute_patch_parameter_set_id[i] for the attribute patch parameter set for attribute i associated with the patch p of the current patch tile group. The value of pid_attribute_patch_parameter_set_id[p][i] may be in the range of 0 to 63, inclusive.

FIG. 44 shows a patch data unit in the patch tile group data unit in accordance with embodiments.

The patch data unit shown in FIG. 44 may represent the patch data unit (patch_data_unit) included in the patch tile group data unit (patch_tile_group_layer_unit) of FIG. 43. Hereinafter, the syntax of the patch data unit will be described.

As described above, the patch tile group described below may also be referred to as an atlas tile group. In addition, signaling information or flag information related to the patch tile group described below may be understood as information signaling an atlas tile group or information signaling each atlas tile.

pdu_2d_shift_u[p] specifies the x-coordinate of the top-left corner of the patch bounding box size for patch p in the current patch tile group, expressed as a multiple of Patch-PackingBlockSize. The value of pdu_2d_shift_u[p] may be in the range of 0 to Min(2ptgh_2d_shift_u_bit_count_minus1+1−1, sps_frame_width/PatchPackingBlockSize−1), inclusive.

pdu_2d_shift_v[p] specifies the y-coordinate of the top-left corner of the patch bounding box size for patch p in the current patch tile group, expressed as a multiple of Patch-PackingBlockSize. The value of pdu_2d_shift_v[p] may be in the range of 0 to Min(2ptgh_2d_shift_v_bit_count_minus1+1−1, sps_frame_height/PatchPackingBlockSize−1), inclusive.

When p is equal to 0, pdu_2d_delta_size_u[p] specifies the width value of the patch with index 0 in the current patch tile group. When p is larger than 0, pdu_2d_delta_size_u[p] specifies the difference of the width values of the patch with index p and the patch with index (p−1).

When p is equal to 0, pdu_2d_delta_size_v[p] specifies the height value of the patch with index 0 in the current patch tile group. When p is larger than 0, pdu_2d_delta_size_v[p] specifies the difference of the height values of the patch with index p and the patch with index (p−1).

pdu_3d_shift_tangent_axis[p] specifies the shift to be applied to the reconstructed patch points in the patch with index p of the current patch tile group along the tangent axis. The value of pdu_3d_shift_tangent_axis[p] may be in the range of 0 to Min(2ptgh_3 d_shift_tangent_axis_bit_count_minus1+1, 2gi_geometry_3d_coordinates_bitdepth_minus1+1)−1, inclusive.

pdu_3d_shift_bitangent_axis[p] specifies the shift to be applied to the reconstructed patch points in patch with index p of the current patch tile group along the bitangent axis. The value of pdu_3d_shift_bitangent_axis[p] may be in the range of 0 to Min(2ptgh_3d_shift_bitangent_axis_bit_count_minus1+1, 2gi_geometry_3d_coordinates_bitdepth_minus1+1)−1, inclusive.

pdu_3d_shift_min_normal_axis[p] specifies the shift to be applied to the reconstructed patch points in patch with index p of the current patch tile group along the normal axis, Pdu3dShiftMinNormalAxis[p].

If present, specifies the nominal maximum value of the shift expected to be present in the reconstructed bitdepth patch geometry samples, after conversion to their nominal representation, in patch with index p of the current patch tile group along the normal axis.

If pdu_3d_shift_delta_max_normal_axis[p] is not present, the value of Pdu3dShiftDeltaMaxNormalAxis[p] is assumed to be equal to 2gi_geometry_nominal_2d_bitdepth_minus1+1−1. When present, the value of Pdu3dShiftDeltaMaxNormalAxis[p] may be in the range of 0 to 2gi_geometry_3d_coordinates_bitdepth_minus1+1−1, inclusive.

pdu_projection_plane[p] specifies the values of the projection mode and of the index of the normal to the projection plane for the patch with index p of the current patch tile group. The value of pdu_projection_plane[p] may be in range of 0 to 6, inclusive.

pdu_orientation_index[p] indicates the index related to the patch orientation index for the patch with index p of the current patch tile group.

pdu_lod[p] specifies the LOD scaling factor to be applied to the patch with index p of the current patch tile group. The reconstructed point 3D positions for patch p in the current patch tile group are to be scaled by 2pdu_lod[p] after their projection from 2D and before applying any further transformations. If pdu_lod[p] is not present, its value may be inferred to be equal to 0.

pdu_45degree_projection_present_flag[p] equal to 0 specifies that the patch projection information is not signaled for the patch with index p of the current patch tile group. pdu_45degree_projectionpresent_flag[p] equal to 1 specifies that the patch projection information is signaled for the patch with index p of the current patch tile group. When pdu_45degree_projection_present_flag[p] is not present, its value is inferred to be equal to 0.

pdu_45degree_projection_rotation_axis[p] equal to 0 specifies that the patch with index p of the current patch tile group is projected directly to one of the 6 projection planes of the patch bounding box. When pdu_45degree_projection_rotation axis[p] is greater than 0, it specifies that the patch with index p of the current patch tile group is projected to one of the diagonal 45 degree projection planes of the patch bounding box. The value of pdu_45degree_projection_rotation_axis[p] may be in the range of 0 to 3, inclusive. When pdu_45degree_projection_rotation_axis[p] is not present, its value is inferred to be equal to 0.

dpdu_patch_index[p] specifies the index, PredIdx, of the patch in the patch tile group with the same address as the current tile group address in the patch frame that corresponds to index RefIdx in the current reference patch frame list.

dpdu_2d_shift_u[p] specifies the difference of the x-coordinate of the top-left corner of the patch bounding box of patch with index p in the current patch tile group and of the x-coordinate of the top-left corner of the patch bounding box of the patch with index PredIdx in the patch tile group with the same address as the current tile group in the patch frame that is associated with the reference RefIdx, expressed as a multiple of PatchPackingBlockSize. The value of dpdu_2d_shift_u[p] may be in the range of (−sps_frame_width/PatchPackingBlockSize+1) to (sps_frame_width/PatchPackingBlockSize−1), inclusive.

dpdu_2d_shift_v[p] specifies the difference of the y-coordinate of the top-left corner of the patch bounding box of patch with index p in the current patch tile group and of the y-coordinate of the top-left corner of the patch bounding box of the patch with index PredIdx in the patch tile group with the same address as the current tile group in the patch frame that is associated with the reference RefIdx, expressed as a multiple of PatchPackingBlockSize. The value of dpdu_2d_shift_v[p] may be in the range of (−sps_frame_height/PatchPackingBlockSize+1) to (sps_frame_height/PatchPackingBlockSize−1), inclusive.

dpdu_2d_delta_size_u[p] specifies the difference of the width values of the patch with index p in the current patch tile group and the patch with index PredIdx in the patch tile group with the same address as the current tile group in the patch frame that is associated with the reference RefIdx.

dpdu_2d_delta_size_v[p] specifies the difference of the height values of the patch with index p in the current patch tile group and the patch with index PredIdx in the patch tile group with the same address as the current tile group in the patch frame that corresponds to the reference RefIdx.

dpdu_3d_shift_tangent_axis[p] specifies the difference between the shift to be applied to the reconstructed patch points along the tangent axis of patch with index p in the current patch tile group and of the shift to be applied to the reconstructed patch points along the tangent axis of patch with index PredIdx in the patch tile group with the same address as the current tile group in the patch frame that corresponds to the reference RefIdx.

dpdu_3d_shift_bitangent_axis[p] specifies the difference between the shift to be applied to the reconstructed patch points along the bitangent axis of patch with index p in the current patch tile group and of the shift to be applied to the reconstructed patch points along the bitangent axis of the patch with index PredIdx in the patch tile group with the same address as the current tile group in the patch frame that corresponds to RefIdx. The value of dpdu_3d_shift_bitangent_axis[p] may be in the range of (−2gi_geometry_3d_coordinates_bitdepth_minus1+1) to (2gi_geometry_3d_coordinates_bitdepth_minus1+1−1), inclusive.

dpdu_3d_shift_min_normal_axis[p] specifies the difference between the shift to be applied to the reconstructed patch points along the normal axis of patch with index p in the current patch tile group and of the shift to be applied to the reconstructed patch points along the normal axis of patch with index PredIdx in the patch tile group with the same address as the current tile group in the patch frame that corresponds to RefIdx.

If present, dpdu_3d_shift_delta_max_normal_axis[p] specifies the difference between the nominal maximum value of the shift expected to be present in the reconstructed bitdepth patch geometry samples, after conversion to their nominal representation, in patch with index p of the current patch tile group along the normal axis and of the nominal maximum value of the shift expected to be presented in the reconstructed bitdepth patch geometry samples, after conversion to their nominal representation of the patch with index PredIdx in the patch tile group with the same address as the current tile group in the patch frame that corresponds to RefIdx, Dpdu3dShiftDeltaMaxNormalAxis[p], If dpdu_3d_shift_delta_max_normal_axis[p] is not present the value of Dpdu3dShiftDeltaMaxNormalAxis[p] is assumed to be equal to 2gi_geometry_nominal_2d_bitdepth_minus1+1−1).

The patch data unit in accordance with some embodiments may further include point local reconstruction data (point_local_reconstruction_data(patchIndex)). The syntax of the point local reconstruction data will be described in detail with reference to FIG. 47.

FIG. 45 shows a patch data unit in the patch tile group data unit in accordance with embodiments.

The patch data unit shown in FIG. 45 may represent the PCM patch data unit (pcm_patch_data_unit) included in the patch tile group data unit (patch_tile_group_layer_unit) of FIG. 43.

Hereinafter, the syntax of the PCM patch data unit will be described. All features related to PCM coding described below may be applied to RAW coding or EOM coding in the same manner.

Further, as described above, the patch tile group described below may also be referred to as an atlas tile group. In addition, signaling information or flag information related to the patch tile group described below may be understood as information signaling an atlas tile group or information signaling each atlas tile.

ppdu_patch_in_pcm_video_flag[p] specifies whether the geometry and attribute data associated with the PCM coded patch p in the current patch tile group are encoded in a separate video compared to those of the intra and inter coded patches. If ppdu_patch_in_pcm_video_flag[p] is equal to 0, the geometry and attribute data associated with the PCM coded patch p in the current patch tile group are encoded in the same video as those of the intra and inter coded patches.

If ppdu_patch_in_pcm_video_flag[p] is equal to 1, the geometry and attribute data associated with the PCM coded patch p in the current patch tile group are encoded in a separate video from those of the intra and inter coded patches. If ppdu_patch_in_pcm_video_flag[p] is not present, its value may be inferred to be equal to 0.

ppdu_2d_shift_u[p] specifies the x-coordinate of the top-left corner of the patch bounding box size for PCM coded patch p in the current patch tile group, expressed as a multiple of PatchPackingBlockSize. The value of ppdu_2d_shift_u[p] may be in the range of 0 to Min (2ptgh_2d_shift_u_bit_count_minus1+1−1, sps_frame_width/PatchPackingBlockSize−1), inclusive.

ppdu_2d_shift_v[p] specifies the y-coordinate of the top-left corner of the patch bounding box size for PCM coded patch p in the current patch tile group, expressed as a multiple of PatchPackingBlockSize. The value of ppdu_2d_shift_v[p] may be in the range of 0 to Min(2ptgh_2d_shift_v_bit_count_minus1+1−1, sps_frame_height/PatchPackingBlockSize−1), inclusive.

When p is equal to 0, ppdu_2d_delta_size_u[p] specifies the width value of the PCM coded patch with index 0 in the current patch tile group. When p is larger than 0, ppdu_2d_delta_size_u[p] specifies the difference of the width values of the PCM coded patch with index p and the patch with index (p−1).

When p is equal to 0, ppdu_2d_delta_size_v[p] specifies the height value of the PCM coded patch with index 0 in the current patch tile group. When p is larger than 0, ppdu_2d_delta_size_v[p] specifies the difference of the height values of the PCM coded patch with index p and the patch with index (p−1).

ppdu_3dpcm_shift_tangent_axis[p] specifies the shift to be applied to the reconstructed PCM patch points in the patch with index patchIndex of the current patch tile group along the tangent axis.

ppdu_3dpcm_shift_bitangent_axis[p] specifies the shift to be applied to the reconstructed PCM patch points in the patch with index patchIndex of the current patch tile group along the bitangent axis.

ppdu_3dpcm_shift_normal_axis[p] specifies the shift to be applied to the reconstructed PCM patch points in the patch with index patchIndex of the current patch tile group along the normal axis.

ppdu_pcm_points[p] specifies the number of pcm points present in the PCM coded patch p in the current patch tile group.

As described above, the above-described parameters included in the patch tile group data unit in accordance with some embodiments may represent signaling information for the PCM coded patch, but embodiments are not limited to parameters related to the PCM coding scheme. That is, the patch tile group data unit in accordance with some embodiments may include parameters similar to those described above, for a patch (e.g., an EOM patch) generated by a scheme other than the PCM coding scheme. In accordance with embodiments, PCM may be understood to be the same as RAW.

FIG. 46 shows a supplemental enhancement information (SEI) message in accordance with some embodiments.

The supplemental enhancement information (SEI) message shown in FIG. 46 may represent the SEI message (sei_message( )) included in the patch tile group of FIG. 34.

As described above, the patch tile group described below may also be referred to as an atlas tile group. In addition, signaling information or flag information related to the patch tile group described below may be understood as information signaling an atlas tile group or information signaling each atlas tile.

Each SEI message comprises the variables specifying the type payloadType and size payloadSize of the SEI message payload. The derived SEI message payload size payloadSize is specified in bytes and may be equal to the number of bytes in the SEI message payload.

sm_payload_type_byte is a byte of the payload type of an SEI message.

sm_payload_size_byte is a byte of the payload size of an SEI message.

FIG. 47 shows point local reconstruction data in accordance with embodiments.

The point local reconstruction data (point_local_reconstruction_data( )) shown in FIG. 47 may represent the point local reconstruction data (point_local_reconstruction_data( )) included in the patch data unit of FIG. 44. The point local reconstruction data may have an index (patchIndex) of patches signaled in the patch data unit as a parameter. Hereinafter, the syntax structure of the point local reconstruction data will be described.

As described above, the patch tile group described below may also be referred to as an atlas tile group. In addition, signaling information or flag information related to the patch tile group described below may be understood as information signaling an atlas tile group or information signaling each atlas tile.

The variable BlockCount may be derived as follows:

BlockCount=Patch2dSizeX[patchIdx]*Patch2dSizeY[patchIdx]

plrd_level[p] equal to 0 indicates that point local reconstruction data is sent for each block of the patch p in the current patch tile group. plrd_level[patchIndex] equal to 1 indicates that point local reconstruction data is sent only once for the entire patch p; In accordance with some embodiments, all blocks of the patch p may use the same point local reconstruction data.

plrd_present_block_flag[p][i] equal to 1 indicates that a point local reconstruction mode is sent for block i of patch p in the current patch tile group. plrd_present_block_flag[p][i] equal to 0 indicates that no point local reconstruction may be performed for block i of patch p. This flag is only defined when plrd_level[p] equals 0.

plrd_block_mode_minus1[p][i] indicates the point local reconstruction mode for block i of patch p in the current patch tile group. plrd_block_mode_minus1[p][i] may be in the range of 0 to plrp_number_of_modes_minus1, inclusive.

plrd_present_flag[p] equal to 1 indicates that a point local reconstruction mode is sent for patch p in the current patch tile group. plrd_present_flag[p] equal to 0 indicates that no point local reconstruction mode may be performed for patch p. This flag is only defined when plrd_level[p] is equal to 1.

plrd_mode_minus1[p] indicates the point local reconstruction mode for all blocks of patch p in the current patch tile group. The value of plrd_mode_minus1[p] may be in the range of 0 to plrp_number_of_modes_minus1, inclusive.

plrd_level[p], plrd_present_block_flag[patchIdx][j], plrd_block_mode_minus1 [patchIdx][j], plrd_present_flag [patchIdx], and plrd_mode_minus1[patchIdx], are signaled by asps_map_count_minus1. Likewise, when there are multiple maps or patches used for encoding of the geometry and the attribute data for the current atlas, signaling may be performed for each of the maps or patches. (In accordance with some embodiments, the parameters may be expressed as plrd_level[i][p], plrd_present_block_flag[i][patchIdx][j], plrd_block_mode_minus1[i][patchIdx][j], plrd_present_flag[i][patchIdx], and plrd_mode_minus1[i][patchIdx]).

Figure 48:
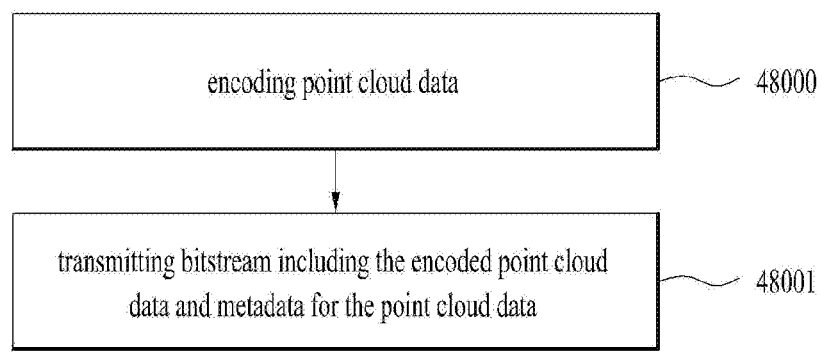
FIG. 48 is a flowchart illustrating a method of transmitting point cloud data in accordance with embodiments.

FIG. 48 is a flowchart illustrating a method of transmitting point cloud data in accordance with embodiments.

A method of transmitting point cloud data in accordance with embodiments may include encoding point cloud data (48000) and/or transmitting a bitstream containing the point cloud data and signaling information about the point cloud data (48001).

The method of transmitting the point cloud data may include encoding point cloud data (48000). In this operation of the point cloud data transmission method, the point cloud data in accordance with embodiments is encoded. The point cloud data in accordance with some embodiments includes geometry information indicating the positions of points, attribute data indicating the attributes of the points, and occupancy information.

The encoding in accordance with some embodiments may be performed by the pulse code modulation (PCM) scheme in accordance with some embodiments or by the RAW scheme or the EOM scheme.

The encoding 40000 in accordance with some embodiments may be performed by the transmission device 10000 of FIG. 1, the point cloud video encoder 10002 of FIG. 1, the V-PCC encoding process of FIG. 4, the 2D video/image encoder of FIG. 15, the video encoder 18006 of FIG. 18, the video encoding 20002 or image encoding 20003 of FIG. 20, or the video encoding 21007 or image encoding 21008 of FIG. 21.

The method of transmitting the point cloud data may include transmitting a bitstream containing the point cloud data and signaling information about the point cloud data (48001).

The point cloud data in accordance with some embodiments may be transmitted in accordance with an ISOBMFF file format. That is, the point cloud data in accordance with some embodiments may be encoded based on the above-described scheme, and may be carried in one or more tracks. The ISOBMFF file format includes information about the point cloud data in accordance with some embodiments. The encoded point cloud data in accordance with some embodiments may be delivered by one or more samples that carry encoded geometry information and encoded attribute information. The structure of the ISOBMFF file format including the point cloud data in accordance with some embodiments has been described with reference to FIGS. 25 to 47.

In accordance with embodiments, geometry data and attribute data encoded in accordance with a specific scheme (e.g., RAW, EOM, PCM, etc.) may be included in one sample in accordance with embodiments. The geometry data and attribute data encoded in accordance with the specific scheme may be contained in different samples.

The ISOBMFF file in accordance with some embodiments may include metadata containing information about the point cloud data. The metadata may contain information indicating whether the geometry or attribute data constituting the sample is encoded based on a specific encoding scheme (e.g., RAW, EOM, PCM, etc.).

In addition, the metadata may contain a track reference type box (TrackReferenceTypeBox) for referring to a track and point cloud data corresponding to the track. The track reference type box in accordance with some embodiments may contain reference type information indicating the type of the point cloud data corresponding to the track. The reference type information in accordance with some embodiments may further indicate whether the point cloud data corresponding to the track is encoded based on a specific scheme.

The operation 48001 of transmitting a bitstream in accordance with embodiments may be performed by the transmission device 10000 of FIG. 1, the transmitter 10004 of FIG. 1, the transmitter 18008 of FIG. 18, the V-PCC system of FIG. 20, the V-PCC system of FIG. 21, or the like.

In addition, the bitstream containing the point cloud data and the signaling information about the point cloud data in accordance with embodiments may be generated by the file segment encapsulation module 10003 of FIG. 1, the V-PCC encoding process of FIG. 4, the 2D video/image encoder of FIG. 15, the video encoder 18006 or metadata encoder 18005 of FIG. 18, the file segment encapsulator 20004 of FIG. 20, the video encoding 21007 or image encoding 21008 in FIG. 21, the point cloud pre-processing, or the like.

Figure 49:
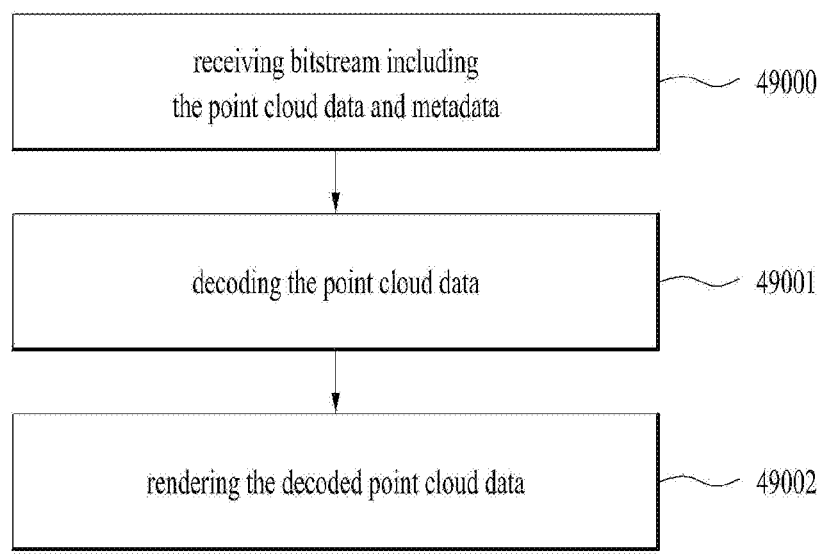
FIG. 49 is a flowchart showing a method of receiving point cloud data in accordance with embodiments.

FIG. 49 is a flowchart showing a method of receiving point cloud data in accordance with embodiments.

The method of receiving point cloud data may include receiving a bitstream containing the point cloud data and signaling information (49000), decoding the point cloud data (49001), and/or rendering the decoded point cloud data (49002).

The operation 49000 of receiving a bitstream containing the point cloud data and the signaling information (metadata) will be described.

The point cloud data contained in the bitstream in accordance with some embodiments may be encoded by the pulse code modulation (PCM) scheme (also referred to as a RAW scheme) or the EOM scheme in accordance with some embodiments.

The bitstream in accordance with some embodiments may be data compressed in an ISOBMFF file format. That is, the point cloud data in accordance with some embodiments may be encoded based on the above-described scheme, and be carried in one or more tracks. The ISOBMFF file format may contain metadata (signaling information) that is information about the point cloud data in accordance with some embodiments. The encoded point cloud data in accordance with some embodiments may be delivered by one or more samples that carry encoded geometry information and encoded attribute information. The structure of the ISOBMFF file format including the point cloud data in accordance with some embodiments has been described with reference to FIGS. 25 to 47.

In accordance with embodiments, geometry data and attribute data encoded in accordance with a specific scheme (e.g., RAW, EOM, PCM, etc.) may be included in one sample in accordance with embodiments. The geometry data and attribute data encoded in accordance with the specific scheme may be contained in different samples.

The ISOBMFF file in accordance with some embodiments may include metadata containing information about the point cloud data. The metadata may contain information (first information) indicating whether the geometry or attribute data constituting the sample is encoded based on a specific encoding scheme (e.g., RAW, EOM, PCM, etc.).

In addition, the metadata may contain a track reference type box (TrackReferenceTypeBox) for referring to a track and point cloud data corresponding to the track. The track reference type box in accordance with some embodiments may contain reference type information indicating the type of the point cloud data corresponding to the track. The reference type information in accordance with some embodiments may further indicate whether the point cloud data corresponding to the track is encoded based on a specific scheme.

The operation 49000 of receiving a bitstream containing the point cloud data and signaling information in accordance with some embodiments may be performed by the receiver 10006 of FIG. 1 or the receiver of FIG. 19.

The decoding (49001) of the point cloud data will be described. In the method of receiving point cloud data in accordance with embodiments, the point cloud data in the received bitstream may be decoded by a scheme corresponding to the above-described encoding scheme.

In accordance with embodiments, in the point cloud data reception method, all data in a sample carried by a track carried in the bitstream may be decoded by checking whether the data is encoded by the PCM (or EOM or RAW) scheme based on the first information described above.

In accordance with embodiments, in the point cloud data reception method, signaling information about the encoded point cloud data in accordance with some embodiments may be acquired based on the information contained in the above-described track reference type box (TrackReferenceTypeBox).

The operation 49001 of decoding the point cloud data in accordance with some embodiments may be performed by the reception device 10005 of FIG. 1, the point cloud video decoder 10008 of FIG. 1, the V-PCC decoding process of FIG. 16, the 2D video/image decoder of FIG. 17, the video decoder 19001 of FIG. 19, the video/audio decoding 20006 of FIG. 20, or the video decoding 22001 or image decoding 22002 of FIG. 22.

In the operation 49002 of rendering the decoded point cloud data, the decoded point cloud data is rendered for the user through a reconstruction operation in accordance with embodiments.

The operation 49002 of rendering the decoded point cloud data may be performed by the renderer 10009 of FIG. 1, the point cloud renderer of FIG. 19, or the point cloud processing/rendering unit of FIG. 20.

Each of the above-described parts, modules, or units may be a software part, a processor or a hardware part that executes successive procedures stored in a memory (or storage unit). Each of the operations described in the above-described embodiments may be performed by processors or software or hardware parts. Each module/block/unit described in the above-described embodiments may operate as a processor, a software part, or a hardware part. In addition, the methods described in some embodiments may be executed as code. The code may be written in a recoding medium readable by a processor, and thus may be read by the processor provided by an apparatus.

Although embodiments have been described with reference to each of the accompanying drawings for simplicity, it is possible to design new embodiments by merging some embodiments illustrated in the accompanying drawings. Designing a recording medium readable by a computer on which programs for executing the above-described embodiments are recorded as needed by those skilled in the art also falls within the scope of the appended claims and their equivalents.

The devices and methods in accordance with embodiments may not be limited by the configurations and methods of some embodiments described above. Some embodiments described above may be configured by being selectively combined with one another entirely or in part to enable various modifications.

Although preferred embodiments have been described with reference to the drawings, those skilled in the art will appreciate that various modifications and variations may be made in some embodiments without departing from the spirit or scope of the disclosure described in the appended claims. Such modifications are not to be understood individually from the technical idea or perspective of some embodiments.

It is understood by those skilled in the art that various changes and modifications are possible in some embodiments without departing from the spirit or scope of the present disclosure. Accordingly, some embodiments are intended to cover changes and modifications of some embodiments provided within the scope of the appended claims and their equivalents.

In this specification, both an apparatus invention and a method invention are mentioned, and the descriptions of both the apparatus and method inventions may be applied to complement each other.

In this document, the term "/" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Various elements of the devices of some embodiments may be implemented by hardware, software, firmware, or a combination thereof. Various elements in some embodiments may be implemented by a single chip, for example, a single hardware circuit. In accordance with embodiments, the components in accordance with some embodiments may be implemented as separate chips, respectively. In accordance with embodiments, at least one or more of the components of the device in accordance with some embodiments may include one or more processors capable of executing one or more programs. The one or more programs may perform any one or more of the operations/methods in accordance with some embodiments or include instructions for performing the same. Executable instructions for performing the method/operations of the device in accordance with some embodiments may be stored in a non-transitory CRM or other computer program products configured to be executed by one or more processors, or may be stored in a transitory CRM or other computer program products configured to be executed by one or more processors. In addition, the memory in accordance with some embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

Terms such as first and second may be used to describe various elements of some embodiments. However, various components in accordance with some embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe some embodiments is used for the purpose of describing particular embodiments only and is not intended to be limiting of some embodiments. As used in the description of some embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition in accordance with the specific condition.

Operations in accordance with some embodiments described in this specification may be performed by a transmission/reception device including a memory and/or a processor in accordance with embodiments. The memory may store programs for processing/controlling the operations in accordance with some embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

MODE FOR INVENTION

Detailed description has been made in the best mode.

INDUSTRIAL APPLICABILITY

It is apparent to those skilled in the art that various changes and modifications are possible in the present disclosure without departing from the spirit or scope of the present disclosure. Therefore, the present disclosure is intended to cover changes and modifications of the disclosure provided within the scope of the appended claims and their equivalents.

[Sequence List Text]

The invention claimed is:

1. A method for transmitting encoded point cloud data by an apparatus including a memory and a processor coupled to the memory, the method comprising:

encoding point cloud data including geometry data and attribute data to output a bitstream, the bitstream including one or more units, a unit including a header, the header including type information identifying a type of the unit, in response to the type information identifying that the unit is a geometry unit or an attribute unit, the header including information for representing whether the geometry unit or the attribute unit includes only geometry data or attribute data encoded based on a specific encoding scheme;

encapsulating the bitstream into a file including metadata, the file including a geometry track including samples carrying the encoded geometry data and an attribute track including samples carrying the encoded attribute data, a sample entry of the geometry track and a sample entry of the attribute track including a header of the geometry unit and a header of the attribute unit, respectively, wherein the header of the geometry unit includes the information for representing whether the geometry unit includes only the geometry data encoded based on the specific encoding scheme and the header of the attribute unit includes the information for representing whether the attribute unit includes only the attribute data encoded based on the specific encoding scheme; and transmitting the encapsulated file.

2. The method of claim 1, wherein the file includes a track including samples carrying information for a number of coded points in a coded patch for the geometry data or the attribute data that is encoded based on the specific encoding scheme.

3. The method of claim 2, wherein the track including samples carrying information further includes information representing x-coordinate of a top-left corner for the coded patch, y-coordinate of the top-left corner for the coded patch, and information for a size of the coded patch.

4. The method of claim 1, wherein the metadata includes a TrackReferenceTypeBox for referencing a track and point cloud data that corresponds to the track, the TrackReferenceTypeBox includes reference type information representing a type of the point cloud data that corresponds to the track, wherein the reference type information further represents whether the point cloud data that corresponds to the track is encoded based on the specific encoding scheme.

5. An apparatus for transmitting encoded point cloud data, the apparatus comprising:

a memory; and a processor coupled to the memory, the processor configured to encode point cloud data including geometry data and attribute data to output a bitstream, the bitstream including one or more units, a unit including a header, the header including type information identifying a type of the unit, in response to the type information identifying that the unit is a geometry unit or an attribute unit, the header including information for representing whether the geometry unit or the attribute unit includes only geometry data or attribute data encoded based on a specific encoding scheme;

the processor configured to encapsulate the bitstream into a file including metadata, the file including a geometry track including samples carrying the encoded geometry data and an attribute track including samples carrying the encoded attribute data, a sample entry of the geometry track and a sample entry of the attribute track including a header of the geometry unit and a header of the attribute unit, respectively, wherein the header of the geometry unit includes the information for representing whether the geometry unit includes only the geometry data encoded based on the specific encoding scheme and the header of the attribute unit includes the information for representing whether the attribute unit includes only the attribute data encoded based on the specific encoding scheme; and the processor configured to transmit the encapsulated file.

6. The apparatus of claim 5, wherein the file includes a track including samples carrying information for a number of coded points in a coded patch for the geometry data or the attribute data that is encoded based on the specific encoding scheme.

7. The apparatus of claim 6, wherein the track including samples carrying information further includes information representing x-coordinate of a top-left corner for the coded patch, y-coordinate of the top-left corner for the coded patch, and information for a size of the coded patch.

8. The apparatus of claim 5, wherein the metadata includes a TrackReferenceTypeBox for referencing a track and point cloud data that corresponds to the track, the TrackReferenceTypeBox includes reference type information representing a type of the point cloud data that corresponds to the track, wherein the reference type information further represents whether the point cloud data that corresponds to the track is encoded based on the specific encoding scheme.

9. An apparatus for receiving encoded point cloud data, the apparatus comprising:

a memory; and a processor coupled with the memory, the processor configured to receive a file carrying encoded point cloud data including encoded geometry data and encoded attribute data and metadata;

the processor configured to decapsulate the file to output a bitstream of the encoded point cloud data based on the metadata, the bitstream including one or more units, a unit including a header, the header including type information identifying a type of the unit, in response to the type information identifying that the unit is a geometry unit or an attribute unit, the header including information for representing whether the geometry unit or the attribute unit includes only geometry data or attribute data encoded based on a specific encoding scheme, the file including a geometry track including samples carrying the encoded geometry data and an attribute track including samples carrying the encoded attribute data, a sample entry of the geometry track and a sample entry of the attribute track including a header of a geometry unit and a header of an attribute unit, respectively, wherein the header of the geometry unit includes the information for representing whether the geometry unit includes only the geometry data encoded based on the specific encoding scheme and the header of the attribute unit includes the information for representing whether the attribute unit includes only the attribute data encoded based on the specific encoding scheme, and the processor configured to decode the encoded point cloud data.

10. The apparatus of claim 9,
wherein the file includes a track including samples carrying information for a number of coded points in a coded patch for the geometry data or the attribute data that is encoded based on the specific encoding scheme.

11. The apparatus of claim 10,
wherein the track including samples carrying information further includes information representing x-coordinate of a top-left corner for the coded patch, y-coordinate of the top-left corner for the coded patch, and information for a size of the coded patch.

12. The apparatus of claim 9,
wherein the metadata includes a TrackReferenceTypeBox for referencing a track and point cloud data that corresponds to the track,
the TrackReferenceTypeBox includes reference type information representing a type of the point cloud data that corresponds to the track.

13. The apparatus of claim 12,
wherein the file includes a volumetric visual track carrying decoder configuration information.

14. A method for receiving encoded point cloud data by an apparatus comprising a memory and a processor coupled with the memory, the method comprising:
receiving a file carrying encoded point cloud data including encoded geometry data and encoded attribute data and metadata;
decapsulating the file to output a bitstream of the encoded point cloud data based on the metadata, the bitstream including one or more units, a unit including a header,
the header including type information identifying a type of the unit,
in response to the type information identifying that the unit is a geometry unit or an attribute unit, the header including information for representing whether the geometry unit or the attribute unit includes only geometry data or attribute data encoded based on a specific encoding scheme,
the file including a geometry track including samples carrying the encoded geometry data and an attribute track including samples carrying the encoded attribute data,
a sample entry of the geometry track and a sample entry of the attribute track including a header of a geometry unit and a header of an attribute unit, respectively, wherein the header of the geometry unit includes the information for representing whether the geometry unit includes only the geometry data encoded based on the specific encoding scheme and the header of the attribute unit includes the information for representing whether the attribute unit includes only the attribute data encoded based on the specific encoding scheme; and
decoding the encoded point cloud data.

* * * * *